(12) United States Patent
Saracco et al.

(10) Patent No.: US 9,285,541 B2
(45) Date of Patent: Mar. 15, 2016

(54) UV-GREEN CONVERTING FIBER LASER USING ACTIVE TAPERS

(75) Inventors: Matthieu Saracco, Vancouver, WA (US); Jason N. Farmer, Vancouver, WA (US); Scott H. Keeney, Vancouver, WA (US); Timothy S. McComb, Vancouver, WA (US)

(73) Assignee: nLIGHT Photonics Corporation, Vancouver, WA (US)

( * ) Notice: Subject to any disclaimer, the term of this patent is extended or adjusted under 35 U.S.C. 154(b) by 694 days.

(21) Appl. No.: 13/418,255

(22) Filed: Mar. 12, 2012

(65) Prior Publication Data

US 2012/0219026 A1 Aug. 30, 2012

Related U.S. Application Data

(63) Continuation-in-part of application No. 13/339,037, filed on Dec. 28, 2011, now Pat. No. 9,158,070, which is a continuation-in-part of application No. 12/757,737, filed on Apr. 9, 2010, now Pat. No.
(Continued)

(51) Int. Cl.
*G02B 6/14* (2006.01)
*H01S 3/00* (2006.01)
(Continued)

(52) U.S. Cl.
CPC .............. *G02B 6/14* (2013.01); *H01S 3/06754* (2013.01); *H01S 3/0092* (2013.01);
(Continued)

(58) Field of Classification Search
CPC .............. H01S 3/06754; H01S 3/0092; H01S 3/06745; H01S 3/08045; H01S 3/09415; H01S 3/1618; H01S 2301/03; G02B 6/14
See application file for complete search history.

(56) References Cited

U.S. PATENT DOCUMENTS

| 3,505,046 A | 4/1970 | Phaneuf |
| 4,046,537 A | 9/1977 | Deserno et al. |

(Continued)

FOREIGN PATENT DOCUMENTS

| RU | 2176840 C2 | 12/2001 |
| WO | WO 92/10014 | 6/1992 |

(Continued)

OTHER PUBLICATIONS nLIGHT Corporation, "nLIGHT Introduces New Line of All Fiber Mode Field Tapers" Jan. 23, 2009 News Release, http://nlight.net/news/releases/92~nLIGHT-Introduces-New-Line-of-All-Fiber-Mode-Field, downloaded Jan. 18, 2014.
(Continued)

*Primary Examiner* — Xinning Niu
(74) *Attorney, Agent, or Firm* — Klarquist Sparkman, LLP

(57) ABSTRACT

Nonlinear optical systems include fiber amplifiers using tapered waveguides such as optical fibers that permit multi-mode propagation but produce amplification and oscillation in a fundamental mode. The tapered waveguides generally are provided with an active dopant that is pumped with an optical pump source such as one or more semiconductor lasers. The active waveguide taper is selected to taper from a single or few mode section to a multimode section, and a seed beam in a fundamental mode is provided to a section of the waveguide taper associated with a smaller optical mode. An amplified beam exits the waveguide taper at a section associated with a larger optical mode. The amplified beam is directed to nonlinear conversion optics such as one or more nonlinear crystals to produce high peak power and high beam quality converted light using second or third harmonic generation, or other nonlinear processes.

29 Claims, 32 Drawing Sheets

Related U.S. Application Data 8,711,471, which is a continuation of application No. 12/545,791, filed on Aug. 21, 2009, now abandoned.

(60) Provisional application No. 61/090,854, filed on Aug. 21, 2008.

(51) Int. Cl.
    H01S 3/067     (2006.01)
    H01S 3/08      (2006.01)
    H01S 3/0941    (2006.01)
    H01S 3/16      (2006.01)

(52) U.S. Cl.
    CPC ........ *H01S 3/06745* (2013.01); *H01S 3/08045* (2013.01); *H01S 3/09415* (2013.01); *H01S 3/1618* (2013.01); *H01S 2301/03* (2013.01)

(56) References Cited

U.S. PATENT DOCUMENTS

| | | |
|---|---|---|
| 4,072,399 A | 2/1978 | Love |
| 4,179,185 A | 12/1979 | Hawk |
| 4,773,924 A | 9/1988 | Berkey |
| 4,818,062 A | 4/1989 | Scifres et al. |
| 5,011,251 A | 4/1991 | Miller et al. |
| 5,017,206 A | 5/1991 | Miller et al. |
| 5,153,932 A | 10/1992 | Blyler, Jr. et al. |
| 5,239,176 A * | 8/1993 | Stevenson ................ 250/227.25 |
| 5,259,046 A | 11/1993 | DiGiovanni et al. |
| 5,295,210 A | 3/1994 | Nolan et al. |
| 5,295,211 A | 3/1994 | Weidman |
| 5,305,414 A | 4/1994 | Higby et al. |
| 5,408,554 A | 4/1995 | Cryan et al. |
| 5,448,673 A | 9/1995 | Murphy et al. |
| 5,461,692 A | 10/1995 | Nagel |
| 5,568,318 A | 10/1996 | Leger et al. |
| 5,579,422 A | 11/1996 | Head et al. |
| 5,629,997 A | 5/1997 | Hardy |
| 5,664,037 A | 9/1997 | Weidman |
| 5,668,903 A | 9/1997 | Neuberger et al. |
| 5,715,270 A | 2/1998 | Zediker |
| 5,729,643 A | 3/1998 | Hmelar et al. |
| 5,734,766 A | 3/1998 | Flint |
| 5,745,284 A | 4/1998 | Goldberg et al. |
| 5,818,630 A | 10/1998 | Fermann et al. |
| 5,825,803 A | 10/1998 | Labranche |
| 5,864,644 A | 1/1999 | DiGiovanni et al. |
| 5,867,305 A * | 2/1999 | Waarts et al. ............ 359/337.12 |
| 5,873,923 A | 2/1999 | DiGiovanni |
| 5,887,097 A | 3/1999 | Henry et al. |
| 5,935,288 A | 8/1999 | DiGiovanni et al. |
| 5,949,932 A | 9/1999 | Lawrenz-Stolz |
| 6,031,953 A | 2/2000 | Rekow et al. |
| 6,044,096 A | 3/2000 | Wolak et al. |
| 6,078,716 A | 6/2000 | Huang et al. |
| 6,101,199 A | 8/2000 | Wang et al. |
| 6,134,362 A | 10/2000 | Au-Yeung et al. |
| 6,198,858 B1 | 3/2001 | Pan et al. |
| 6,272,268 B1 | 8/2001 | Miller et al. |
| 6,278,816 B1 | 8/2001 | Keur et al. |
| 6,292,608 B1 | 9/2001 | Toh |
| 6,373,868 B1 | 4/2002 | Zhang |
| 6,385,371 B1 | 5/2002 | Li |
| 6,397,636 B1 | 6/2002 | DiGiovanni et al. |
| 6,404,954 B1 | 6/2002 | Zhu et al. |
| 6,421,489 B1 | 7/2002 | Berkey et al. |
| 6,434,295 B1 | 8/2002 | MacCormack et al. |
| 6,434,302 B1 | 8/2002 | Fidric et al. |
| 6,477,295 B1 | 11/2002 | Lang et al. |
| 6,496,301 B1 | 12/2002 | Koplow et al. |
| 6,516,124 B2 | 2/2003 | Po |
| 6,532,244 B1 | 3/2003 | Dewey et al. |
| 6,608,951 B1 | 8/2003 | Goldberg et al. |
| 6,666,590 B2 | 12/2003 | Brosnan |
| 6,668,112 B1 | 12/2003 | Kaneda |
| 6,700,709 B1 | 3/2004 | Fermann |
| 6,731,837 B2 | 5/2004 | Goldberg et al. |
| 6,778,732 B1 | 8/2004 | Fermann |
| 6,816,652 B1 | 11/2004 | Lin et al. |
| 6,868,236 B2 | 3/2005 | Wiltsey et al. |
| 6,907,163 B2 | 6/2005 | Lewis |
| 6,956,876 B1 | 10/2005 | Aquaro et al. |
| 6,970,624 B2 | 11/2005 | DiGiovanni et al. |
| 6,990,278 B2 | 1/2006 | Vakili et al. |
| 7,016,573 B2 | 3/2006 | Dong et al. |
| 7,046,432 B2 | 5/2006 | Starodoumov |
| 7,046,875 B2 | 5/2006 | Gonthier et al. |
| 7,209,615 B2 | 4/2007 | Fishteyn |
| 7,221,822 B2 | 5/2007 | Grudinin et al. |
| 7,236,671 B2 | 6/2007 | Rasmussen |
| 7,272,956 B1 | 9/2007 | Anikitchev et al. |
| 7,327,920 B2 | 2/2008 | Dong et al. |
| 7,336,872 B1 | 2/2008 | Malo |
| 7,420,996 B2 | 9/2008 | Schulte et al. |
| 7,436,868 B2 | 10/2008 | Schulte et al. |
| 7,437,046 B2 | 10/2008 | DiGiovanni et al. |
| 7,443,895 B2 | 10/2008 | Schulte et al. |
| 7,526,165 B2 | 4/2009 | Nielsen et al. |
| 7,532,792 B2 | 5/2009 | Skovgaard et al. |
| 7,539,377 B2 | 5/2009 | Gonthier |
| 7,561,769 B2 | 7/2009 | Fujimoto et al. |
| 7,574,087 B2 | 8/2009 | Inoue et al. |
| 7,586,963 B2 | 9/2009 | Schulte et al. |
| 7,606,452 B2 | 10/2009 | Bilodeau et al. |
| 7,637,126 B2 | 12/2009 | Koeppler et al. |
| 7,729,574 B2 | 6/2010 | Moriarty |
| 7,760,978 B2 | 7/2010 | DiGiovanni et al. |
| 7,787,733 B2 | 8/2010 | DiGiovanni et al. |
| 7,957,432 B2 | 6/2011 | Seo et al. |
| 7,991,255 B2 | 8/2011 | Salokatve |
| 8,068,705 B2 | 11/2011 | Gapontsev et al. |
| 8,213,070 B2 | 7/2012 | Koplow |
| 8,248,688 B2 | 8/2012 | Baird et al. |
| 8,346,038 B2 | 1/2013 | Gonthier |
| 8,433,168 B2 * | 4/2013 | Filippov et al. ................ 385/127 |
| RE44,262 E | 6/2013 | Gonthier et al. |
| 8,457,456 B2 | 6/2013 | Kopp et al. |
| 8,472,765 B2 | 6/2013 | Holland |
| 8,483,533 B1 | 7/2013 | Mehl |
| 8,498,046 B2 | 7/2013 | Dong et al. |
| 8,711,471 B2 | 4/2014 | Liu et al. |
| 2002/0172486 A1 | 11/2002 | Fermann |
| 2003/0031442 A1 | 2/2003 | Siegman |
| 2004/0228593 A1 | 11/2004 | Sun et al. |
| 2005/0008044 A1 * | 1/2005 | Fermann et al. ................ 372/19 |
| 2005/0041702 A1 * | 2/2005 | Fermann et al. ................ 372/25 |
| 2005/0226286 A1 * | 10/2005 | Liu et al. ........................ 372/25 |
| 2005/0265653 A1 | 12/2005 | Cai et al. |
| 2005/0265678 A1 | 12/2005 | Manyam et al. |
| 2007/0062222 A1 | 3/2007 | Janka et al. |
| 2007/0086501 A1 | 4/2007 | Karlsen |
| 2007/0116071 A1 | 5/2007 | Schulte et al. |
| 2007/0116077 A1 | 5/2007 | Farmer et al. |
| 2007/0196062 A1 | 8/2007 | Inoue et al. |
| 2007/0237453 A1 | 10/2007 | Nielsen et al. |
| 2008/0050069 A1 | 2/2008 | Skovgaard et al. |
| 2008/0063348 A1 | 3/2008 | Kumano et al. |
| 2008/0166094 A1 | 7/2008 | Bookbinder et al. |
| 2008/0170823 A1 | 7/2008 | Gonthier |
| 2009/0003788 A1 | 1/2009 | Galvanauskas |
| 2009/0010286 A1 | 1/2009 | Messaddeq et al. |
| 2009/0060417 A1 | 3/2009 | Bilodeau et al. |
| 2009/0092365 A1 | 4/2009 | Donlagic |
| 2009/0136176 A1 | 5/2009 | Kopp et al. |
| 2009/0202204 A1 | 8/2009 | Nielsen et al. |
| 2010/0111118 A1 | 5/2010 | Seo et al. |
| 2010/0142894 A1 | 6/2010 | Gonthier |
| 2010/0247047 A1 | 9/2010 | Filippov et al. |
| 2010/0278486 A1 | 11/2010 | Holland |
| 2011/0032602 A1 | 2/2011 | Rothenberg |
| 2011/0032603 A1 | 2/2011 | Rothenberg |
| 2011/0032604 A1 | 2/2011 | Rothenberg et al. |
| 2011/0058250 A1 | 3/2011 | Liu et al. |

(56) References Cited

U.S. PATENT DOCUMENTS

| | | | |
|---|---|---|---|
| 2011/0069723 A1 | 3/2011 | Dong et al. |
| 2011/0100066 A1 | 5/2011 | Bohme et al. |
| 2011/0157671 A1 | 6/2011 | Koplow |
| 2011/0305250 A1 | 12/2011 | Chann et al. |
| 2012/0127563 A1 | 5/2012 | Farmer et al. |
| 2012/0230352 A1 | 9/2012 | Minelly et al. |
| 2012/0262781 A1 | 10/2012 | Price et al. |
| 2013/0287338 A1 | 10/2013 | Majid et al. |
| 2014/0119694 A1 | 5/2014 | Abedin et al. |

FOREIGN PATENT DOCUMENTS

| | | |
|---|---|---|
| WO | WO 97/42533 | 11/1997 |
| WO | WO 2005/022705 | 3/2005 |
| WO | WO 2009/043968 | 4/2009 |
| WO | WO 2011/066440 | 6/2011 |
| WO | WO 2013/102033 | 7/2013 |

OTHER PUBLICATIONS nLIGHT, spreadsheet listing Order dates for tapers.
International Search Report, PCT/US2012/072003, issued Apr. 4, 2013, 2 pages.
Written opinion, PCT/US2012/072003, issued Mar. 27, 2013, 3 pages.
International Search Report from PCT Publication No. PCT/US2013/077242 (dated May 22, 2014) (2 pages).
International Search Report from PCT Publication No. PCT/US2013/077243 (dated Apr. 17, 2014) (2 pages).
Written Opinion from PCT Publication No. PCT/US2013/077242 (dated May 22, 2014) (4 pages).
Written Opinion from PCT Publication No. PCT/US2013/077243 (dated Apr. 17, 2014) (4 pages).
International Search Report, PCT/US2013/030569, mailed Jul. 4, 2013 (3 pages).
Written Opinion, PCT/US2013/030569, mailed Jul. 4, 2013 (5 pages).
Jauregui et al., "All-Fiber Side Pump Combiner for High Power Fiber Lasers and Amplifiers," Proc. of SPIE, 7580:75801E-1-75801E-8 (2010).
"Pump and Signal Taper for Airclad Fibers Final Report," Air Force Research Laboratory, 8 pages (May 1, 2006).
Geshiro et al., "Truncated parabolic-index fiber with minimum mode dispersion," IEEE Transaction on Microwave Theory and Technology, 26(2):115-119, 1978.
Geshiro et al., "Analysis of wave modes in slab waveguide with truncate parabolic index," IEEE Journal of Quantum Electronics, 10(9):647-649, 1974.
Niels Asger Mortensen, "Air-clad fibers: pump absorption assisted by chaotic wave dynamics?," Optics Express, vol. 15, No. 14, Jul. 9, 2007 (published Jul. 5, 2007).
Eidam et al., "Femtosecond fiber CPA system emitting 830 W average output power," Opt. Lett. 35, 94-96 (2010).
Russbueldt et al., "400 W Yb:YAG Innoslab fs-amplifier," Opt. Express 17, 12230-12245 (2009).
Stolzenburg et al., "Picosecond Regenerative Yb:YAG Thin Disk Amplifier at 200 kHz Repetition Rate and 62 W Output Power," in *Advanced Solid-State Photonics*, OSA Technical Digest Series (CD) (Optical Society of America, 2007), paper MA6 (3 pgs.).

\* cited by examiner

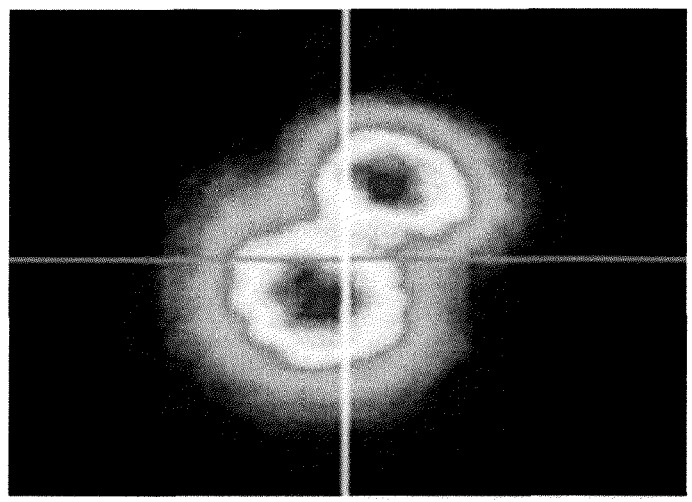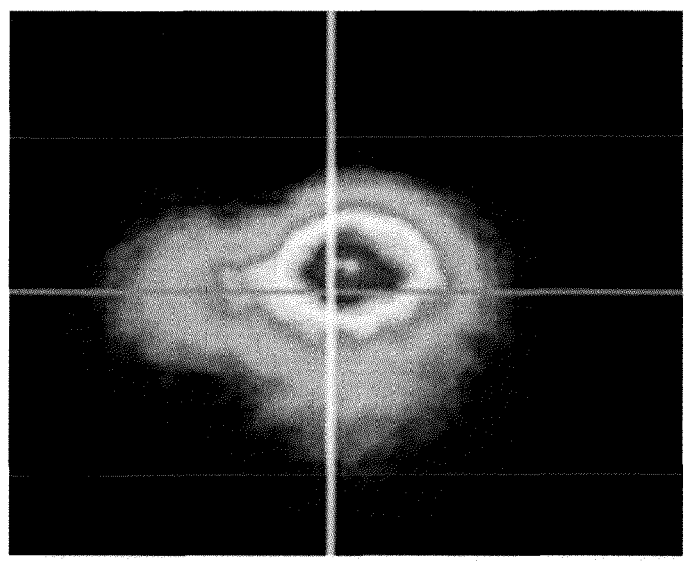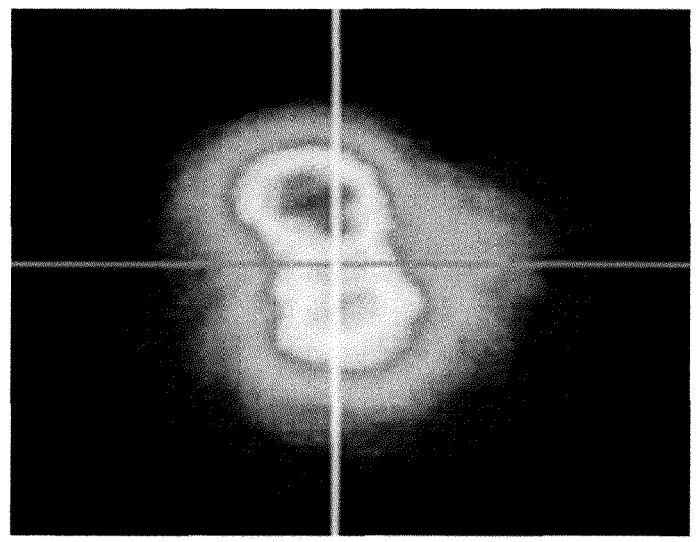
FIG. 3

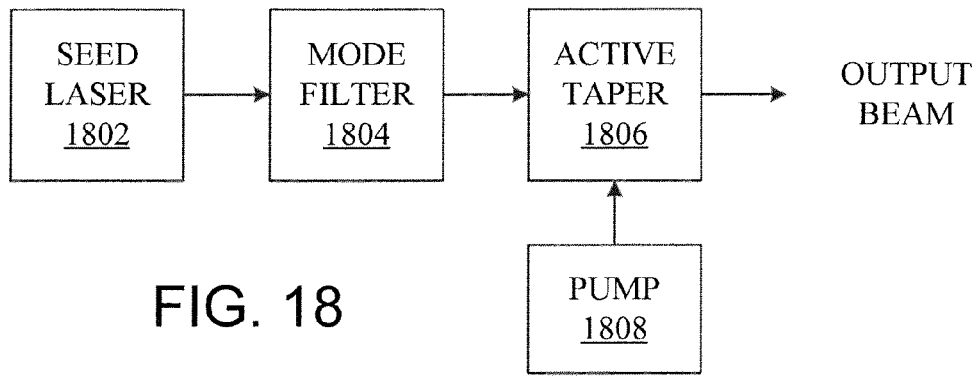
FIG. 18
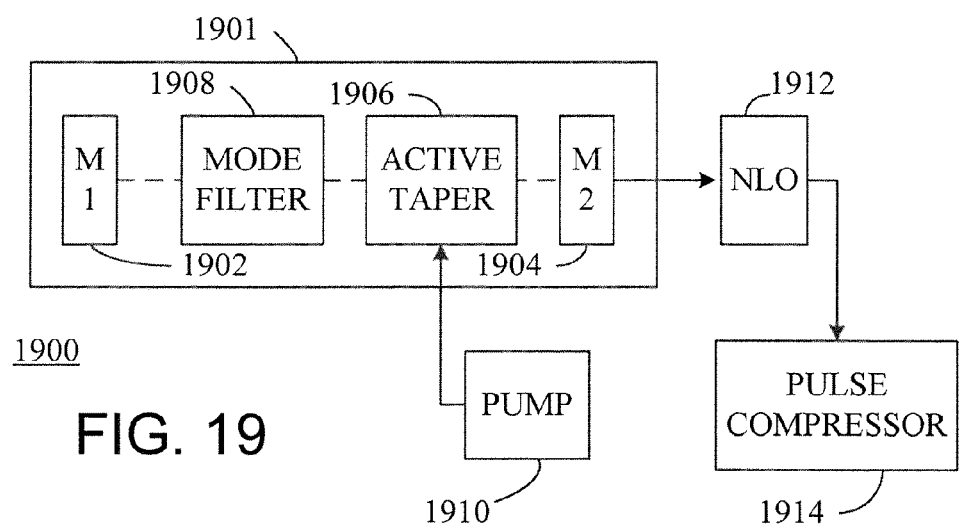
FIG. 19
FIG. 20
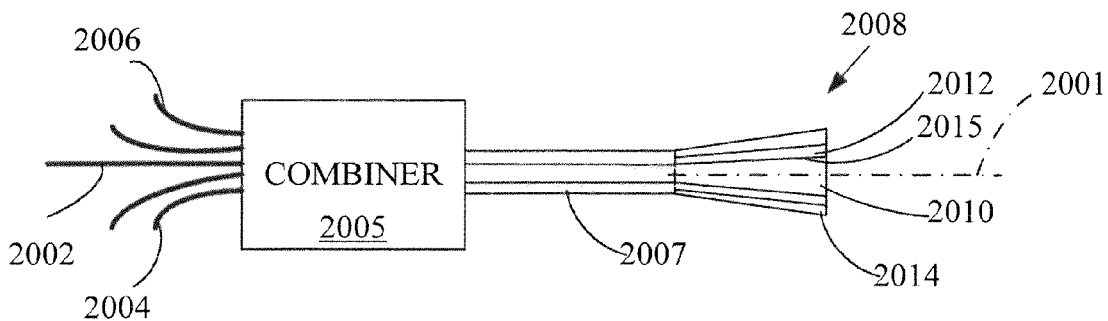

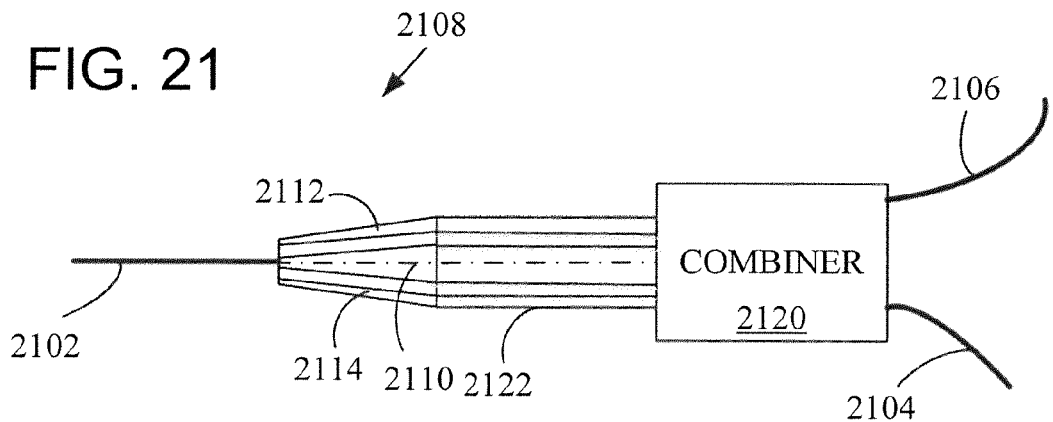
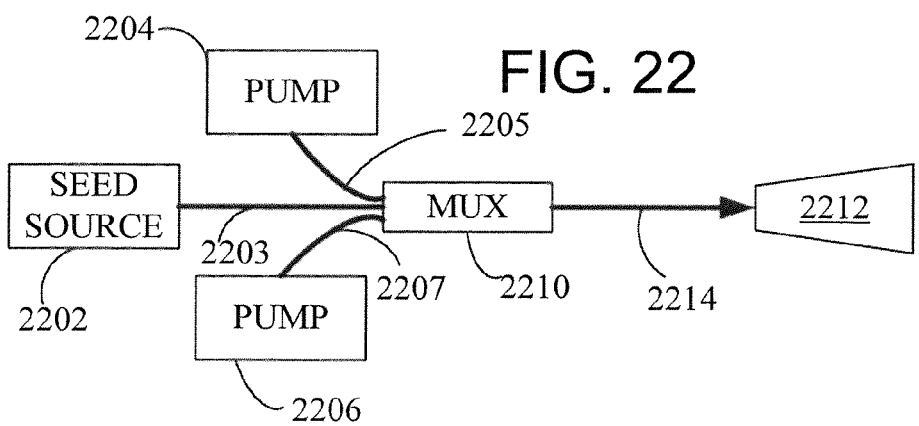
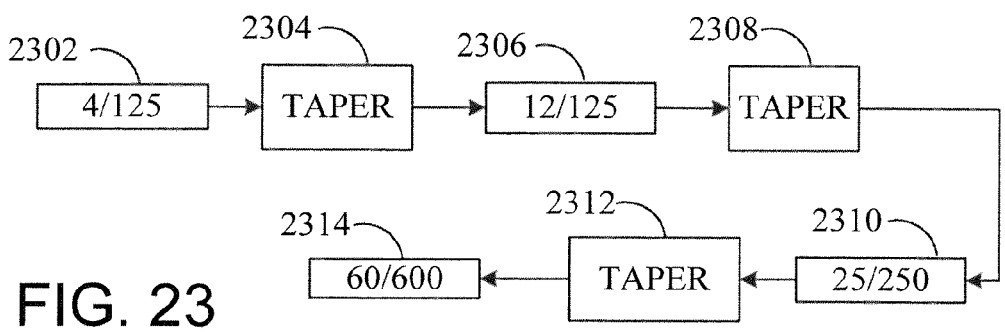

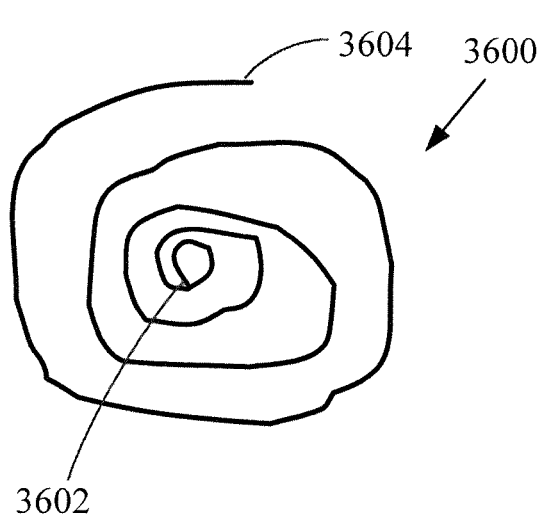
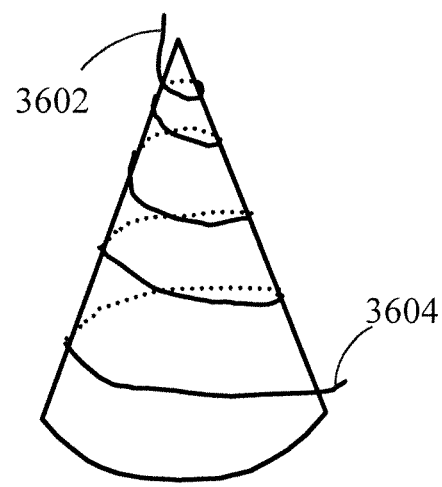
FIG. 36A     FIG. 36B
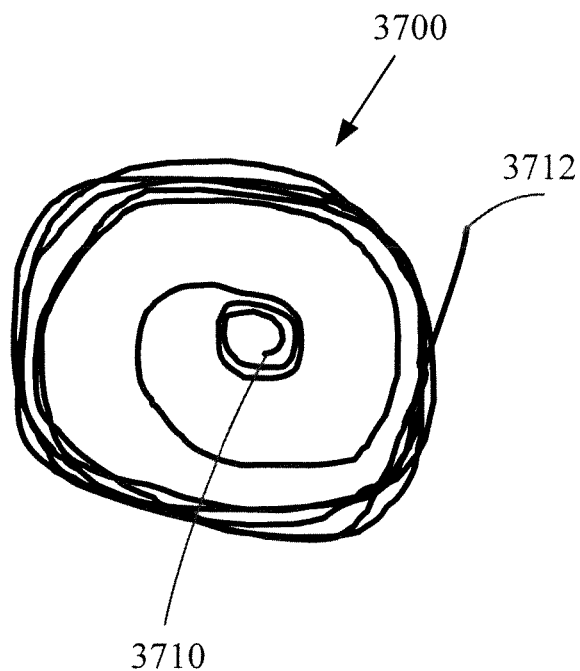
FIG. 37

UV-GREEN CONVERTING FIBER LASER USING ACTIVE TAPERS

CROSS REFERENCE TO RELATED APPLICATION

This application is a continuation-in-part of U.S. patent application Ser. No. 13/339,037, filed Dec. 28, 2011, now U.S. Pat. No. 9,158,070 which is a continuation-in-part of U.S. patent application Ser. No. 12/757,737, filed Apr. 9, 2010, now U.S. Pat. No. 8,711,471 which is a continuation of U.S. patent application Ser. No. 12/545,791, filed Aug. 21, 2009, now abandoned which claims the benefit of U.S. Provisional Patent Application No. 61/090,854, filed Aug. 21, 2008, all of which are incorporated herein by reference.

FIELD

The disclosure pertains to fiber amplifiers, oscillators, and nonlinear optical systems that include tapered waveguides that permit multimode propagation but produce amplification and oscillation in a fundamental mode.

BACKGROUND

Over the past twenty years, rare earth (RE) doped optical fibers have had a tremendous impact on the laser industry. The first application that deployed a significant volume of rare earth doped optical fiber based devices was optical amplification in the telecommunications industry. In this application, optical signals carrying data are sent through single mode fiber typically at a wavelength near 1.5 µm. As these signals propagate over long distances, they are attenuated due to scattering and absorption losses in the transmission fiber. By coupling these transmission fibers to a section of erbium doped fiber that is pumped with a wavelength near 980 nm or 1480 nm, these signals can be amplified back to their original intensity level. These devices are commonly known as erbium doped fiber amplifiers (EDFAs).

When compared with other lasers and optical amplifiers, fiber based devices typically offer higher gain and higher overall efficiency. As the average power levels, pulse energies and peak powers of fiber lasers and fiber amplifiers continue to increase, rare earth doped optical fibers have begun to be used in a far broader range of applications. These applications are found in the medical, industrial, defense, and semiconductor processing industries.

Increasing the average power of fiber lasers can be limited by the brightness of laser diode pumps, the ability to couple power into fiber, and nonlinear effects caused by high optical power. These issues can be effectively addressed using fibers with large core sizes.

The fundamental transverse mode of an optical fiber has very desirable characteristics in terms of beam shape, minimum beam expansion during propagation through free space (often referred to as "diffraction limited" propagation) and optimum focusability. As a result, most applications benefit greatly from single mode, or fundamental mode operation of fiber lasers and amplifiers. As the core size of an optical fiber is increased to enable greater pulse energies and higher peak powers, the fiber begins to support the propagation of more than one transverse optical mode. The number of modes supported by an optical fiber can be roughly calculated by using the fiber's so-called V-number. The V-number of a fiber is defined as $V = 2\pi a NA/\lambda$, wherein $a$ is the radius of the fiber core and NA is the numerical aperture of the core. The number of modes supported by the fiber is then given by roughly one half the square of the V-number. It can be shown that a fiber with a V-number less than about 2.4 supports the propagation of only the fundamental mode.

Prior methods of increasing the peak and average powers of multimode amplifiers are described in Fermann et al., U.S. Pat. No. 5,818,630, which is incorporated herein by reference. A diffraction limited seed source is optically coupled to a multi-mode fiber amplifier. Through the use of a mode-converter, defined as either a set of bulk lenses or a tapered section of fiber, the beam size is changed to match as nearly as possible that of the fundamental mode of the optical fiber. If this is done well and the fiber is not disturbed, this approach can result in near fundamental mode operation of a multi-mode fiber amplifier. However, for the following three reasons, this approach has limited utility in practical applications. First, most seed lasers cannot be effectively coupled into only the fundamental mode of a multimode fiber. Even if the seed laser is a single transverse mode laser, unless the seed laser is a fiber laser, the fundamental mode of the seed laser is not the same as the fundamental mode of an optical fiber. For this reason, even with such a mode converter, higher order modes of the multimode optical fiber will be excited to some extent.

Further, any changes in launch conditions due to, for example, movement or temperature changes can alter coupling of seed power into each of the numerous optical modes of the fiber. This causes corresponding changes in output beam shape and mode quality. In addition, when higher order modes are excited in a multimode fiber, the output beam shape and mode quality is highly sensitive to both micro and macro bends in the fiber. The presence of higher order modes can also result in poor beam pointing stability. Even if a stable package could be developed to prevent changes in micro and macro bending of the fiber during operation, this bend sensitivity makes manufacturing challenging. These limitations largely render this amplifier configuration impractical for most commercial applications when not coupled with other mode control techniques.

In other approaches, such as Koplow et al., U.S. Pat. No. 6,496,301, which is incorporated herein by reference, tightly coiled fibers are used to suppress higher order modes. This approach results in a distributed bend induced loss that strips the power from the higher order modes in the amplifier. The induced loss is a relatively strong function of the spatial order of the fiber mode. For modes that are radially symmetric, the loss is independent of the axis of the coil with higher order modes experiencing higher loss. For modes that are radially asymmetric, the loss is dependent on the axis of the coil. To ensure sufficient loss for all modes, it is therefore sometimes required to coil the fiber about one axis follow by a coil on an axis oriented at 90 degrees with respect to the first one. Amplifiers made in this way can be designed to operate stably in only the fundamental mode.

Unfortunately, there are also other practical limitations associated with this design as well. One limitation is that to strip the higher order modes effectively, loss is also created for the fundamental mode. This distributed loss for the fundamental mode potentially limits the overall efficiency of the fiber amplifier. Another limitation is that as the fiber is bent, the effective mode area of the fundamental beam is reduced. This increases the irradiance of the signal within the fiber and, as described earlier, leads to increased amounts of nonlinear effects. These nonlinear effects ultimately limit the peak power capability of the fiber amplifier.

In view of the above, further improvements in peak and average power of pulsed fiber lasers require an improved waveguide design.

SUMMARY

Disclosed herein are methods, apparatus, and systems that can reduce nonlinearities in high power fiber lasers and amplifiers while preserving optical beam quality. Waveguides such as optical fibers can provide a large mode area with a variable or increasing core size so as to reduce optical intensities, thereby reducing optical nonlinearities. A tapered waveguide such as an optical fiber having a tapered core can be provided with a rare earth or other active dopant. Such an active taper can be configured as part of an optical amplifier that increases optical power of an input beam propagating along an axis of the active taper. The taper of the waveguide can be configured so that optical mode area increases along the taper axis. In this way, optical intensity (power/area or irradiance) increases less rapidly than optical power, thereby tending to reduce the effects of nonlinearities. For example, such an active taper can be used to amplify a seed optical beam that is directed along the axis of the taper. If the amplifier provides a total gain $g(z)$ that is a function of a propagation distance z along the axis of the active taper, for an input seed of power $P_0$, an input mode field diameter of $A(0)$, and an input intensity of $P_0/A(0)$, the amplified power is $P_0 g(z)$ and the amplified intensity is $P_0 g(z)/A(z)$, wherein $A(z)$ is a mode area. Thus, while seed power increase as $g(z)$, seed intensity increases only as $A(0)/A(z)$.

An active taper can be configured to provide a relatively large mode area for a lowest order mode or other mode at both an input and output of the active taper. In some examples, the input defines a few mode fiber. The active taper can include a variable mode core that has a cross-section, diameter or other dimension that can increase, decrease, or otherwise vary arbitrarily, but typical variations are adiabatic. Variable mode cores are cores that can support varying numbers of modes as well as cores that support a fundamental mode at different diameters. Cross-sectional areas or core dimensions can vary according to a variety of functions such as linear, logarithmic, or hyperbolic tangent functions, or an error function. In addition, any non-tapered portions of an active taper prior having relatively small dimensions are preferably short so that a substantial portion of the active taper has a relatively large core size. An active taper can be coupled or spliced to large mode area fibers of compatible optical characteristics. By exciting only the fundamental mode of the low nonlinearity active taper, stable single-mode amplification can be achieved.

Active tapers can be situated for either co-propagation pumping or counter-propagation pumping, or both. Fiber or free space optical components can be built using the low nonlinearity active taper such as active combiner or free space multiplexer to counter pump the amplifier.

The core of the low nonlinearity active taper can also be confined doped in order to achieve better beam quality conservation than that typically of fully doped cores. Confined doping significantly reduces the higher order mode content as such modes tend to have lower gain than the fundamental mode throughout their propagation in the taper. In addition, confined doping can result in better overlap of the fundamental mode with the fiber gain.

In some examples, active tapers include a variable mode core doped with an active rare earth dopant and extending along a taper axis. An inner cladding is situated about the variable mode core, the inner cladding having an average refractive index lower than an effective refractive index of the variable mode core. An outer cladding is situated about the inner cladding, the outer cladding having a refractive index lower than the refractive index of the inner cladding. In typical examples, the variable mode core has a core diameter that changes monotonically or non-monotonically along the taper axis. In representative embodiments, the variable mode core includes an input section in which the variable mode core is a few mode core or a single mode core and an output section in which the variable mode core is a multimode core. In some embodiments, the variable mode core has a core diameter $d_{core}$ that is a function of position along the taper axis, and the dopant in the variable mode core is confined to a diameter that is less than 0.99. 0.95, 0.9, 0.8, 0.6, or 0.5 $d_{core}$ or extends throughout the core. In typical examples, the variable mode core has a first section in which a core diameter increases monotonically, and a second section coupled to the first section in which the variable mode core diameter decreases monotonically, and the first section and the second section are adjacent. In additional examples, a smallest core diameter of the first section is adjacent a smallest core diameter of the second section.

In representative active tapers, a ratio of a diameter of the variable mode core to a diameter of the inner cladding and the outer cladding is constant along the taper axis. In particular examples, at least one of the inner cladding and the outer cladding has a variable refractive index so as to decrease an effective refractive index of the variable mode core. In other examples, at least two stress elements such as stress rods are configured to produce birefringence in the variable mode core. In other alternatives, the variable mode core and the inner and outer claddings have circular cross sections, or the variable mode core is a birefringent variable mode core. Some example active tapers include an outer layer of a polymer or metal on the outer cladding. In other examples, the outer cladding has a polygonal or D-shaped cross section.

Optical amplifiers comprise an active taper that includes a rare earth doped, variable mode core surrounded by at least an inner cladding. An optical pump is situated so as to direct pump optical radiation to at least a rare earth doped portion of the variable mode core. A mode filter is coupled to the active taper, and situated so as to receive an input optical signal and deliver a mode filtered optical signal to the variable mode core. In some embodiments, the active taper includes an outer cladding about the inner cladding, and the variable mode core and the inner and outer claddings have circular cross-sections. In representative examples, at least a portion of the pump radiation is coupled to the rare earth doped portion of the core from the inner cladding, and the optical pump includes at least one semiconductor laser, a fiber laser, or other laser. Typically, the variable mode core has a few mode portion situated so as to receive the mode filtered optical signal, and the mode filtered optical output has a mode profile corresponding to a mode profile associated with a few mode portion. In some examples, the rare earth dopant in the variable mode core is confined to a diameter of less than 0.8 times the variable mode core diameter. In other examples, the active taper is a polarization dependent active taper. In alternative embodiments, the polarization dependent active taper includes at least one of an elliptical variable mode core or the inner cladding includes at least two stress elements configured to produce birefringence in the variable mode core. In other examples, the variable mode core has a monotonically increasing core diameter along the axis. In other examples, a cladding is situated about the variable mode core having a refractive index profile selected to decrease the effective refractive index of the variable mode core.

Fiber amplifiers that include active tapers can be used as high-power pulsed laser seed sources for solid state amplifiers such as thin disk Yb:YAG lasers. Multi-stage optical amplifiers include an active taper amplifier and a solid state amplifier. The active taper amplifier provides a first stage of amplification while the solid state amplifier provides a second stage of amplification. Active taper amplifiers can be pumped with either counter-propagating pump radiation or co-propagating pump radiation, or both. The active taper amplifier can be polarization maintaining. Active taper amplifiers in pulsed laser configurations can, in some instances, produce peak and average powers that are higher than conventional fiber amplifiers for beams having a same value for $M^2$. In some examples, a non-linear optical element and/or a pulse compressor is situated to receive an optical output from the fiber amplifier. In other examples, active taper fiber amplifiers include a mode filter configured to filter a seed beam before it is received by the active taper fiber.

Fiber amplifiers that include active tapers can be included in nonlinear converting fiber laser systems that provide nonlinear frequency conversions. Such lasers can generate various optical harmonics of seed radiation. In typical examples, infrared seed radiation is converted to visible wavelengths (e.g., green) and/or ultraviolet wavelengths. Such lasers can generate ultraviolet and/or green radiation from seed infrared light. Such fiber laser systems include a seed laser, an active taper, and nonlinear optics including at least a nonlinear crystal. A seed laser can be configured to produce linearly polarized light, and nonlinear converting fiber lasers can also include optics for adjusting polarization of the light to align the seed beam with an axis of the nonlinear crystal. Other components such as pulse compressors, focusing optics, collimating optics, mirrors, mode filters, and additional stages of amplification and/or nonlinear conversion can also be included.

These and other features and advantages of the disclosed technology will be apparent from the following detailed description and the accompanying drawings.

BRIEF DESCRIPTION OF THE DRAWINGS

FIG. 3 shows the instability of the spatial profile of the output mode of a seed laser coupled directly into a multimode optical fiber.

FIG. 18 is a schematic diagram of a representative optical amplifier that includes a variable mode active taper.

FIG. 19 is a schematic diagram of a representative laser system that includes a variable mode active core.

FIG. 20 is a sectional view of an active taper configured for co-propagating pump radiation.

FIG. 21 is a sectional view of an active taper configured for counter-propagating pump radiation.

FIG. 22 is a schematic diagram of an active taper configured to be coupled to pump and seed optical beams with a fiber multiplexer or other combiner.

FIG. 23 is a schematic diagram of a representative arrangement of fiber sections coupled by active tapers.

FIGS. 36A and 36B illustrate exemplary spiral and cone shaped active taper coils.

FIG. 37 illustrates another exemplary spiral shaped active taper coil.

DETAILED DESCRIPTION

Figure 1:
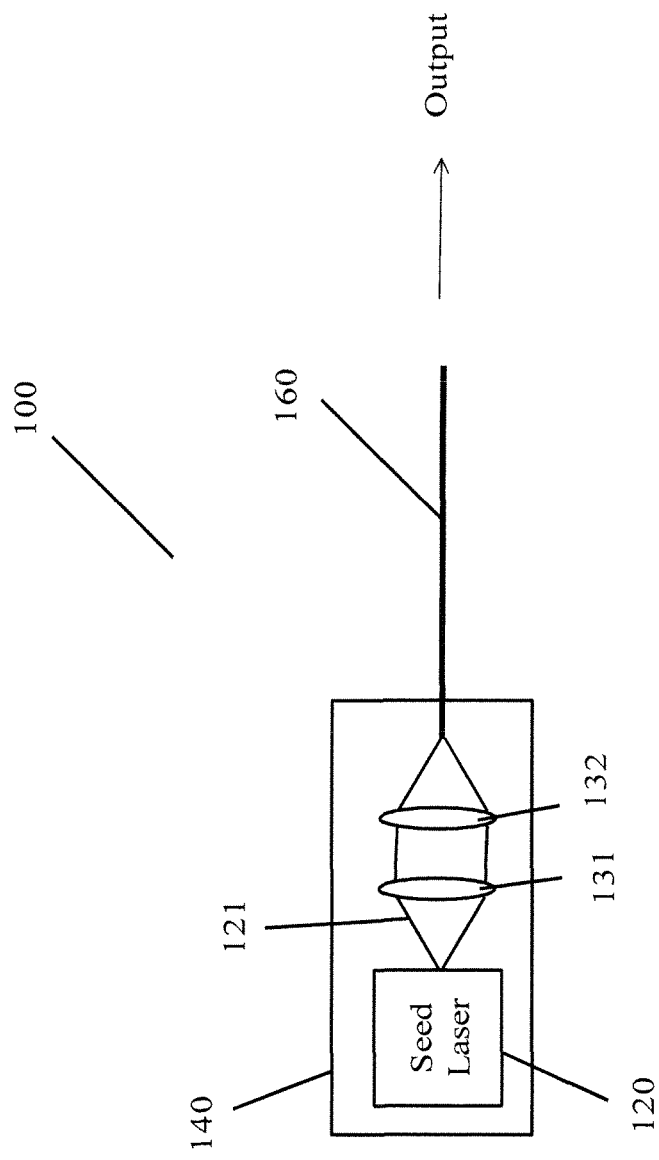
FIG. 1 is a schematic of a representative seed laser coupled to an optical fiber.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Propagation in circularly symmetric dielectric optical waveguides such as optical fibers is described in some representative examples. Fibers are generally based on refractive index differences between a fiber core and one or more fiber claddings. In some examples, double or triple clad fibers can be used, in which a single mode (or few mode) core is situated within an inner clad, and one or more outer claddings. However, other waveguides can be used such as hollow waveguides or photonic crystal waveguides, and waveguides need not be symmetric. In some examples, polarization maintaining optical fibers can be used which typically are asymmetric in order to maintain polarization of input optical signals.

For convenience, propagation in an optical fiber or other flexible waveguide is described with reference to a propagation axis that follows waveguide curvature, and need not be a straight line axis. As used herein, a variable mode core refers to a core of a waveguide such as an optical fiber that is configured to support different numbers of propagating modes along an axis of the waveguide. For example, a variable mode core can vary so as to be a single mode core, a few mode core, or a variable mode core as a function of position. A variable mode core (or a cladding) can be doped with an active dopant such as a rare earth element. For example, one or more of holmium, bismuth, erbium, ytterbium, neodymium, dysprosium, praseodymium, and thulium can be used as a dopant. Dopant can be provided throughout a core or cladding or can be confined to a particular portion of the core or cladding. As used herein, a confined doping refers to a core doping with active ions within a portion of a core that is less than the full core diameter or effective cross-sectional area, and typically restricted to a volume defined by a diameter or effective diameter that is less than about 0.2, 0.4, 0.5, 0.75, 0.8, 0.9, 0.95, or 0.99 times the core diameter or core effective diameter. In some examples, active ion dopant extends throughout the core. For convenience, an effective diameter is a diameter associated with a circular cross-section having the same area as the core cross-sectional area. As used herein, pump radiation is optical radiation at wavelengths suitable to produce optical gain in a doped core and seed radiation is radiation at wavelength within a gain bandwidth of a pumped, doped core. Waveguides are generally described herein with reference to optical fibers having circular cross-sections, but arcuate, elliptical, polygonal, D-shaped, or other cross-sections can be used. In addition, a cross-section of a cladding can have such cross-sections as well.

Fibers that support a few modes are used and are referred to herein as "few mode" fibers. Such fibers have a normalized frequency parameter (V-number) defined as $V=(2\pi\alpha/\lambda)(n_{core}^2-n_{clad}^2)^{1/2}$, wherein $\lambda$ is vacuum wavelength, $\alpha$ is a fiber core radius, and $n_{core}$, $n_{clad}$ are fiber core and fiber cladding refractive indices, respectively. A total number M of modes supported by a fiber is $M=4V^2/\pi^2$. For single mode fibers, V is less than about 2.405. As used herein, a few mode fiber is defined as a fiber for which a V-number is less than about 2.5, 3, 3.5, 4, 4.5, 5, 7.5, 10 or 20, and in typical examples, few mode fibers have 30 or fewer modes. In other examples, multimode fibers can be used. Typically core diameters for single mode fibers range from about 2 to 100 μm, about 3 to 25 μm, or about 5 to 12 μm, and cladding diameters range from about 25 to about 1000 μm. In some examples, fibers are based on a step in refractive index between a core and a cladding. In other examples, fibers are defined by providing air holes (typically arranged in an array) in a dielectric material to form so-called photonic crystal fibers. Using holes in this way permits small refractive index differences, permitting single mode fibers to have large mode field diameters. Tapers and active tapers can be provided in these and other types of waveguides.

In some examples, so-called double clad and/or double core fibers are used. A double clad fiber typically includes a core, an inner cladding, and an outer cladding. The core is typically selected to define a single mode (or few mode) waveguide, while the inner cladding defines a multimode core. Generally, a refractive index difference between the inner cladding and the outer cladding is relatively large so that a numerical aperture of the multimode waveguide defined by the inner and outer claddings can be large. A double core fiber typically includes a first (inner) core, a second (outer) core, and an outer cladding. The first core is selected to define a single mode (or few mode) waveguide prior to any tapering. The second core is selected to define a single mode (or few mode) waveguide after tapering. Generally refractive index differences between first core, second core, and outer cladding are relatively small. In other examples, triple clad fibers are used having a glass or silica outermost cladding to provide superior operation at elevated temperatures.

As defined herein, a tapered core is a core of an optical fiber or other waveguide extending along a propagation axis and having a variable cross section along the axis. A tapered core can have a monotonically increasing or decreasing core cross-section or other dimension. In some examples, tapered cores permit propagation of one, a few, or many optical modes at different locations along the tapered core. As used herein, an effective tapered core refers to a core of an optical fiber or other waveguide in which a cladding dimension or cladding refractive index varies so as to produce an associated variation of modes that propagate in the core. In addition, an effective tapered core also refers to a core in which a core refractive index varies so as to produce an associated variation of modes that propagate in the core. An outside diameter of a fiber or other waveguide that includes a tapered core can be constant or variable, and can have a similar or different cross section than a core or cladding.

A taper length is generally selected based on pump radiation absorption as determined by core to cladding area ratio, dopant concentration, and absorption cross section at a pump wavelength of interest. In general, a higher dopant concentration yields increased pump absorption, permitting shorter tapers to be used. Taper lengths are generally within the range of about 1 to 10 meters, however tapers can be less than 1 meters. In some examples, tapers have lengths of about 1.5, 2, 2.5, 3, 3.5, 4, or 4.5 meters. Dopant concentrations are generally selected to provide absorption of pump radiation that can be characterized by loss per unit length. Typical values are between about 1 dB/m and 1200 dB/m for pump radiation at or near an absorption maximum associated with a particular dopant for light injected into the doped core. In some examples, dopant concentrations cause absorption of injected light at 976 nm between about 100 and 500 dB/m, about 300 and 700 dB/m, or about 700 and 1200 dB/m. Dopant concentration can be controlled using various methods known in the art, such as chemical vapor deposition or direct nanoparticle deposition. Pump radiation is typically directed into one or more claddings and then coupled to and absorbed in a doped core. In general, active tapers can be used in place of non-tapered multimode rare earth doped fibers, for example in multimode fiber amplifiers described herein.

In some disclosed examples, active tapers are of one piece, monolithic construction such by drawing a taper precursor or preform. Active tapers can also be formed by splicing or otherwise connecting one or more fibers or fiber tapers.

While some examples are described with reference to optical fibers, other waveguides such as planar waveguides can be similarly arranged. Because optical fiber technology is well known, examples based on optical fibers can be convenient. In some examples, optical amplifiers can be waveguide or fiber-based optical amplifiers. As will be appreciated, a laser can include an optical amplifier and a feedback device such as a fiber Bragg grating.

In addition, while bends are typically circular they can also be elliptical, parabolic, hyperbolic, ovoid, or other shapes. Bends can be continuous, or be based on a series of stepwise bends, or combinations of steps and curves. Further the radii or axes of curvature can vary along a fiber length, and can be a continuous or discontinuous function of fiber axial coordinate (z). While the term "bend radius" is used herein, such a bend radius need not refer to a circular radius but generally refers to a local curvature or an approximation to a local curvature. As used herein, a compound fiber curvature refers to a fiber curvature about continuously or step-wise varying axes of curvature, wherein the axes of curvature are not collinear. The variations in the axes of curvature are such that a fiber does not form a complete loop about a fixed axis before a direction of the axis is changed. Curvature magnitudes can be constant or varying.

In some examples, the core of multimode optical fibers, multimode mode filter fibers, and/or tapers are polarization-maintaining using any technique known in the art, such as an elliptical core, an elliptical optical cladding, a panda or bow-tie configuration, or a D-shaped section.

As described herein, a seed light source can be any diode pumped solid state laser, micro-chip laser, actively or passively q-switched laser, diode laser, mode-locked laser, gain-switched laser, fiber laser, or combination of one or more thereof. Light sources can be operated with a continuous wave output or with a pulsed output or a wavelength chirped pulse output. In some examples, the light source has a polarized output. The seed laser can produce pulses having durations in a range of about 1 femtosecond to 50 femtoseconds, about 30 femtoseconds to 30 picoseconds, about 0.1 to 1 nanosecond, about 1 nanosecond to 20 nanoseconds, about 10 to 500 nanoseconds, about 1 to 500 picoseconds, about 10 picoseconds to 1 nanosecond, or about 0.5 nanoseconds to 100 nanoseconds. In general, a particular pulse duration may be selected based on the desired application for the output of systems described herein, or it may be selected based on seed laser cost. A pulse compressor can be used to reduce pulse with even further, such as to provide pulses having durations in the picosecond and femtosecond range.

Representative Fiber Coupled Seed Lasers and Mode Filters

In some examples, doped multimode optical fiber is used to amplify light. In a first embodiment shown in FIG. 1, a fiber coupled seed laser 100 comprises a seed laser 120 that has an output beam 121 that is optically coupled to an output fiber 160. This optical coupling can be done with any number of known optical systems, for example a first collimating lens 131 and a second fiber coupling lens 132. All of these components can then, in some implementations, be affixed within a common package 140.

Figure 2:
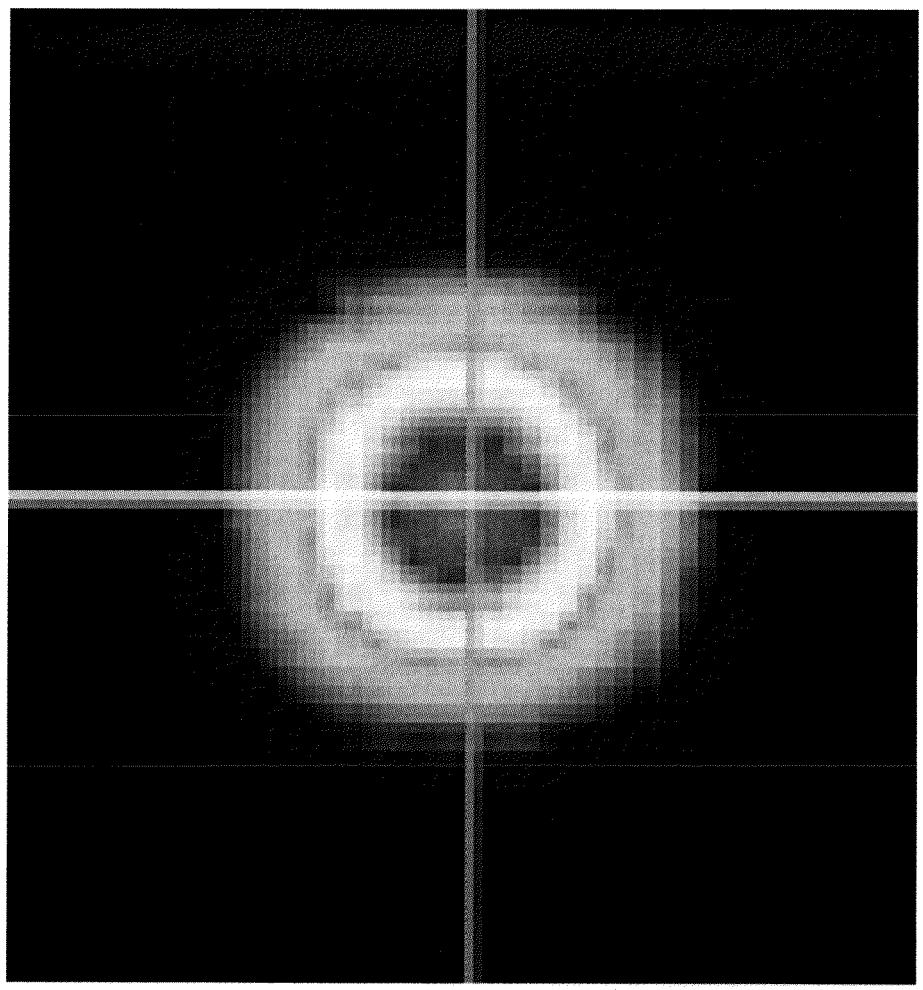
FIG. 2 shows the direct output spatial profile of the seed laser of FIG. 1.

A seed laser is generally used as one of the light sources for amplifiers described herein. An image of the output beam of a diode pumped fiber coupled solid state seed laser is shown in FIG. 2. As can be seen, the beam has a very nearly Gaussian shape. Measurements of the beam quality show the output to be less than 1.1 times diffraction limited. This diode pumped laser was used to assemble a particular embodiment of the fiber coupled seed laser 100. In this case, the laser was coupled to an output fiber 160 with a core diameter of 25 microns and a numerical aperture of 0.07. While it was found that a majority of the output power from the seed laser 120 could be coupled into the fundamental mode of the output fiber 160, some power was always coupled into higher order modes as well. Further, the distribution of power in the various fiber modes was not stable. For example, simply touching the fiber resulted in radical changes in the amount of power in each mode. To show this effect, the output fiber 160 was cleaved and the beam transmitted through output fiber 160 was imaged with a camera. FIG. 3 shows some of the variations that occur when the output fiber experiences slight mechanical disturbances. When this fiber is connected directly to a multimode amplifier fiber, or other fiber amplifier system, the same variations are seen at the output of the amplifier limiting the utility of the system.

Figure 4:
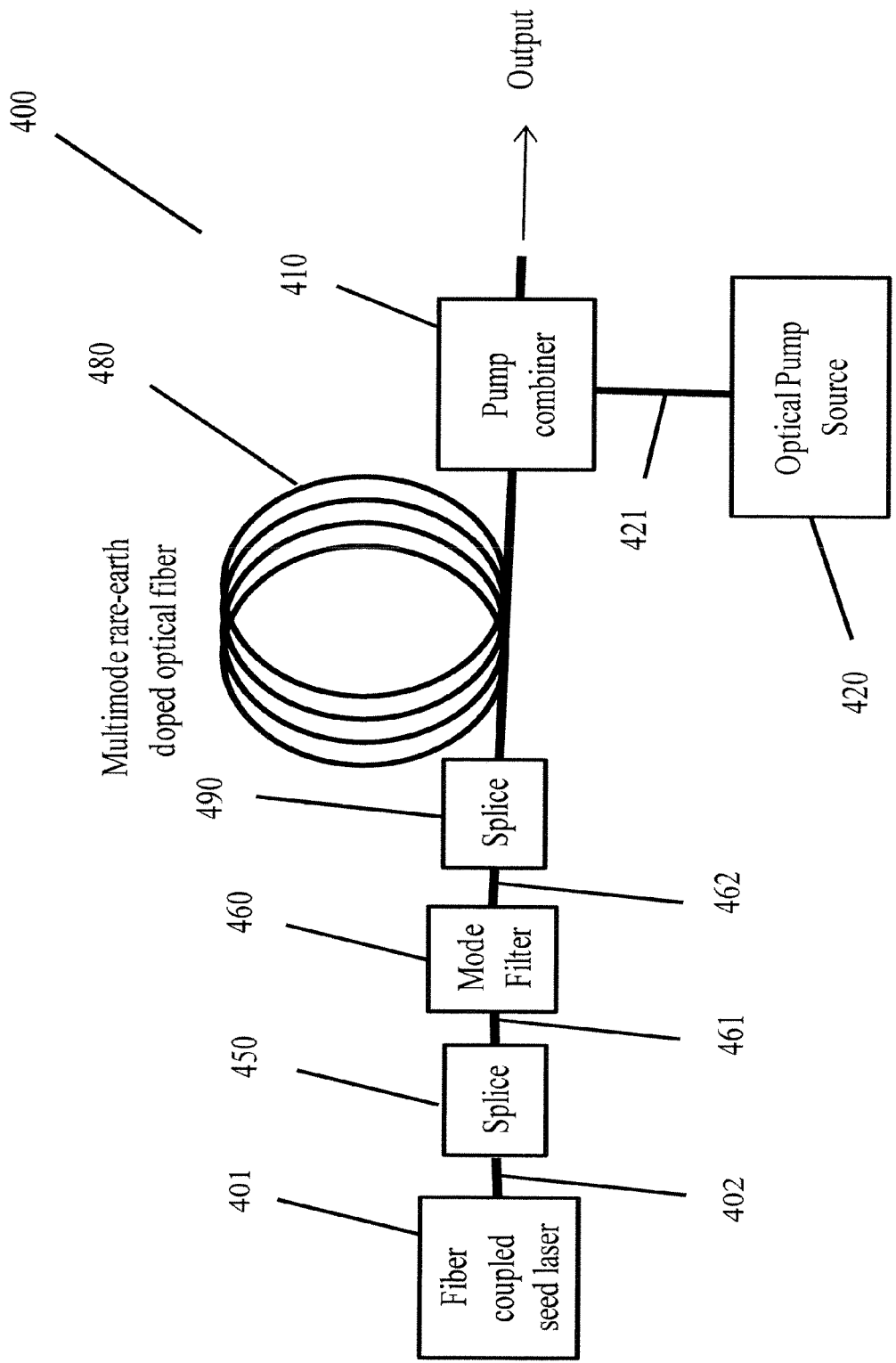
FIG. 4 shows a schematic of an embodiment of a multimode fiber amplifier.

One approach to reducing these variations is to use a mode filter described herein. Representative mode filters are illustrated in FIGS. 5A-7 and 13 and are described below. An example implementation that includes a mode filter such as those described herein is shown in FIG. 4. An exemplary fiber amplifier 400 includes a fiber coupled seed laser 401 that produces an output beam coupled to an output fiber 402. A mode filter 460 operates to strip optical power from higher order modes of an input multimode fiber 461 to produce an output into an output multimode fiber 462 that exhibits reduced variations in spatial power distributions. Consequently, the output of the fiber amplifier 400 also exhibits reduced variations.

Figure 5A:
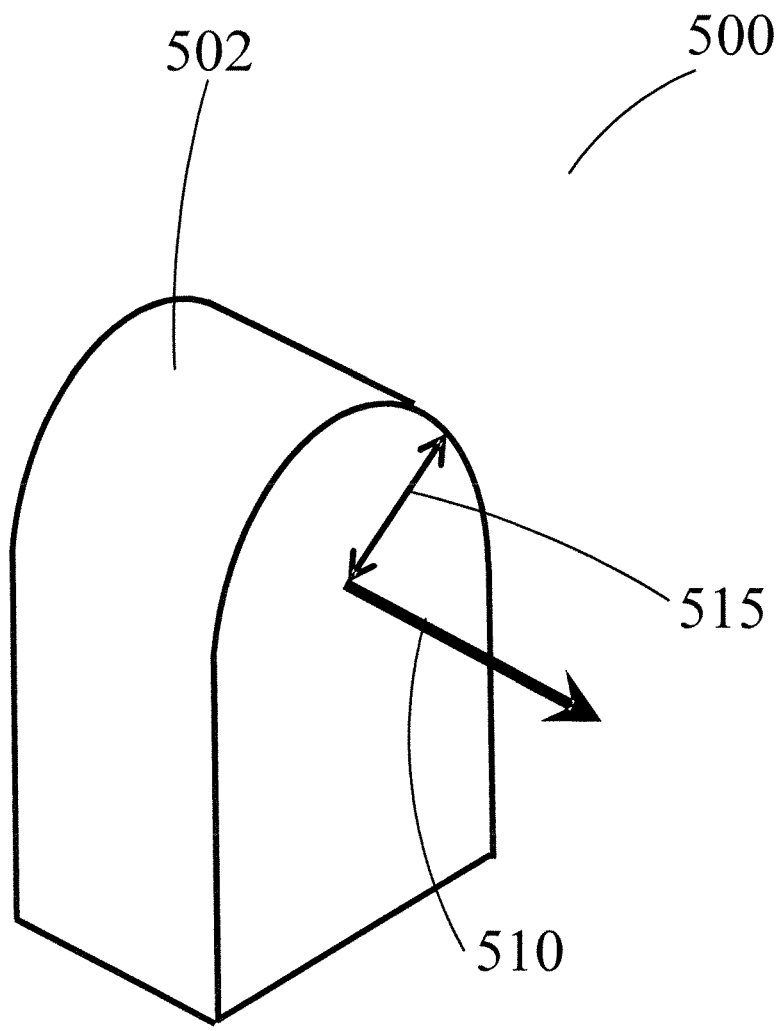
FIG. 5A shows a support member in accordance with embodiments described herein of a mode filter.
Figure 5B:
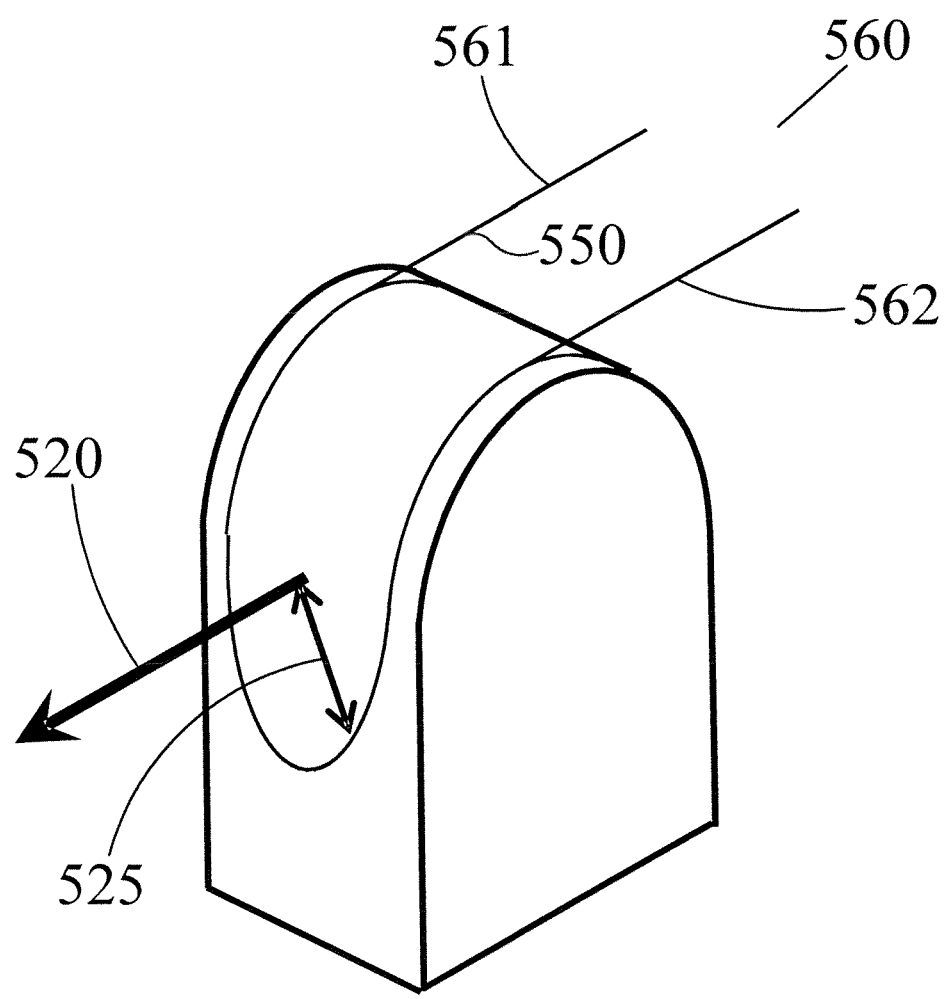
FIG. 5B shows an embodiment of a mode filtering winding path supported by the support member shown in FIG. 5A.

FIGS. 5A and 5B show additional embodiments of a mode filter 560. Here the multimode fiber is wound on a path that has more than one axis. In one such multi-axial fiber winding geometry, multimode optical fiber is packaged on surface 502 of a support member 500. The upper part of the surface 502 has a radius of curvature 515 about axis 510. A continuous length of a multimode optical fiber 550 comprising a multimode input fiber portion 561 and a multimode output fiber portion 562 is attached to surface 502. When the fiber 560 is looped around on a vertical portion of the surface 502, it has a radius 525 about axis 520. The axes 510 and 520 are advantageously chosen to be perpendicular to one another. In this way a reasonably continuous loss is presented to all higher order modes. The length of multimode fiber and radii of curvature are chosen to substantially strip the power from all the higher order modes leaving only the fundamental mode of the multimode output fiber 562 excited. While bend axes can be selected based on modes to be attenuated, bend curvature can be constant or can vary based on fiber core diameter and numerical aperture.

Figure 6A:
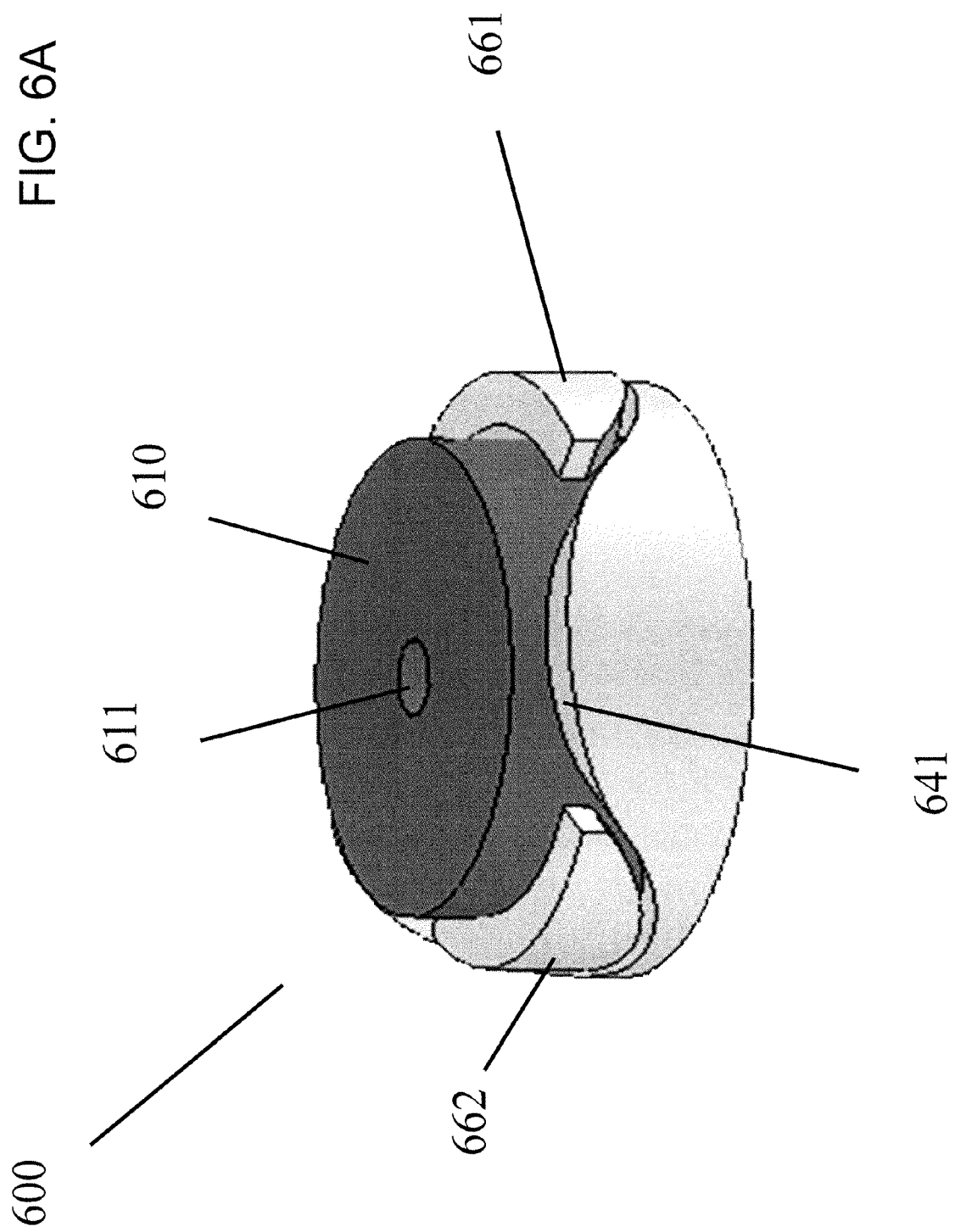
FIGS. 6A-6B shows another example embodiment of a support member and mode filtering winding path.
Figure 6B:
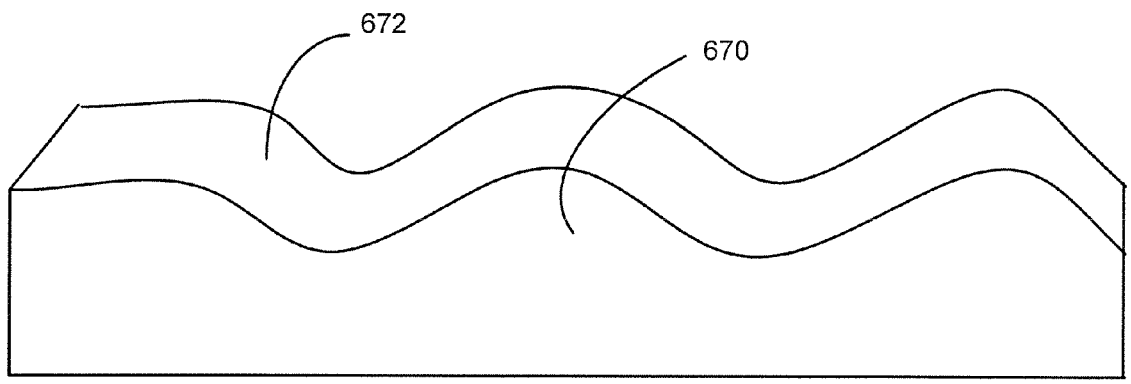

A mode filter such as the mode filter 460 can also be fabricated using a support member 610 as shown in FIGS. 6A-6B. The support member 610 includes a central hole 611 that can be helpful in further packaging. The support member 610 begins as a cylinder with an axis of symmetry parallel with the hole 611. A surface 641 is subsequently machined and is also the surface onto which the multimode fiber is attached. In this case, the fiber is continuously wound around the axis parallel with the hole 611, but also experiences curvature along two axes that are perpendicular, or nearly perpendicular, to the axis parallel with the hole 611. Additionally, mechanical members 661 and 662 can be used to help hold the round fiber in place.

The mode filter of FIG. 6A can be formed by applying a tapered outer layer to a surface of a cylinder. A typical example is shown in FIG. 6B, in which a tapered layer 670 has a length selected so as to extend around a cylindrical surface. As shown in FIG. 6B, the layer includes an approximately sinusoidal or other smoothly curved surface 672. In use, the layer 670 is secured to a surface of a cylinder and fiber is wrapped about the cylinder so as to follow the curved surface 672. As noted above, a complementary piece can be made and secured to the cylinder to retain the wrapped fiber in position against the curved surface 672. Alternatively, the curve 672 can be defined as a groove in a surface of a cylinder or cone. For convenience, the surface 672 and similar surfaces that define curvatures that are orthogonal to the curvature of the cylindrical surface on which or to which the surface is secured are referred to as peripheral curved surfaces.

Figure 7:
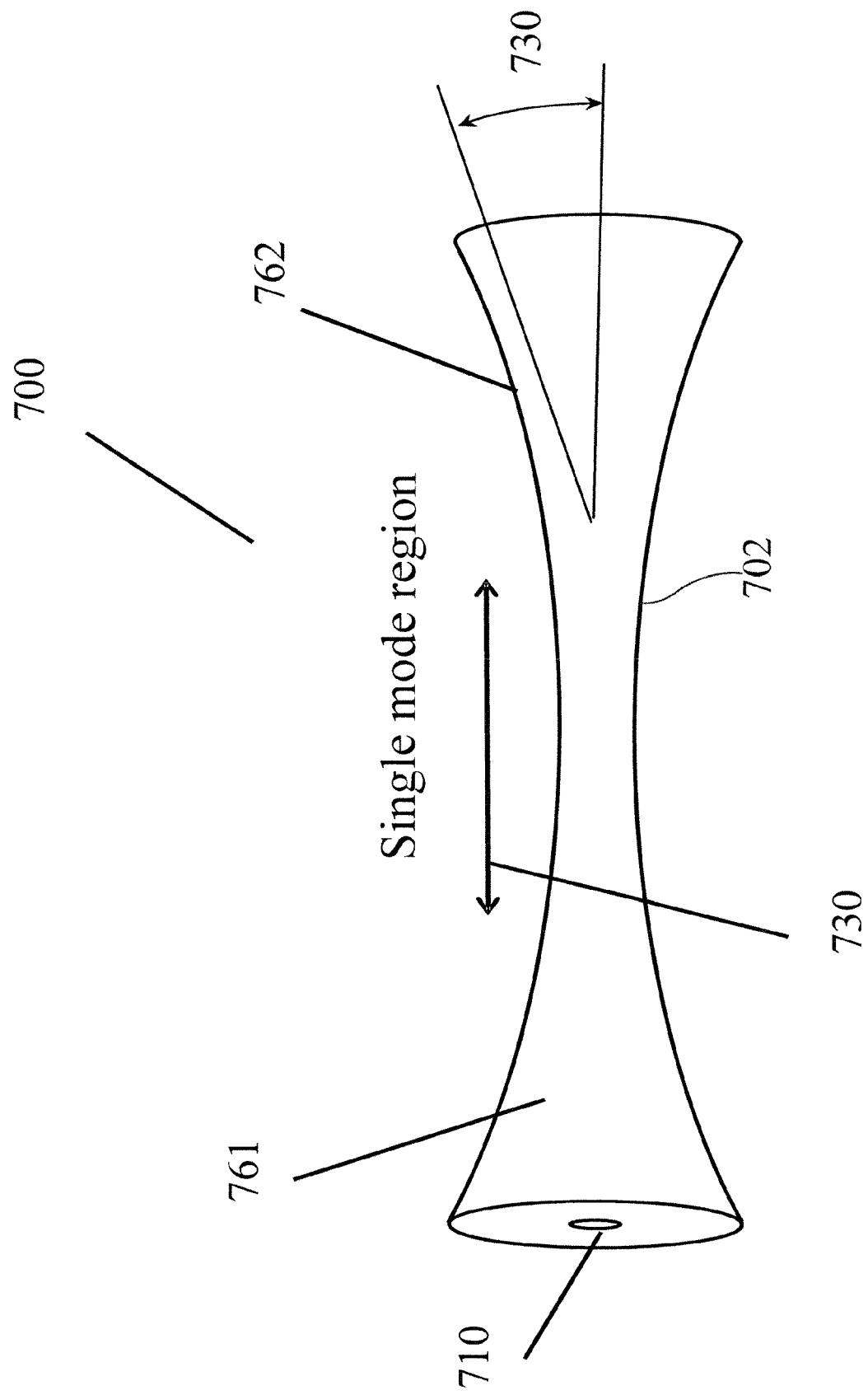
FIG. 7 shows another embodiment of a mode filtering arrangement.

In yet another embodiment of a mode filter such as the mode filter 460, a taper based on multimode fiber can be provided as shown in FIG. 7. For example, a mode filter 700 can be a single clad, passive optical fiber 702 with a taper, where an input side 761 and an output side 762 of the fiber are multimode and the central portion of the fiber is tapered down to reduce the diameter of the core. In the embodiment of FIG. 7, the fiber 702 is a continuous length of multimode optical fiber that includes a multimode input fiber portion 761 and multimode output fiber portion 762 that is tapered such that the diameter of a fiber core 710 is at a minimum in the center of the taper. In other examples, the minimum fiber core diameter is at some other location in the taper. The taper is advantageously done such that over a distance 730 about the taper center the V-number of the core is under 2.4 such propagation of only the fundamental mode is supported. The distance 730 is chosen to be sufficiently long to allow all higher order mode content to be filtered out or at least sufficiently attenuated. A taper angle of the taper 730 is chosen such that the beam expansion along the multimode output fiber portion 762 is substantially adiabatic and no higher order modes are excited. The taper 730 can be fabricated with any of numerous known approaches, such as with a variable speed draw tower. The diameter of a multimode fiber is inversely proportional to and decreases with increasing draw speed. Therefore by using a draw process with a variable speed, any desired taper angle, or core size 710 as a function of length can be realized.

Mode filters based on fiber bending such as illustrated in FIGS. 5A-5B and FIGS. 6A-6B can also incorporate fiber tapers. If tapers are included, fiber bend radii can vary along fiber length based on local core diameter. For example, the bend radius 525 shown in FIG. 5B can vary along a fiber length. The mode filter of FIGS. 6A-6B can also be configured so that varying radii of curvature are provided with a conical or other taper. The groove 641 can be based on a varying curvature, and matched, if desired, to a local core diameter in a fiber taper. Typically, bend-induced mode filtering is not provided for fiber regions associated with single mode or few mode core diameters.

Figure 13:
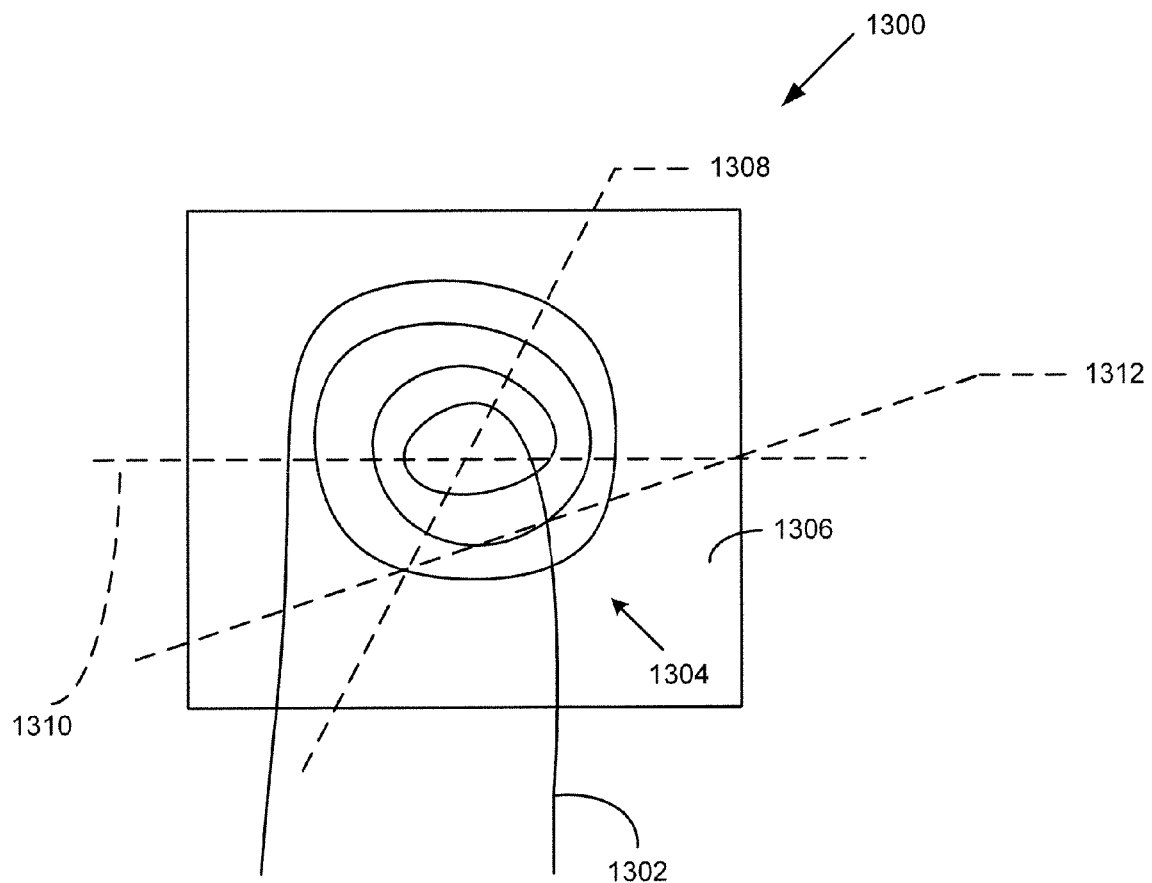
FIG. 13 illustrates another representative mode filter.

FIG. 13 illustrates another embodiment of a mode filter 1300 that includes a fiber 1302 that is shaped so as to define a fiber spiral 1304 on a flexible substrate 1306. Typically, the flexible substrate 1306 is planar (such as a sheet of paper), but curved substrates can be used as well. The spiral 1304 is generally either temporarily or permanently secured to the flexible substrate 1306. In order to provide a compound curvature, the mode filter 1300 can be folded, partially folded, or bent along an axis (such as axes 1308, 1310, 1312). In some examples, the flexible substrate 1306 is partially wrapped about a cylinder, or applied to another planar or non-planar surface. In other examples, the fiber 1302 is shaped so as to define one or more loops, arcs, ellipses or other curves or parts of curves, or serpentines on the flexible substrate 1306.

Figure 8:
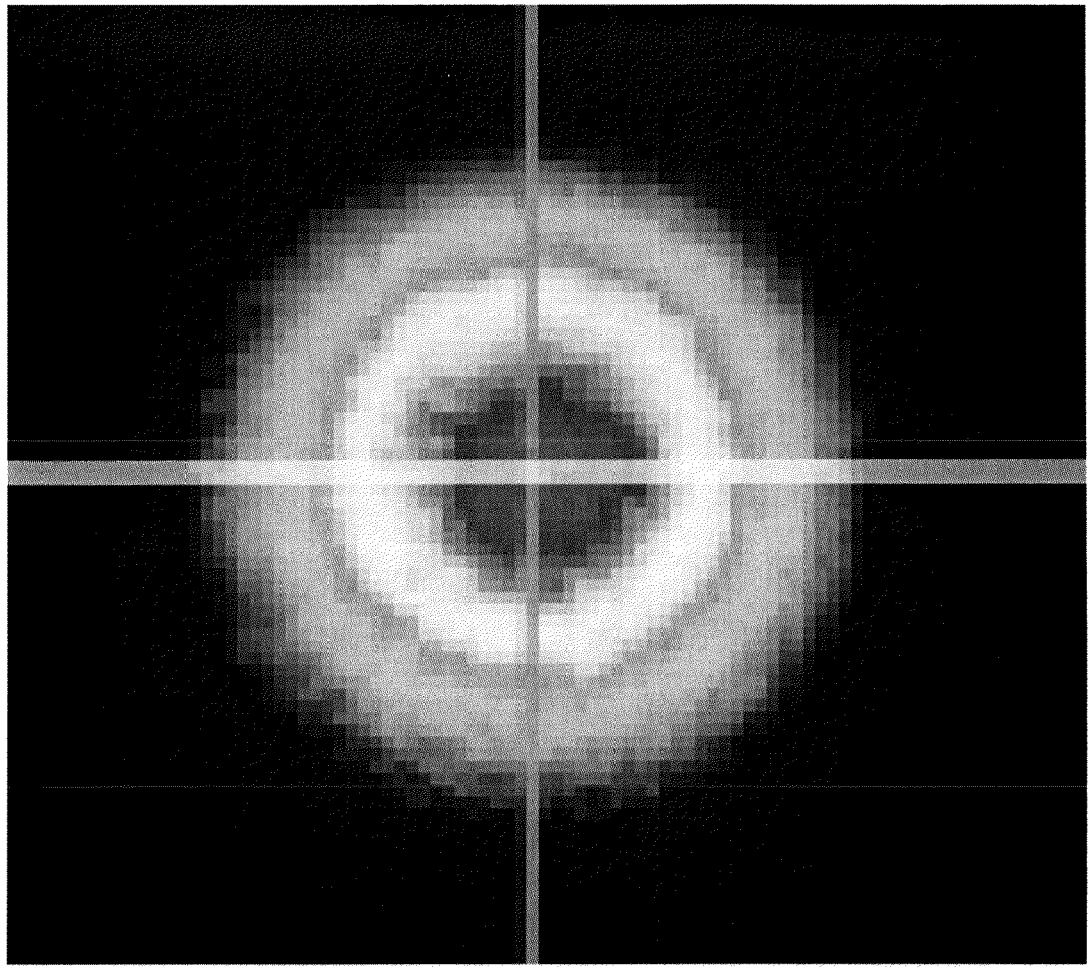
FIG. 8 shows the spatial profile of the output mode of an exemplary fiber amplifier.

FIG. 8 shows the output of the mode filter 460 of the system shown in FIG. 4. Measurements of beam quality resulted in $M^2$ values of under 1.05 confirming that the mode filter 460 substantially removes all the higher order mode content. Splicing the output fiber 462 with a splice 490 to multimode rare-earth doped amplifier fiber 480 amplifies the output from fiber coupled seed laser 401, but does not substantially change or degrade the beam profile or beam quality.

While the above mode filters illustrated can include mandrels or other supports, such supports are not necessary. For example, a fiber can be provided with a thermoplastic jacket and heated so that the jacket and fiber can be curved as desired. Once a selected curve has been achieved, the jacket is cooled so that fiber curvature is fixed. Mode filters based on either simple or compound curvatures can be formed in this manner. Instead of including support in the mode filter, the support can be used to form multiple mode filters. For example, a jacketed fiber with a softened jacket can be wound about a cylinder. Upon cooling the jacket, the fiber can retain the curvature associated with the winding. In other examples, a fiber and jacket are suitably shaped, and an epoxy is injected into a space between the jacket and the fiber. In other examples, the fiber can be coated with a thermoplastic or an epoxy, and frozen into a desired simple or compound curvature.

In some systems described herein, after suitable mode filtering is provided in a waveguide system, additional filtering can be provided to attenuate higher order modes that are excited by subsequent scattering or miscouplings. Such modal filtering can be provided periodically, occasionally, or continuously in one or more fibers so as to attenuate these higher order modes. For example, an active fiber can be bent around one or more mandrels with bends around one or more axes.

Representative Fiber Amplifiers

An example fiber amplifier is shown in FIG. 4. The fiber output 402 of the seed laser 401 is coupled to the mode filter 460, which is coupled to multimode input fiber 461 and multimode output fiber 462. Although seed laser 401 is a fiber-coupled laser, seed lasers in other embodiments described herein may or may not be fiber-coupled. For example, a free-space emitting laser can be coupled into fiber 402, which can be single or multimode, and the fiber 402 can be angle cut to reduce back reflection.

Multimode input fiber 461 and multimode output fiber 462 can be portions of a common length of optical fiber, but can also be based on two or more fibers that are spliced or otherwise optically coupled to one another. FIG. 4 shows the fibers 402 and 461 to be advantageously spliced to one another with the splice 450 although other optical coupling arrangements can also be used. The mode filter 460 removes substantially all the higher order mode content from the input fiber 461 such that substantially all of the power in multimode output fiber 462 is contained in the fundamental mode.

The output fiber 462 is optically coupled to a multimode rare-earth doped amplifier fiber 480 with a splice 490. The output fiber 462 and the rare-earth doped amplifier fiber 480 are chosen such that the mode field diameters of their respective fundamental modes are closely matched. In this way, only the fundamental mode of multimode rare-earth doped fiber amplifier 480 is excited. The rare-earth dopant in multimode rare-earth doped fiber amplifier 480 is chosen such that its optical gain spectrum overlaps at least to some extent with the spectral content of fiber coupled seed laser 401. For example, ytterbium can be used as a rare-earth dopant if the seed laser emits at wavelengths between 1030 nm and 1090 nm such as, for example, the output from a Nd:YAG laser. In other embodiments other rare-earth dopants can be used.

The mode filter 460 is typically included in the system 400 to improve mode matching between the output fiber 462 and the amplifier fiber 480. The mode filter 460 can be any mode filter described herein, or known in the art. In some embodiments, the fiber 461, the mode filter 460, and the fiber 462 are combined in a single mode filter. For example, the mode filtering can be based on the size of the fiber 461 so that the input of the optical fiber 461 effectively functions as a mode filter if the core is sufficiently small to reduce coupling into modes other than the fundamental mode of the fiber 461 from the fiber 402. The fibers 462, 480, 402 or other fibers in the system 400 can be used alternatively or additionally as mode filters based on input core size. Fibers with small input core sizes can be made with multimode output core sizes by using a taper as described herein. Mode filters can also be combined or coupled in serious or otherwise.

The multimode rare-earth doped amplifier fiber 480 can be fabricated using various different techniques. For example, such a fiber can be a double clad fiber configured so that seed radiation is amplified in a core and pump radiation is contained in a cladding surrounding the core or both signal and pump radiation can be contained within the core. If fiber coupled seed laser 401 emits a polarized beam, the radiation multimode rare-earth doped fiber amplifier 480 can also be a polarization maintaining fiber with, for example, an elliptical core, or panda or bow tie type fiber geometries.

Figure 9:
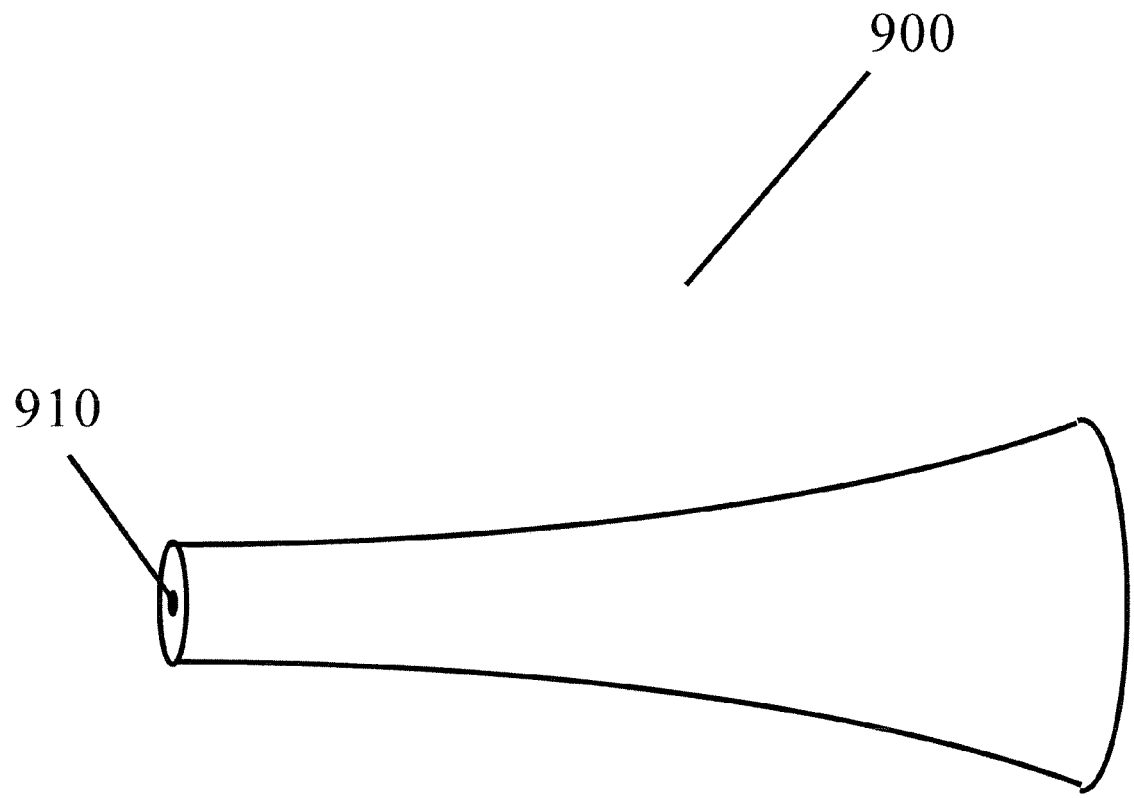
FIG. 9 shows a multimode optical fiber taper that can be used in place of the multimode optical fiber used in exemplary amplifiers described herein.

The multimode rare-earth doped amplifier fiber 480 can also be fabricated as a taper 900 as shown in FIG. 9 using a variable speed draw process or other process. This can advantageously be used to further increase a core size 910 of the taper 900 yielding further reductions in signal irradiance. This can be beneficial in avoiding both nonlinear and damage effects in the multimode rare-earth doped fiber 480 that can result from high signal irradiance levels. While the taper 900 shows a multimode fiber with a monotonically increasing diameter, this does not necessarily have to be the case. For example, an oscillating diameter as a function of length might also be useful for reducing nonlinear effects in the fiber. Additional examples of active tapers are illustrated in FIGS. 14-17. Active fiber tapers that can be used to implement the amplifier fiber 480 are discussed in further detail below.

As shown in FIG. 4, the multimode rare-earth doped amplifier fiber 480 is pumped with an optical pump source 420 whose output spectrum is chosen to overlap with the absorption spectrum of the rare-earth doped amplifier fiber 480. If, for example, ytterbium is chosen as the rare-earth dopant, a suitable choice for optical pump source 420 would be a fiber coupled laser diode that operates with an output wavelength near 976 nanometers. The optical pump source 420 is coupled to an output fiber 421 that can be chosen to have a beam parameter product that is less than or equal to the beam parameter product of the pump confining waveguide of the multimode rare-earth doped fiber amplifier 480. The output from the optical pump source 420 is then optically coupled to the pump confining waveguide of the multimode rare-earth doped fiber amplifier 480 with a pump combiner 410. There are numerous known pump plus signal combiner technologies that can be used for the pump combiner 410 that employ either all fiber based optical paths or free space optical paths. For example, a free-space multiplexer could be used. Further, while the pump is shown in as counter-propagating with the signal light, the pump could alternatively be introduced before the multimode rare-earth doped amplifier fiber 480 such that light from output from fiber coupled seed laser and the pump light are co-propagating in the multimode rare-earth doped amplifier fiber 480. In yet another embodiment, pump light could be introduced from both sides of the multimode rare-earth doped amplifier fiber 480.

Figure 10:
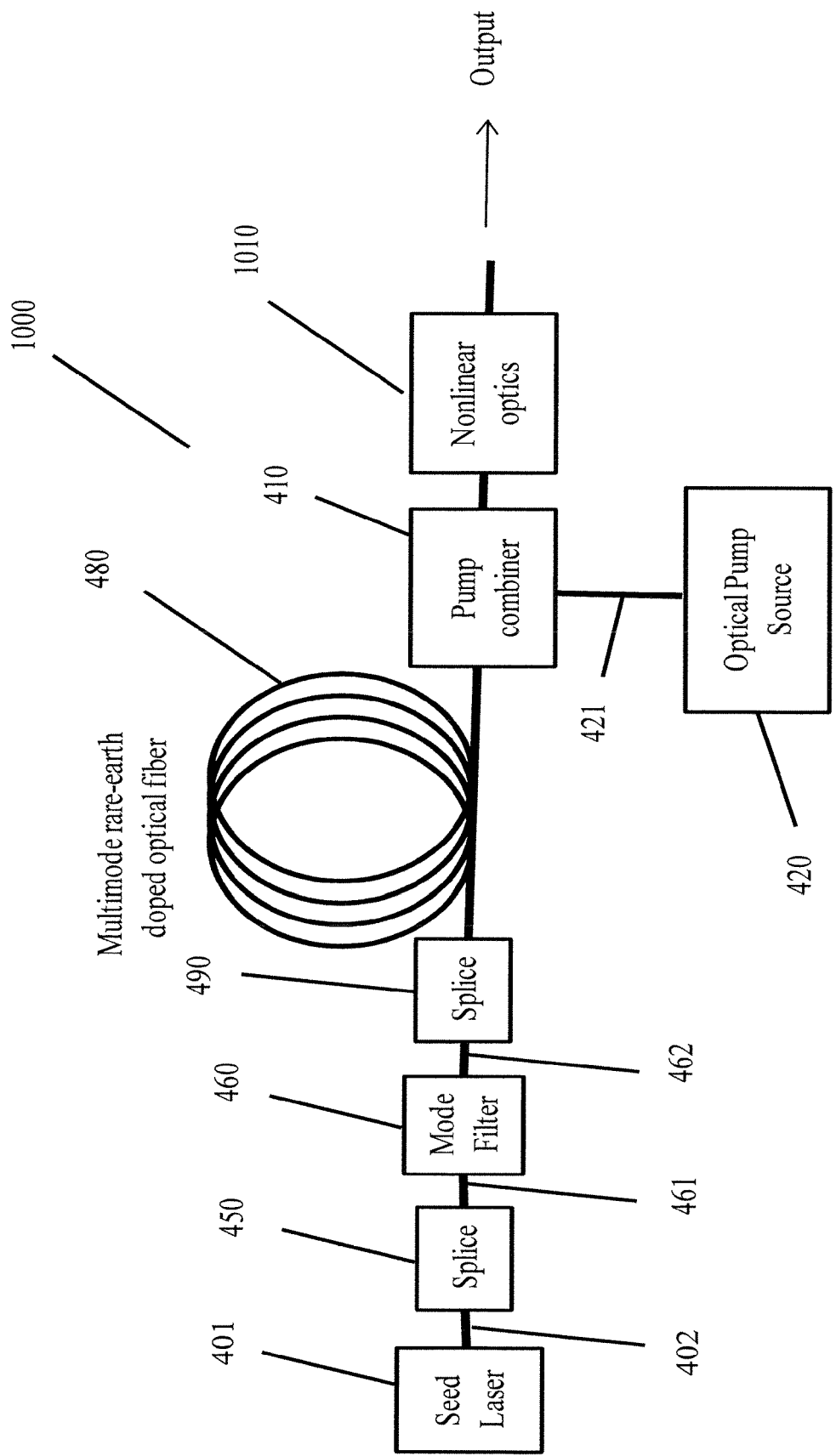
FIG. 10 shows a schematic of a representative embodiment that uses nonlinear optics to frequency convert the output of the multimode fiber amplifier.

Laser system 1000 illustrated in FIG. 10 shows the addition of nonlinear optical stage 1010 to the system of FIG. 4 so as to convert the wavelength of the output from the multimode rare earth doped amplifier fiber 480. For example, KTP, LBO, BBO, BiBO, or other nonlinear crystals can be used to generate second harmonic light. Further frequency conversions are also possible to generate third, fourth or even higher harmonics. Nonlinear optical stage 1010 could also be an optical parametric oscillator or amplifier which would enable the output wavelength from multimode rare earth doped amplifier fiber 480 to be shifted to longer or shorter wavelengths. Additional examples of fiber amplifiers including nonlinear optical stages are provided in FIGS. 29-33, and described in further detail below.

Figure 11:
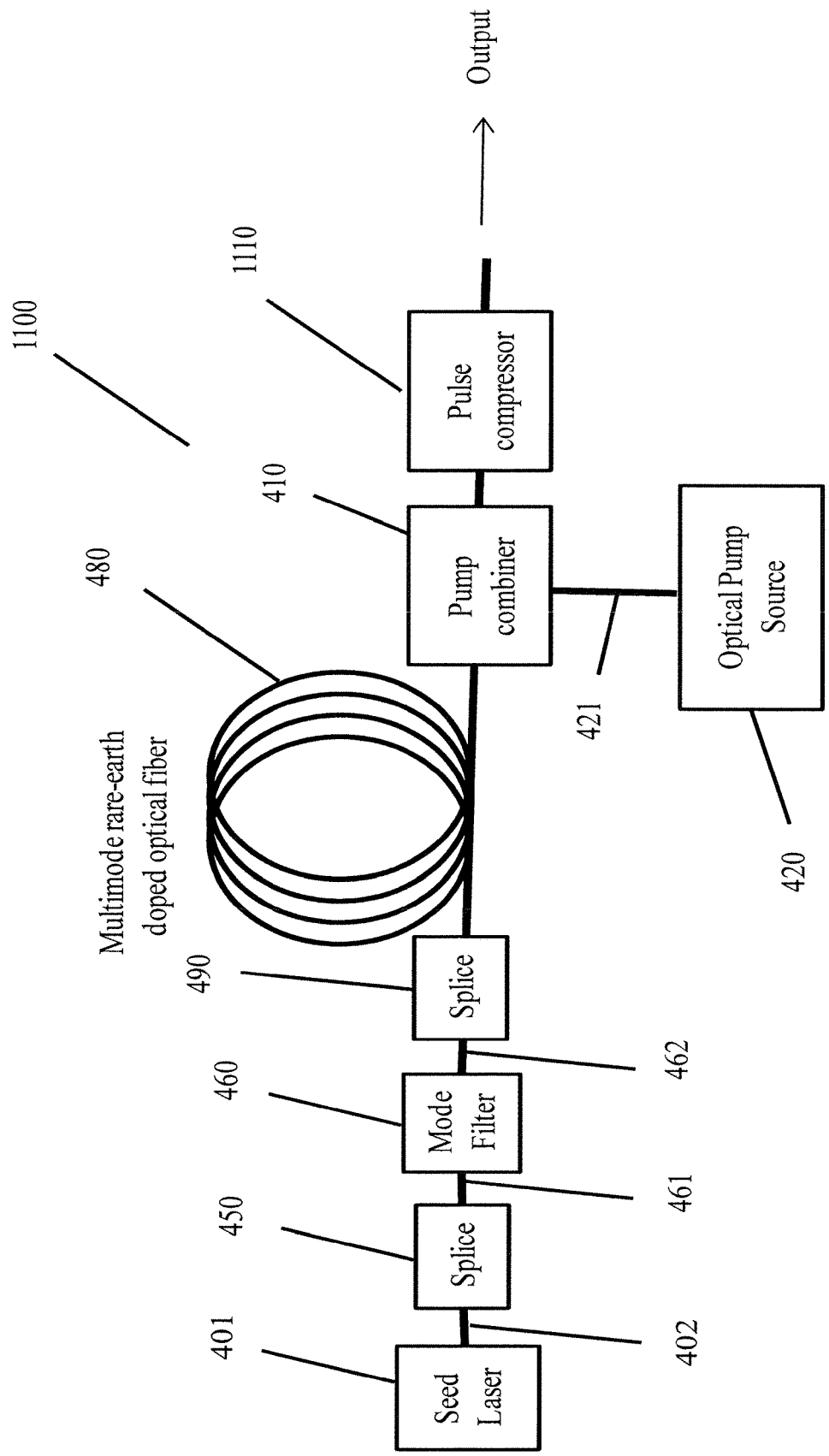
FIG. 11 shows a schematic of a representative embodiment that uses a pulse compressor to shorten the temporal length of the output of the multimode fiber amplifier.
Figure 12:
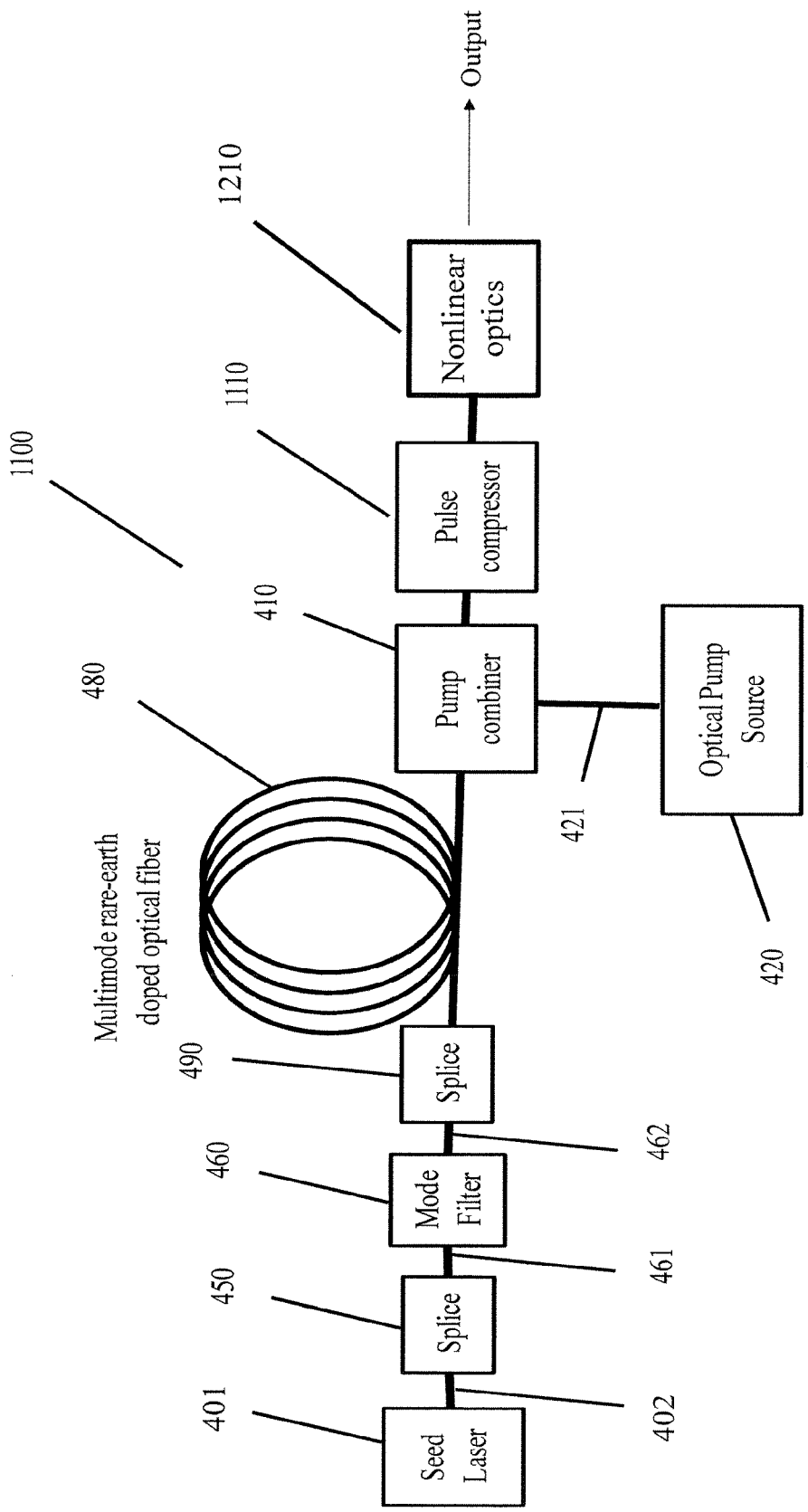
FIG. 12 shows a schematic of a representative embodiment that uses a pulse compressor to shorten the temporal length of the output of the multimode fiber amplifier and nonlinear optics to frequency convert the output of the multimode fiber amplifier.

FIG. 11 illustrates a laser system 1100 that shows the addition of a pulse compressor 1110 to shorten the pulse width of output from a multimode rare-earth doped amplifier fiber as shown in FIG. 4. The pulse compressor 1110 can be any pulse compressor known in the art. In this case, the seed laser 401 is advantageously designed or selected to produce frequency chirped pulses. Pulse compressor 1110 can then include a pair of bulk diffraction gratings to remove the wavelength chirp and compress the temporal output. FIG. 12 illustrates a system 1200 that includes both a pulse compressor such as the pulse compressor 1110 and a nonlinear optical system 1210.

In systems described herein, power scaling may be achieved by combining the outputs from multiple amplifiers and controlling the phases and polarization state of the light emitted from the amplifiers. Phase control may be achieved by using a single seed laser and splitting the output from this seed laser into the different amplifiers. Active measurement and control of the output phase may be used to stabilize the phases over time. In such systems it is particularly important that each of the amplifiers operates in a single fundamental mode as any residual light into higher order modes will not coherently combine with the output in the fundamental modes of the amplifier array. In some systems described herein, an optical isolator is situated between a seed source and a gain region, or at some other location in an amplifier system. It is convenient to provide fiber pigtails for coupling into and out of an isolator, and such fiber pigtails can be configured to provide mode filtering and attenuation as described above. Generally, additional filtering is provided on an isolator output, and such filtering tends to improve isolation performance. Other fiber or waveguide-based components can include, for example, fiber Bragg gratings.

Representative Active Tapers

A key concern in amplifying temporally short pulses is the nonlinear threshold of the amplifying media. The thresholds for stimulated Brillouin and Raman scattering can be expressed with a generalized equation:

$$\text{Threshold} \propto C_{NL} \frac{A_{\text{eff}}}{L_{\text{eff}}} \frac{1}{g_{NL}},$$

wherein $C_{NL}$ is a nonlinear coefficient (Brillouin or Raman), $A_{\text{eff}}$ is an effective area of the signal, $L_{\text{eff}}$ is an effective amplifier length, and $g_{NL}$ is a nonlinear gain (Brillouin or Raman). The ratio $A_{\text{eff}}/L_{\text{eff}}$ of the waveguide should be maximized or made as large as practical in order to permit high peak and average power operation or otherwise provide enhanced amplification while suppressing nonlinear effects.

The effective length of an amplifier such as a double clad fiber amplifier is mainly defined by the pump absorption properties of the waveguide. If the pump is assumed to be multimoded and coupled to the cladding, cladding absorption can be characterized with an absorption coefficient α that can be conveniently expressed in units of dB/m. In typical examples, an effective length can be defined by a pump absorption for a specific application and the pump absorption selected as preferred. Generally, an effective fiber length $L_{\text{eff}}$ is associated with total pump power absorption, and thus $L_{\text{eff}}$ is proportional to 1/α. Absorption of pump radiation propagating in a cladding is based on an overlap of the multimode-propagating pump radiation in the cladding and the rare earth doped core, i.e. by the ratio of the core/cladding areas, so that $$\alpha \propto \left(\frac{d_i}{\phi_i}\right)^2,$$

wherein $d_i$ is a taper input core diameter and $\phi_i$ is a taper input cladding diameter. In some examples, this ratio in constant along a taper axis, but core and cladding diameters can vary independently. Pump brightness (or radiance) is generally limited by the current state of pump source technology (for example, the availability of high power, high brightness semiconductor lasers or other sources), and therefore $\phi_i$ is proportional to the achievable pump brightness, which at any given time is constant. Thus, the optimized absorption $\alpha_{opt}$ and the effective length of active taper scales as $$\alpha_{opt} \propto d_i^2 \Rightarrow L_{\text{eff}} \propto \frac{1}{d_i^2}.$$

In a large mode area active taper, the average effective area of the waveguide is between the effective area of the input and the effective area of the output. By simplifying, it can therefore be said, that $$A_{\text{eff}} \propto (d_i + d_o)^2,$$

wherein $d_o$ is the output diameter of the amplifier active taper core ($d_o > d_i$). To conclude, $$\text{Threshold} \propto \frac{A_{\text{eff}}}{L_{\text{eff}}} \propto d_i^2 (d_i + d_o)^2.$$

Thus, to reduce nonlinearities (or maximize the nonlinear threshold) in an active taper, the input core diameter $d_i$ should be made as large as possible. A core diameter associated with multimode or few mode propagation for the active taper permits increased peak and average power signal amplification. Second, while the output core diameter $d_o$ is of lesser importance, this diameter too should be large or maximized in so far as practical. Generally an active taper output core diameter is defined by, for example, practical manufacturing and fiber handling limitations. Third, the taper input cladding diameter $\phi_i$ is defined by the required pump power and available pump brightness.

In order not to limit the achievable average and peak powers, the core in the input and output of the active taper preferably supports few mode or multimode propagation, and core diameter variations along a core axes (longitudinal core diameter variations) are preferably adiabatic in order to obtain high efficiency and good beam quality. A mode filter or mode converter can be used to couple seed radiation to a pumped active taper so that the seed radiation excites only or primarily the fundamental mode of the active taper, thus preventing beam quality or efficiency degradation. As used herein, a mode filter preferably couples at least 50%, 60%, 75%, 90%, 95%, or 99% of a seed beam into a lowest order mode of an active taper.

Further enhancement of multimode active taper physical parameters can take into account modal coupling and subsequent beam quality degradation. Fermann et al., U.S. Pat. No. 5,818,630, which is incorporated herein by reference, discloses microbending induced mode coupling. Using the notation defined above, a mode coupling coefficient (D) according to Fermann can be expressed as:

$$D \propto \frac{d_{i,o}^8}{\phi_{i,o}^6 \lambda^4}.$$

In a waveguide having a predetermined d/φ ratio and a constant wavelength, an active taper typically exhibits decreased mode coupling, thus increasing the beam quality, in comparison to a fiber having a constant core diameter $d_o$ and a constant cladding diameter $\phi_o$.

An active taper that permits few or multimode propagation in the taper core at least at some locations can be coupled or spliced to, for example, a passive few mode or multimode fiber. If the passive fiber and the core of the active taper have similar mode field diameters (i.e., have similar numerical apertures and core diameters) at the coupling, only the fundamental mode of the active taper can be excited. Therefore, unless power is scattered out of the fundamental mode and into higher order modes, the amplifier operates as a fundamental mode amplifier with increased nonlinear threshold.

In representative examples, active waveguides such as active fibers are configured so that thresholds for nonlinear effects are increased because fiber core diameters in a taper reduce optical intensity. Bend induced losses tend to be reduced, so that optical amplifiers using active tapers can operate with increased efficiency. In addition, an active taper need not be tightly coiled, and exhibit little or no bend induced reduction in mode areas. Active taper output can be in a fundamental mode which is well suited for typical applications.

In optical amplifiers based on the disclosed active tapers, the active taper is situated so that core and/or cladding cross-sectional dimensions or areas increase from an input end to an output end. In some examples, a core/cladding dimensional ratio remains constant over some or all of a taper length. A transition region from a first to a second core area, diameter, or other dimension can be gradual or abrupt, and can be preceded or following by untapered sections. By positioning a small core area to large core area transition at or near a taper input, an amplified optical beam will propagate primarily in the larger core/cladding section of the taper, reducing nonlinearities that scale with irradiance. The length of the transition may be short or long, and typically is gradual enough that amplified optical beam continues to propagate in a lowest order mode. The taper can be based on one or more longitudinal profiles such as a linear profile, a logarithmic profile, an error function profile, or a hyperbolic tangent profile, or combinations these and other profiles. Transition lengths and longitudinal profiles can be selected in manufacturing of fiber tapers by selecting a speed and acceleration during perform drawing. For example, a sudden change in draw speed (acceleration) corresponds to a relatively abrupt size change, while a slower change in draw speed corresponds to a more gradual taper.

An active taper for an optical amplifier or oscillator can be co-pumped or counter pumped, or both. In a co-pumped amplifier, the pump propagates in the same direction as an input seed beam. The seed beam and pump radiation are coupled into the active taper at an input end. In a counter-pumped configuration, the pump propagates in a direction opposite to that of the seed optical beam. Counter-pumped amplifiers can exhibit nonlinear thresholds that are higher than those associated with co-pumped configurations. In typical examples, the seed optical beam is coupled into an active taper and propagates throughout the taper from a smaller core section to a larger core section. A passive fiber can be used to deliver the seed optical beam to the active taper, and can be spliced or otherwise coupled to the active taper. A passive fiber having a mode field diameter (MFD) that is the same or substantially the same as that of an input portion of the active taper input is preferred to conserve the (good) beam properties of the seed optical beam. The seed optical beam can also be coupled into the active taper using free space optics.

Pump radiation can be coupled in an active taper at a seed input (co-pumped) or at an output (counter pumped), or both, using various techniques. For example, the pump can be coupled using a feed through (N+1):1 fiber multiplexer, allowing the seed beam and the pump radiation to be coupled into the active taper. A fiber multiplexer can also be used at a taper output for additional pumping. The feed through fiber is substantially continuous and can be selected so as have a MFD that corresponds to the taper input or output. Alternatively, the feed through fiber can be a passive or active fiber, or be included in an active taper. Free space optical devices or multiplexers can also be used to couple pump radiation at the taper input or output, but fiber based devices may be more convenient.

Active tapers can also include polarization maintaining optical fibers. For example, stress rods can be provided in a preform used to produce the variable mode core or the active taper. In addition, the active taper core can be provided with a confined doping, and dopant need not extend to all portions of the core. Typically, confining doping to a more central region produces superior beam quality than a fully doped core because confined doping tends to reduce the gain of the higher order modes.

Figure 14:
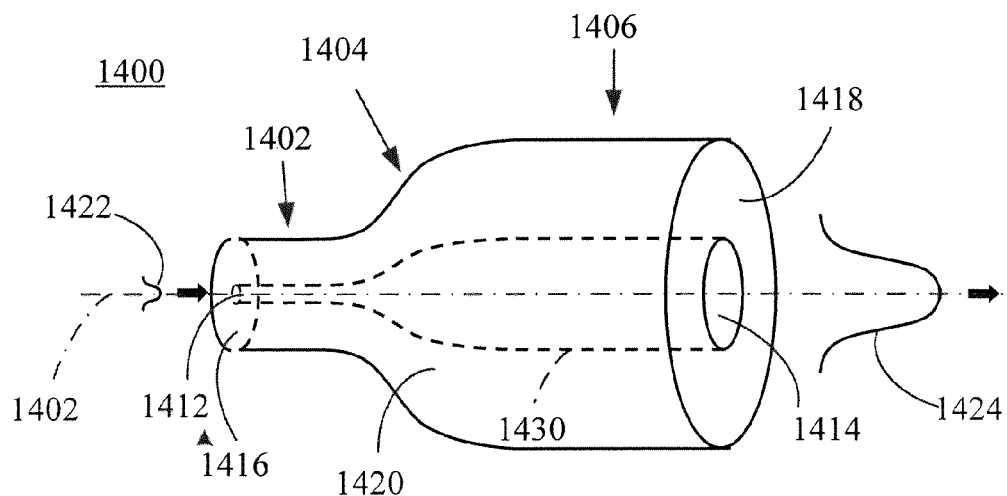
FIG. 14 is a perspective view of an active taper that includes a few mode input section.

A representative actively doped taper 1400 is illustrated in FIG. 14. The taper 1401 includes a first fiber waveguide section 1402 (also referred to as an input section), a tapered region 1404, and a second fiber waveguide section 1406 (also referred to as the output section). As shown in FIG. 14, the active taper is situated along an axis 1401. The input section 1402 and the output section 1406 define an input core 1412 and an output core 1414 having respective core diameters $d_{in}$ and $d_{out}$, respectively. The taper 1400 also includes a cladding 1420 having input and output cladding diameters $D_{in}$ and $D_{out}$, respectively. For convenient illustration, only a single cladding is shown, but tapers can include one, two, or more claddings. In addition, protective buffer coatings are not shown in FIG. 14.

The tapered region 1404 is associated with a varying core diameter that increases from $d_{in}$ to $d_{out}$ over the tapered region. A core/cladding interface 1430 associated with the varying core diameter is shown as a smooth curve, and such a curve can be a simple linear taper, or a complex taper based on a preferred taper shape. Typically, a variation in core diameter per unit length is selected so that the taper is a so-called adiabatic taper and a single mode optical signal propagating in the input section 1402 continues to propagate in a single, lowest order mode to the output section 1406. As used herein, a taper slope is defined as change in core diameter per axial length, and an adiabatic taper in a single mode or few mode core is a taper having a taper slope that is less than about $\lambda/(n_{core}d_{core})$, or less than the core numerical aperture, wherein $n_{core}$ and $d_{core}$ are core refractive index and diameter, and $\lambda$ is an intended wavelength of use. One or more or both of a taper core or cladding can be provided with an active dopant such a rare earth dopant such as ytterbium, erbium, neodymium, praseodymium, thulium, samarium, holmium dysprosium, a transition metal, or a semiconductor. Taper lengths can be in a range of from about 0.1 cm to 25 m, 0.2 cm to about 2 m, 0.5 cm to about 1.5 m, about 1 m to 10 m, about 2 m to 4 m, about 2.5 m to 3.5 m, or about 0.5 cm to about 10 cm, but longer or shorter tapers or tapered sections can be used. Typically, a fiber/taper combination has a total length of less than about 0.5 to 5 m.

The tapered region 1404 exhibits increasing core and cladding diameters, and typically a ratio of core diameter to cladding diameter (d/D) remains approximately constant for fiber tapers formed using a preform having a constant diameter. As configured for use as an amplifier in which nonlinear effects are to be reduced, the active taper is configured so that an input signal propagates from an input end 1416 to an output end 1418, and an input mode field 1422 increases in cross-sectional area as input beam irradiance or beam power increases. As shown in FIG. 14, the input mode field 1422 and an output mode field 1424 are preferably lowest order modes of the input section 1402 and the output section 1406, respectively.

Figure 15:
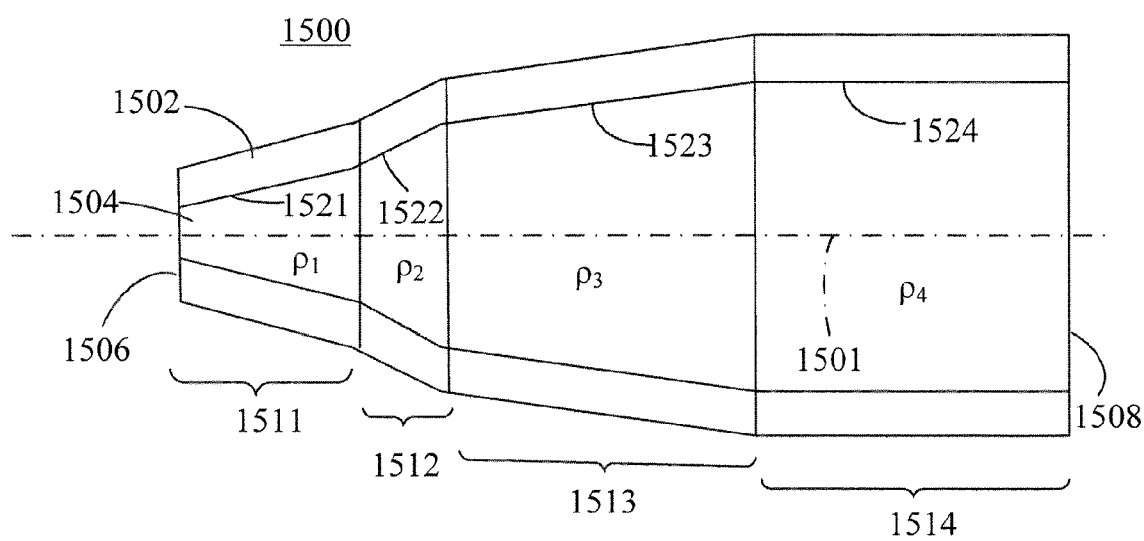
FIG. 15 is a sectional view of an active taper that includes a plurality of tapered sections and having a monotonic taper. The active taper can be formed in a single fiber or as a plurality of discrete tapered sections that are spliced together.

With reference to FIG. 15, a representative active taper fiber waveguide 1500 includes a cladding 1502 and a core 1504 that extend along an axis 1501 and are configured to define a step index fiber. In typical applications, an input optical beam is directed to an input surface 1506 that is associated with a smaller core diameter so as to exit at an output surface 1508. In the example of FIG. 15, the cladding 1502 is shown as having a constant thickness and tapering diameter, but in other examples, the cladding thickness varies with changes in core diameter. The active taper 1500 includes a plurality of sections 1511-1514, each which can have differing tapered core/cladding boundary profiles 1521-1524, respectively, and can have different core dopants, dopant concentrations $\rho_1, \rho_2, \rho_2, \rho_4$, dopant spatial distributions, or core or cladding refractive indices. As shown in FIG. 15, the section 1514 has a zero slope taper 1524, i.e., is untapered, while the sections 1511-1513 have differing tapers. For convenient illustration, the tapered boundaries 1521-1524 are shown as linear tapers, but each of the sections 1511-1514 can be different tapers that are based on linear or nonlinear tapers such as those based on logarithmic, polynomial, hyperbolic, or other functions. The tapered sections can be formed in a single fiber, or formed as discrete sections that are spliced together.

Figure 16:
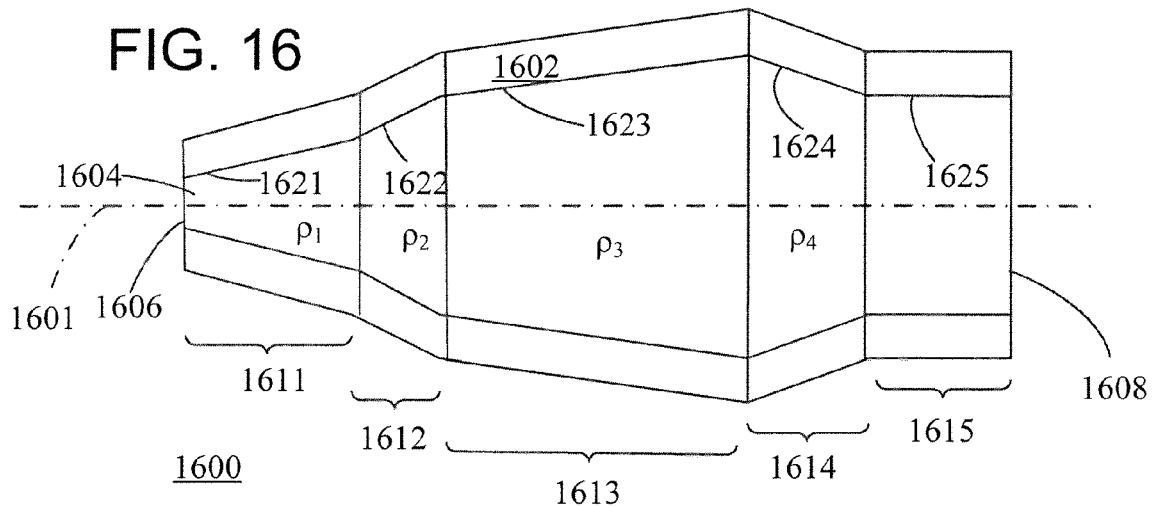
FIG. 16 is a sectional view of an active taper that includes a plurality of tapered sections and having non-monotonic taper.

With reference to FIG. 16, another representative active taper fiber waveguide 1600 includes a cladding 1602 and a core 1604 that extend along an axis 1601 and are configured to define a step index fiber. An input optical beam is typically directed to an input surface 1606 that is associated with a smaller core diameter so as to exit at an output surface 1608. The active taper 1600 includes a plurality of sections 1611-1615, each which can have differing tapered core/cladding boundary profiles 1621-1625, respectively, and can have different core dopants, dopant concentrations, dopant spatial distributions, or core or cladding refractive indices. As shown in FIG. 16, the section 1615 is untapered and undoped, while the sections 1611-1614 have differing tapers and respective dopant concentrations $\rho_1, \rho_2, \rho_2, \rho_4$. As noted above, tapered boundaries 1621-1625 are shown as linear tapers, but each can be based on one or more linear or nonlinear tapers such as those based on logarithmic, polynomial, hyperbolic, or other functions. In addition, the waveguide 1600 can be formed in a single fiber or by splicing a plurality of sections together.

Figure 17:
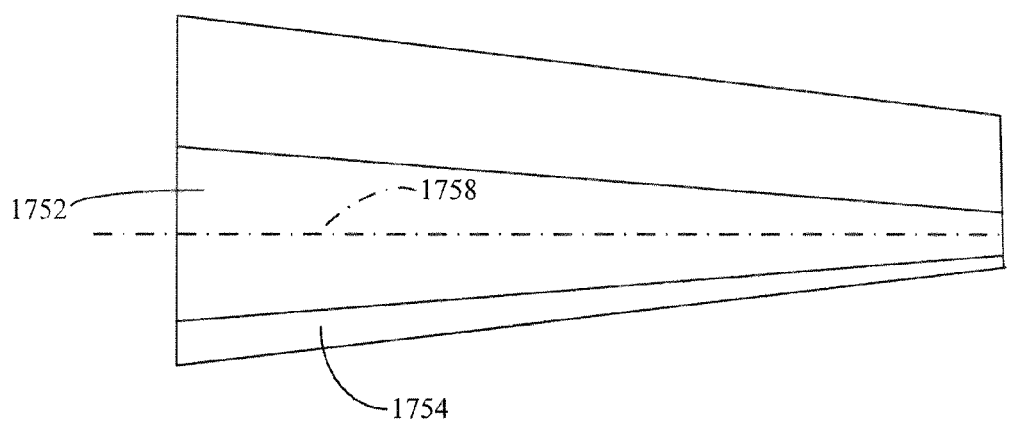
FIG. 17 illustrates an active taper in which a variable mode core is decentered with respect to a cladding.

FIG. 17 illustrates a representative fiber 1750 that includes a tapered core 1752 that defines a propagation axis 1758. A tapered cladding 1754 is situated about the core 1752, but is not centered on the axis 1758. Offsetting the tapered core 1752 with respect to the tapered cladding 1754 can permit more efficient pumping of the core dopant.

Representative Active Taper Amplifiers/Lasers and Systems

A representative optical amplifier that includes an active taper is illustrated in FIG. 18. A seed laser 1802 is configured to produce a seed optical beam at a wavelength suitable for amplification by a selected dopant. Typically, the seed beam has a preferred mode profile such as a lowest order mode profile. The seed beam is directed to a mode filter 1804 and then to an active taper 1806 that includes an actively doped core. A pump source 1808 such as one or more laser diodes that emit at suitable wavelengths is coupled to the active taper.

FIG. 19 illustrates a representative laser 1900 that includes an active taper 1906 situated in a laser cavity 1901 defined by first and second end mirrors 1902, 1904. A mode filter 1908 can also be provided for additional mode control, and an optical pump source 1910 such as one or more semiconductor lasers is situated to provide pump radiation to the active taper, typically by coupling pump radiation into an inner cladding. An output beam from the laser cavity can be directed to one or more nonlinear optical devices 1912 such as an optical harmonic generator or a parameter oscillator or amplifier. The output beam can also be directed to a pulse compressor 1914 that can include, for example, a fiber configured to introduce a frequency chirp and a pair of diffraction gratings. The active taper 1906 can include a section of untapered, actively doped optical fiber as well, and additional nonlinear optical devices and polarization sensitive elements can be situated within or exterior to the laser cavity 1901.

A pump beam can be coupled to an active taper through one or both of taper input/output surfaces, or through a side of the active taper. In one example, as shown in FIG. 20, a seed laser input fiber 2002 and pump fibers 2004, 2006 are coupled to an active taper 2008 with a combiner 2005. An output fiber 2007 of the combiner 2005 is coupled to the active taper 2008 that includes a tapered core 2010, an inner cladding 2012 and an outer cladding 2014. Pump radiation can be directed into the pump fibers 2004, 2006 for pumping a rare earth or other active dopant in the tapered core 2010. The seed laser input fiber 2002 can be a single mode fiber, a few mode fiber, or a multimode fiber. If a few mode or multimode fiber is used, a mode filter can be provided so that a seed beam propagates in the seed fiber 2002 primarily in a fundamental mode. The variable mode core can have a doping that is confined and/or vary along a length of a taper axis 2001. For a circularly symmetric taper, rare earth doping $\rho$ can vary as a function z and r, wherein z is measured along the taper axis 2001 and r is a radial distance from the taper axis 2001, i.e., $\rho=\rho(r,z)$. A core taper can be associated with a core/inner cladding boundary 2015. For a circularly symmetric taper, the boundary location $r_{core}=r(z)$. In some examples, $r(z)=r_0 \tan h(az)$, wherein $r_0$ is a core radius at z=0, and a determines a rate at which the core radius increases. Other functions can be used as a basis for core taper. For confined doping, an active dopant is bounded in the taper by $r_{dopant}=\beta r_0 \tan h(az)$, wherein $\beta$ is a positive number less than one. Dopant density can vary with both r and z within such a boundary. The configuration of FIG. 22 can be referred to as a co-propagating configuration, and one or more pump fibers and pump sources can be used.

Referring to FIG. 21, a seed laser input fiber 2102 is coupled to an active taper 2108 that includes a tapered core 2110, an inner cladding 2112 and an outer cladding 2114. Pump fibers 2104, 2106 are coupled to a combiner 2120 that is in turn coupled to the active taper 2108 with an output fiber 2122. Pump radiation can be directed into the pump fibers 2104, 2106 for pumping a rare earth or other active dopant in the tapered core 2110 and delivered. The seed laser input fiber 2102 can be a single mode fiber, a few mode fiber, or a multimode fiber. If a few mode or multimode fiber is used, a mode filter can be provided so that a seed beam propagates in the seed fiber 2102 primarily in a fundamental mode. The configuration of FIG. 21 can be referred to as a counter-propagating configuration, and one or more pump fibers and pump sources can be used. Active tapers can be configured to have both co-propagating and counter-propagating pump sources. For example, an active paper input can be configured according to FIG. 20 while the output is configured according to FIG. 21.

With reference to FIG. 22, a seed optical beam source 2202 and one or more pump sources 2204, 2206 are coupled to a fiber multiplexer (mux) 2210 via respective optical fibers 2203, 2205, 2207. A mux output fiber 2214 is coupled to an active taper 2212 so that the optical radiation from the mux 2210 provides both a seed optical beam and pump radiation to the active taper 2212.

A representative fiber/active taper arrangement is illustrated in FIG. 23. Fibers 2302, 2306, 2310, 2314 are coupled by active tapers 2304, 2308, 2312. For convenient illustration, fibers types are represented as core diameter/cladding diameter with dimensions in μm. Typically, a seed beam is provided to the fiber 2302, and an amplified beam exits the fiber 2314.

Figure 24:
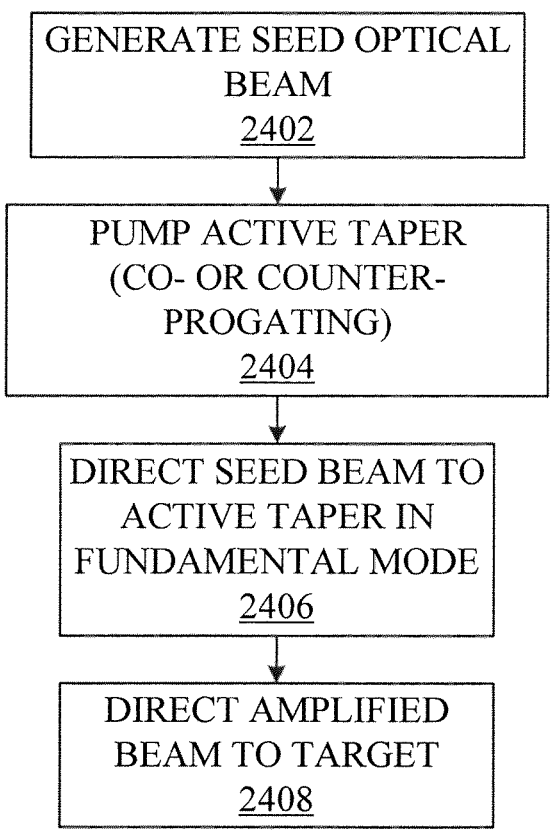
FIG. 24 is a block diagram of a representative method of controlling optical nonlinearities.

A representative method of controlling optical nonlinearities is illustrated in FIG. 24. A seed optical beam is generated at 2462. Typically, the seed optical beam propagates in fundamental mode and can be produced directly from a source or provided by mode filtering. At 2404, an active taper is pumped so as to produce optical gain. Co-propagating, counter-propagating, or side pumping can be used. At 2406, the seed beam is directed to the active taper to produce an amplified optical beam, and the amplified optical beam is directed to a target or otherwise used at 2408. Active taper cross-sectional areas can be selected to control radiance. For example, if a peak irradiance is to be less than a predetermined value, modal area in the taper can be selected accordingly so that peak optical power is not limited due to a permitted peak irradiance. Average power and irradiance can also be selected in the same manner.

Representative Hybrid Amplifiers Using Active Tapers

Example 1

Figure 25:
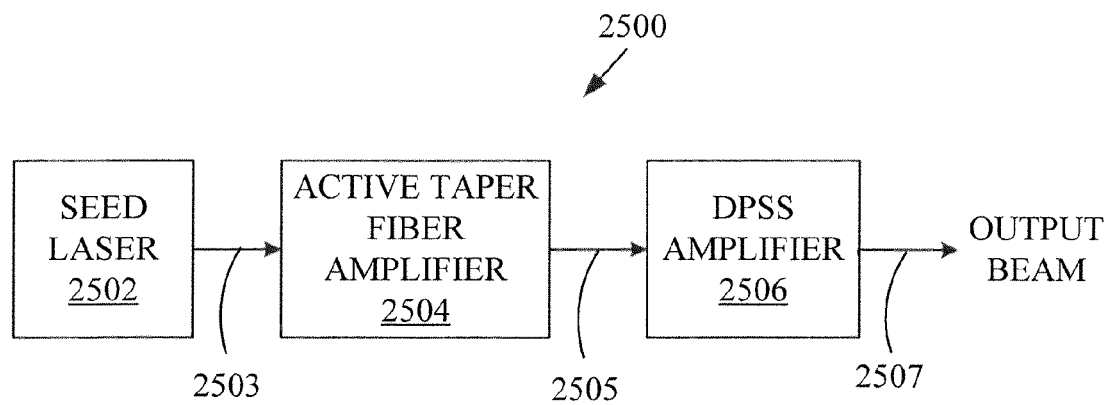
FIG. 25 is a schematic diagram of a representative multi-stage laser amplifier system that includes an active taper amplifier.

A representative multi-stage or hybrid optical amplifier 2500 that includes an active taper is illustrated in FIG. 25. A seed laser 2502 is configured to produce a seed optical beam 2503 at a wavelength suitable for amplification by a selected dopant. Typically, the seed beam has a preferred mode profile such as a lowest order mode profile. The seed beam 2503 is directed to an active taper fiber amplifier 2504 that includes an active taper as described herein. The seed laser 2502 can be coupled to the amplifier 2504 using various fiber or free-space techniques, or combinations thereof. In some examples, the seed laser 2502 includes a pre-amplifier and produces a pre-amplified seed beam 2503. The active taper fiber amplifier 2504 can include one or more pump sources, a combiner, a mode filter, and/or other components not shown in FIG. 25. The active taper fiber amplifier 2504 outputs a first amplified beam 2505 and can be referred to as a pre-amplifier or as a first amplifier stage.

The active taper fiber amplifier 2504 is coupled to a diode pumped solid state (DPSS) amplifier 2506, which provides a second stage of amplification. The amplifier 2504 can be coupled to the amplifier 2506 using various fiber or free-space techniques, or combinations thereof. The solid state amplifier 2506 receives the first amplified beam 2505 and outputs a second amplified beam 2507. The second amplified beam 2507 substantially includes the power of the first amplified beam 2505 as well as additional power produced by the second stage amplifier, the solid state amplifier 2506. The amplifier 2506 can be any DPSS amplifier known in the art. In some embodiments, a thin disk DPSS amplifier is used. In general, in a thin disk laser or amplifier, the gain medium or laser crystal is a disk with a thickness that is substantially smaller than the laser beam diameter, and the disk is mounted to a heat sink. Thin disk amplifiers, such as a Yb:YAG disk pumped with one or more InGaAs diodes, can be advantageous for certain short pulse, high peak power, high average power applications because such amplifiers can produce beams with little distortion (due to the thin amplification region which limits nonlinear phase shifts or phase distortion of the pulses, the efficient heat sinking which limits thermal lensing, and the broad gain bandwidth). However, other laser crystals or other materials, and other amplifier configurations can be used as part of the DPSS amplifier. For example, other solid state amplifiers, such as bulk single pass or few pass amplifiers, including laser rod, slab, one-dimensional waveguide, or gas amplifiers, can be used. In some examples, the solid state amplifier 2506 is a Nd:Vanadate amplifier pumped at 888 nm. Typically, the DPSS amplifier is selected to produce amplification with low pulse distortion (e.g., thermal lensing, nonlinear phase shifting, etc.).

The active taper fiber amplifier 2504 can be configured as a high power pulsed laser source for the solid state amplifier 2506 because fiber amplifiers based on active tapers can offer several advantages over standard fiber amplifiers (e.g., fiber amplifiers using large mode area fibers). In some instances, active taper fiber amplifiers can reduce optical nonlinearities, maintain mode quality, and produce high peak power beams having higher average power than standard non-tapered optical fiber amplifiers. Such advantages make active taper fiber amplifiers particularly desirable as first stage amplifiers. In addition, although any solid state amplifier can be used, thin disk lasers, and in particular Yb:YAG disk lasers, offer various advantages over other lasers. However, in a typical cost-effective implementation, a thin disk laser provides only a modest gain, generally between about 1 dB and 10 dB. To produce short pulses with high average power and pulse energy, the power input into the disk laser must be increased correspondingly. Although conventional fiber amplifiers can provide cost-effective, high-gain laser sources for thin disk amplifiers, the maximum power output is limited by the effects of nonlinearities. By using fiber amplifiers based on active tapers described herein, higher powers can be achieved while maintaining mode quality and retaining the low-cost, high-gain benefits of fiber amplifiers. Active taper fiber amplifiers can achieve peak power values of 10 to 100 times conventional fiber amplifiers. In some examples, peak power values of about 500 kW or about 1 MW or higher can be achieved.

In the system 2500, it is generally desirable to choose a solid state amplifier 2506 so that the pulse length of the second amplified beam 2507 is substantially the same as the seed beam 2503. For example, a solid state amplifier with low thermal lensing, such as a thin disk amplifier, is generally preferred. Consequently, a desired output pulse length is selected by selecting the pulse length of the seed laser. Likewise, a desired repetition rate for the output amplified beam can be selected by selecting the repetition rate of the seed laser. In some examples, pulse widths are between about 1 ps and about 10 to 100 ns, and the repetition rate is between about 100 kHz and 10 MHz, or between about 10 kHz and 1 MHz. A seed laser, and therefore the pulse width and repetition rate, is typically selected by balancing laser cost and performance. For example, a mode-locked laser, gated to the desired repetition rate, can be used as the seed laser when short pulses ranging from a few femtoseconds to about 1 ps are desired. However, an actively or passively Q-switched DPSS laser, or a directly modulated gain-switched diode laser, can be selected as lower cost options when longer pulses, such as between about 200 ps and 1 ns, or between about 1 ns and 100 ns, are acceptable. The pulse width of the amplified beam can be further reduced through use of a pulse compressor, such as by using a grating pair or self-phase modulation in an optical fiber. Further, a pulse stretcher can be included before the amplifier 2504 or the amplifier 2506, and a pulse compressor can be included after the amplifier to perform chirped pulse amplification. In such an implementation, femtosecond seed pulses can be stretched to be 100 s of picoseconds long by the stretcher, while the compressor can compress the pulses back to femtosecond length.

In general, the active tapers included in the active taper fiber amplifier 2504 are tapered in a manner so as to preserve beam quality while tailoring optical power density in the tapered fiber. That is, the taper allows the modal volume of the propagating beam to increase when the power levels are high by transitioning from a small to a large core size. For example, the taper can have a short transition region, so that the taper transitions from a first, smaller, core diameter to a second, larger, core diameter early in the taper. Desirably, the mode area for the second core diameter is sufficiently large so as to reduce the peak power density and delay the onset of fiber nonlinearities, such as self-phase modulation and Raman scattering. Increasing the active area in this manner reduces the peak power intensity while maintaining the optical beam quality. The taper can be an adiabatic taper as described herein, or a more abrupt taper.

Example active tapers have an input core diameter to cladding diameter ratio (d/D) of 25/250 μm and an output core/cladding ratio of about 60/600 μm. In other examples, the input core/cladding ratio is 25/250 μm and the output core/cladding ratio is about 80/800 μm. In still other embodiments, tapers have different core/cladding ratios than those listed here but are still characterized by an increase in core diameter from input to output of between about 2 and 4 times, such as between about 2.2 and 2.6 times or between about 2.5 and 3.0 times. Active taper lengths can range from about 0.5 to 10 m, such as between about 1 and 4 m, between about 1.5 m and 3.5 m, or between about 2 m and 3 m. Active tapers can be doped using various techniques known in the art, such as direct nanoparticle deposition or chemical vapor deposition, and can have a range of concentrations. In general, higher doping concentrations are desired in order to reduce the taper length and also fiber nonlinearities. Doping concentration can be quantified using a rate of pump power absorption, such as absorption per-unit length or dB/m, for a particular wavelength injected into the fiber core. Typical values for pump power absorption, for pump light having a wavelength of 976 nm, range from about 100 dB/m to 2000 dB/m, such as between about 100 and 500 dB/m, between about 400 and 800 dB/m, between about 700 and 1200 dB/m, between about 800 and 1500 dB/m, between about 900 and 1600 dB/m, or between about 1200 and 2000 dB/m, however, pump power absorption greater than 2000 dB/m is possible. Active tapers can be configured with either co-propagating or counter-propagating pump radiation, or both. Active tapers can be polarization-maintaining.

In some embodiments of multi-stage optical amplifiers such as the optical amplifier 2500, average powers between about 1 and 10 kW and peak powers between about 1 and 20 MW, or between 100 kW and 1 MW are achieved. In other embodiments, for a seed laser producing a seed beam with an average power of about 1 W and a peak power of between about 1 kW and 100 kW, an active taper fiber amplifier produces a first amplified beam with average power of between about 100 W and 1 kW and a peak power between about 100 kW and 4 MW. When the first amplified beam is coupled into a second-stage DPSS amplifier, the DPSS amplifier produces a second amplified beam having an average power between about 2 kW and 10 kW and a peak power between about 2 MW and 20 MW.

Example 2

Figure 26:
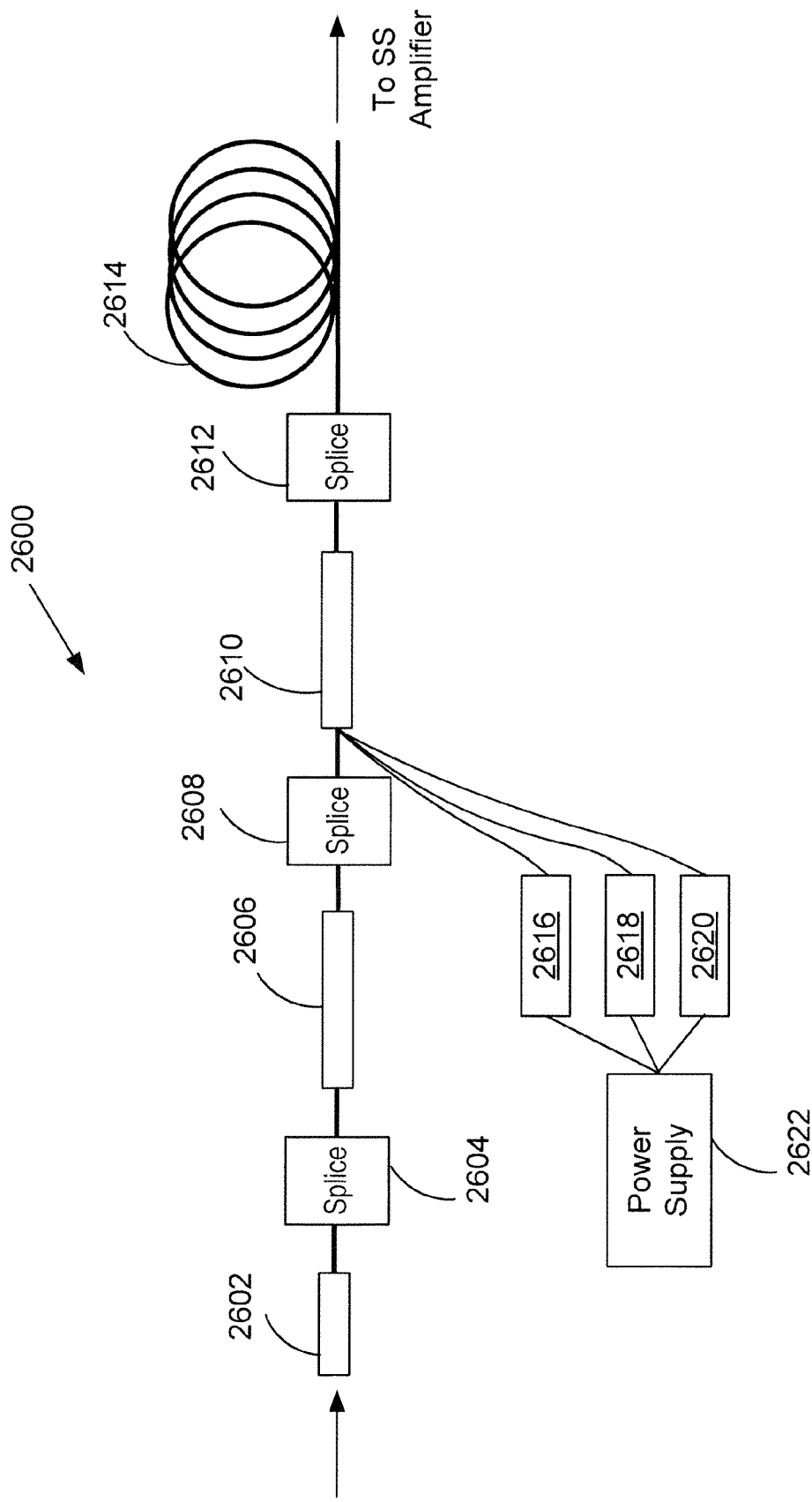
FIG. 26 is a schematic diagram of a representative active taper amplifier configured for co-propagating pump radiation which can be included in a multi-stage laser amplifier system.

An example of an active taper amplifier 2600 configured for co-propagating pump radiation is illustrated in FIG. 26. An input beam from a seed laser is directed to a fiber 2602, which can be part of a fiber-coupled seed laser or the input beam can be free space coupled into the fiber 2602. In the case of free space coupling, it may be desirable to angle cut the end of the fiber receiving the input beam to reduce back reflection. The fiber 2602 is coupled via a splice 2604 to a fiber 2606, which can be configured as a fiber amplifier, if desired, and include a pump radiation source and combiner not shown. For example, the fiber 2606 can be a conventional fiber amplifier or an active taper fiber amplifier as described herein. Further, the fiber 2606 can be configured as a pre-amplifier to control seed laser power. Optionally, the fiber 2606 is configured as or includes a mode filter.

The fiber 2606 is coupled via a splice 2608 to a combiner 2610 which receives input radiation from three pump sources 2616, 2618, 2620 coupled to a power supply 2622. Although three pump sources are shown, more or fewer pump sources are possible. The fiber 2606 and the splice 2604 are optional and can be omitted so that the fiber 2602 is coupled via the splice 2608 to the combiner 2610. The combiner 2610 can be a combiner as described herein, or other combiner known in the art. The combiner 2610 is coupled via a splice 2612 to an active taper 2614. The splice 2612 can be a recoated splice to reduce pump leakage if the active taper 2614 is a double clad taper.

The active taper 2614 can be any active taper described herein. In some examples, the active taper has an input core/cladding ratio of 25/250 μm, an output core/cladding ratio of 40/400 μm, and is doped with ytterbium having a core pump power absorption at 976 nm of 700 dB/m. However, in other examples, the output core/cladding ratio is 60/600 μm, 80/800 μm or greater, and the pump power absorption is between about 700 and 1200 dB/m. The active taper 2614 can be coiled to suppress higher-order modes and/or to improve beam quality. In some examples, the active taper 2614 is polarization maintaining. Output from the active taper 2614 is directed to a solid state amplifier (not shown) by free space optics. In this manner, the active taper amplifier 2600 performs a first stage of amplification as part of a multi-stage laser amplifier. In some embodiments, the amplifier 2600 produces an amplified beam having an average power between about 1 kW and a peak power of about 200 kW. In other embodiments, active taper amplifiers configured for co-propagating pump radiation produce amplified beams having an average power between about 100 W and 1 kW, a peak power between about 20 kW and 200 kW, a repetition rate between about 50 kHz and 1 MHz, and pulse widths between about 10 ps and 1 ns.

Example 3

Figure 27:
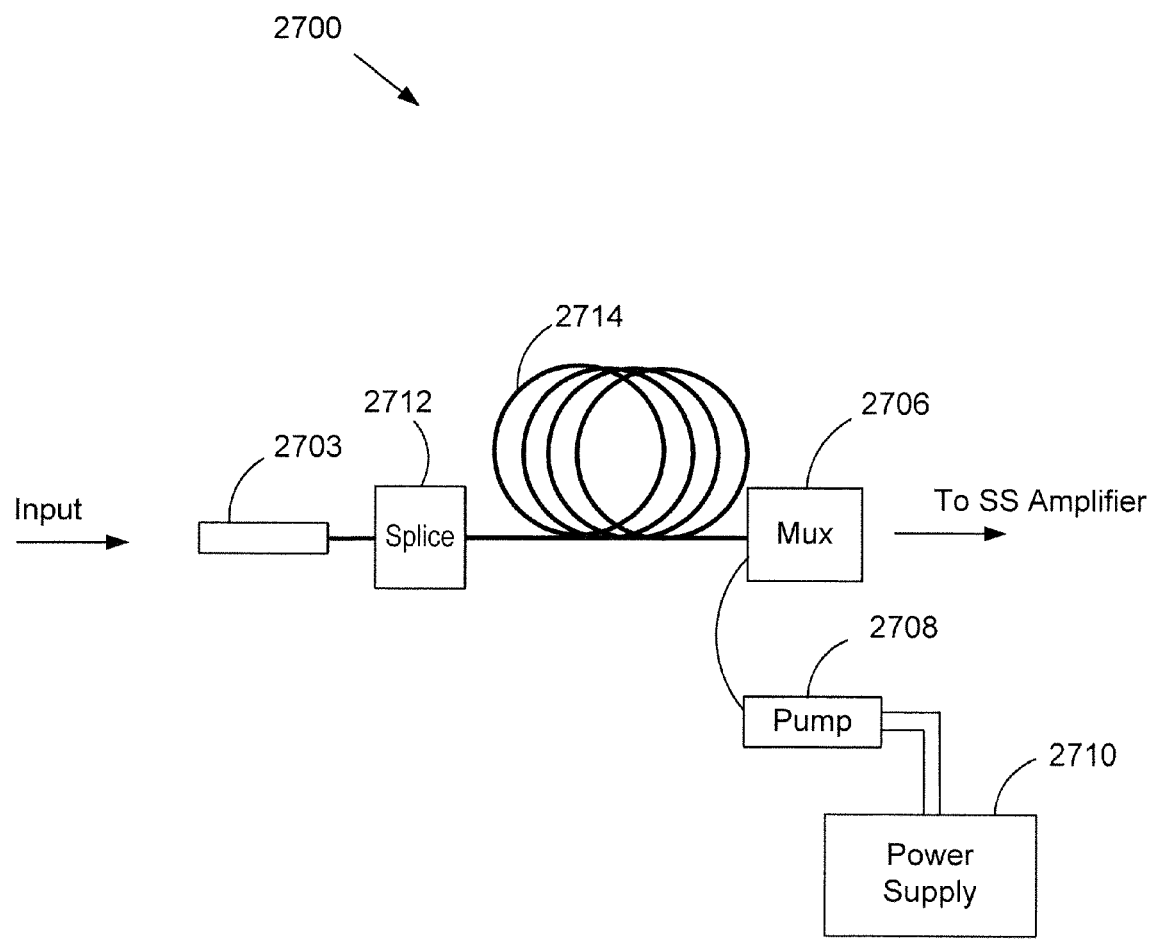
FIG. 27 is a schematic diagram of a representative active taper amplifier configured for counter-propagating pump radiation which can be included in a multi-stage laser amplifier system.

An example of an active taper amplifier 2700 configured for counter-propagating pump radiation is illustrated in FIG. 27. An input beam from a seed laser is directed to a fiber 2703, which can be configured as a fiber amplifier. The seed laser can be directly coupled into the fiber 2703, or the seed laser can be coupled into another fiber (not shown) that is spliced to the fiber 2703. The fiber 2703 is coupled via a splice 2712 to an active taper 2714, which can include any active taper described herein. In some examples, the active taper has an input core/cladding ratio of 25/250 μm, an output core/cladding ratio of 40/400 μm, and a pump power core absorption of 700 dB/m of ytterbium. However, in other examples, the output core/cladding ratio is 60/600 μm, 80/800 μm or greater, and the pump power absorption is between about 700 and 1200 dB/m. The active taper 2714 can be coiled to suppress higher-order modes and/or to improve beam quality. In some examples, the active taper 2714 is polarization maintaining.

The active taper 2714 receives counter-propagating pump radiation from a pump source 2708 coupled to a power supply 2710. The pump source 2708 can be one or more diode laser arrays. The pump radiation is coupled into the active taper 2714 using a multiplexer 2706, such as a free space or fiber multiplexer or other combiner. The splice 2712 can be configured to permit dumping of the unabsorbed pump radiation. For example, the splice 2712 can be configured to have a higher refractive index than that of the fiber in order to strip out undesired pump radiation and signal light not confined to the core. This pump dumping can be achieved by coating the splice 2712 with a compound or glue having a refractive index higher than the cladding refractive index of the fiber. Output from the active taper 2714 is directed to a solid state amplifier (not shown) by free space optics or fiber. In this manner, the active taper amplifier 2700 performs a first stage of application as part of a multi-stage laser amplifier.

In some implementations, active taper amplifiers configured for counter-propagating pump radiation can produce output amplified beams having average power between about 50 and 500 W, and peak powers between about 100 KW and 1 MW, or between about 1 MW and 4 MW. In other implementations, the amplified beam has an average power of about 66 W and a peak power of about 200 kW. In other embodiments, active taper amplifiers configured for counter-propagating pump radiation produce amplified beams having an average power between about 200 W and 2000 W, a peak power between about 200 kW and 1 MW, a repetition rate between about 10 kHz and 1 MHz, and pulse widths between about 1 ps and 100 ns.

In general, active taper fiber amplifiers used as the first stage of amplification in a multi-stage amplifier can be pumped using either co-propagating pump radiation or counter-propagating pump radiation, or both. That is, the pump source can be coupled to the active taper such that the pump radiation propagates either in the same direction as the seed beam (co-propagating) or in the opposite direction (counter-propagating). Typically, a counter-propagating pump configuration is preferred because higher peak powers can be achieved. However, co-propagating pump configurations can be used, and in some cases are more efficient than counter-propagating configurations.

Example 4

Figure 28:
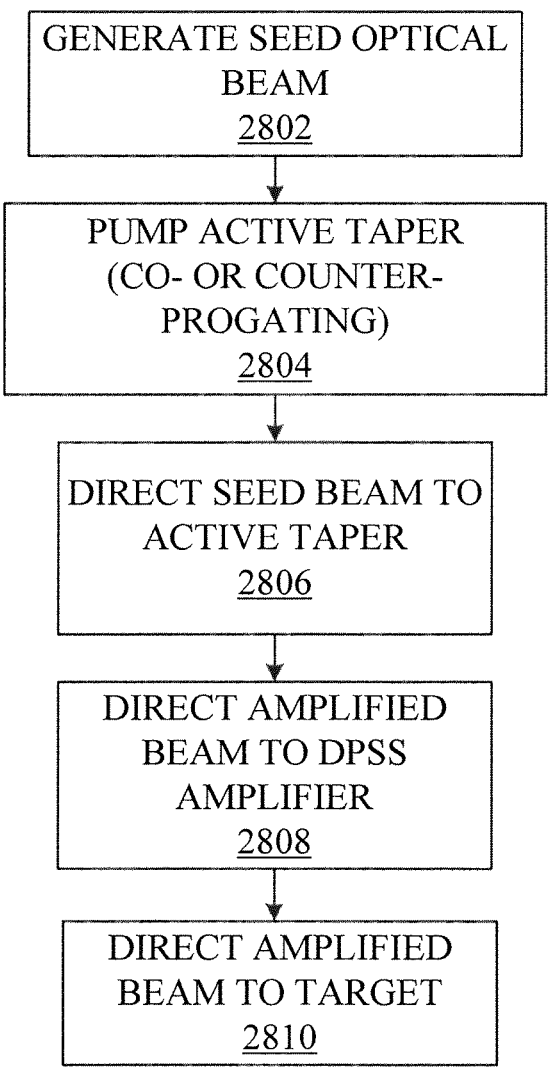
FIG. 28 is a block diagram of a representative method of amplifying an optical signal using multiple stages of amplification.

A representative method of amplifying an optical signal using multiple stages of amplification and using an active taper is illustrated in FIG. 28. A seed optical beam is generated at 2802. In some implementations, the seed optical beam propagates in fundamental mode and can be produced directly from a source or provided by mode filtering. At 2804, an active taper is pumped so as to produce optical gain. Co-propagating or counter-propagating pumping can be used. At 2806, the seed beam is directed to the active taper to produce a first amplified optical beam, and, at 2808, the first amplified beam is directed to a DPSS amplifier, or a multi-stage DPSS amplifier. The DPSS amplifier amplifies the first amplified beam to produce a second amplified beam. The second amplified optical beam is directed to a target or otherwise used at 2810. For example, the second amplified optical beam can be directed to nonlinear conversion optics for generating second, third or higher harmonic light. Active taper cross-sectional areas can be selected to control in radiance. For example, if a peak irradiance is to be less than a predetermined value, modal area in the taper can be selected accordingly so that peak optical power is not limited due to a permitted peak irradiance. Average power and irradiance can also be selected in the same manner.

Representative Nonlinear Conversion Systems Using Active Tapers

Example 1

Figure 29:
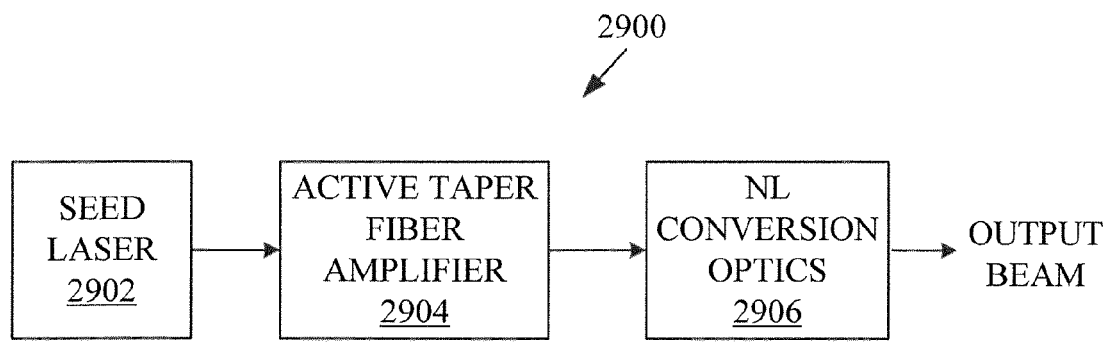
FIG. 29 is a schematic diagram of a representative nonlinear conversion system that includes an active taper amplifier.

A representative nonlinear conversion system 2900 that includes an active taper is illustrated in FIG. 29. A seed laser 2902 is configured to produce a seed optical beam at a wavelength suitable for amplification by a selected dopant. Typically, the seed beam has a preferred mode profile such as a lowest order mode profile. The seed beam is directed to an active taper fiber amplifier 2904 that includes an active taper as described herein. The seed laser 2902 can be coupled to the amplifier 2904 using various fiber or free-space techniques, or combinations thereof. The active taper fiber amplifier 2904 can include one or more pump sources, a combiner, a mode filter, and/or other components not shown in FIG. 29. The output from the active taper fiber amplifier 2904 is then directed to nonlinear conversion optics 2906. The optics 2906 include one or more nonlinear crystals, such as KTP, LBO, KDP, BBO, BiBO, PPLN, $LiNbO_3$ or others, as well as optics for controlling beam polarization, for directing the beam, and other components known in the art for adjusting phase-matching conditions. The nonlinear optics 2906 can be an optical parametric oscillator. The nonlinear conversion optics 2900 can be configured to generate second, third, or higher harmonics, or modulated or converted by nonlinear processes. Typically, the nonlinear conversion optics 2900 produces an output beam having a shorter wavelength than the input seed beam. However, in some implementations, the nonlinear conversion optics 2900 produces an output beam having a longer wavelength than the input seed beam.

Although FIG. 29 illustrates the output of amplifier 2904 coupled directly to the nonlinear conversion optics 2906, additional components can be situated intermediate the amplifier and the conversion optics. For example, a second stage of amplification can be performed before the beam is received by the nonlinear conversion optics 2906. In that case, an additional active taper amplifier or a solid state amplifier, such as the amplifier 2506 described above with respect to FIG. 25, can receive the amplified beam from the amplifier 2904. Furthermore, in addition to or instead of a second stage of amplification, a pulse compressor can be used to reduce the pulse width before the amplified beam is received by the conversion optics 2906.

In general, high peak powers are desired when performing nonlinear conversion. Conventional nonlinear conversion systems typically used diode pumped solid state lasers for nonlinear conversion. However, active taper fiber amplifiers described herein can achieve similar or better peak powers with similar or better beam quality, thus providing a low-cost, all-fiber alternative. Fiber amplifiers including active tapers can also provide several advantages over conventional fiber amplifiers as sources of high peak power for nonlinear conversion. For example, active tapers can produce amplified beams having higher peak powers while maintaining beam quality. This is because the maximum peak power of an active taper is not limited by nonlinearities in the same manner as a conventional fiber amplifier. Consequently, better nonlinear conversion can be achieved, and thus higher power converted beams.

For example, a parameter $M^2$, defined as a ratio of the beam parameter product of an actual beam to that of an ideal Gaussian beam at the same wavelength, can be used as a measure of beam quality. Desirably, the value for $M^2$ is close to 1, which indicates the beam shape is close to Gaussian. For single mode propagation in the fundamental mode, $M^2$ is exactly equal to one. Beam quality is relevant to nonlinear conversion because nonlinear conversion efficiency of a nonlinear crystal can depend on the size and brightness of the focused laser spot on the nonlinear crystal. Typically, the closer the value of $M^2$ is to 1, the better the focus, and therefore the higher the nonlinear conversion efficiency. Active tapers described herein are capable of producing beams with $M^2$ less than about 1.5, such as less than 1.4, 1.3, 1.2 or 1.1, while producing higher peak power amplified beams than conventional fiber amplifier systems.

Example 2

Figure 30:
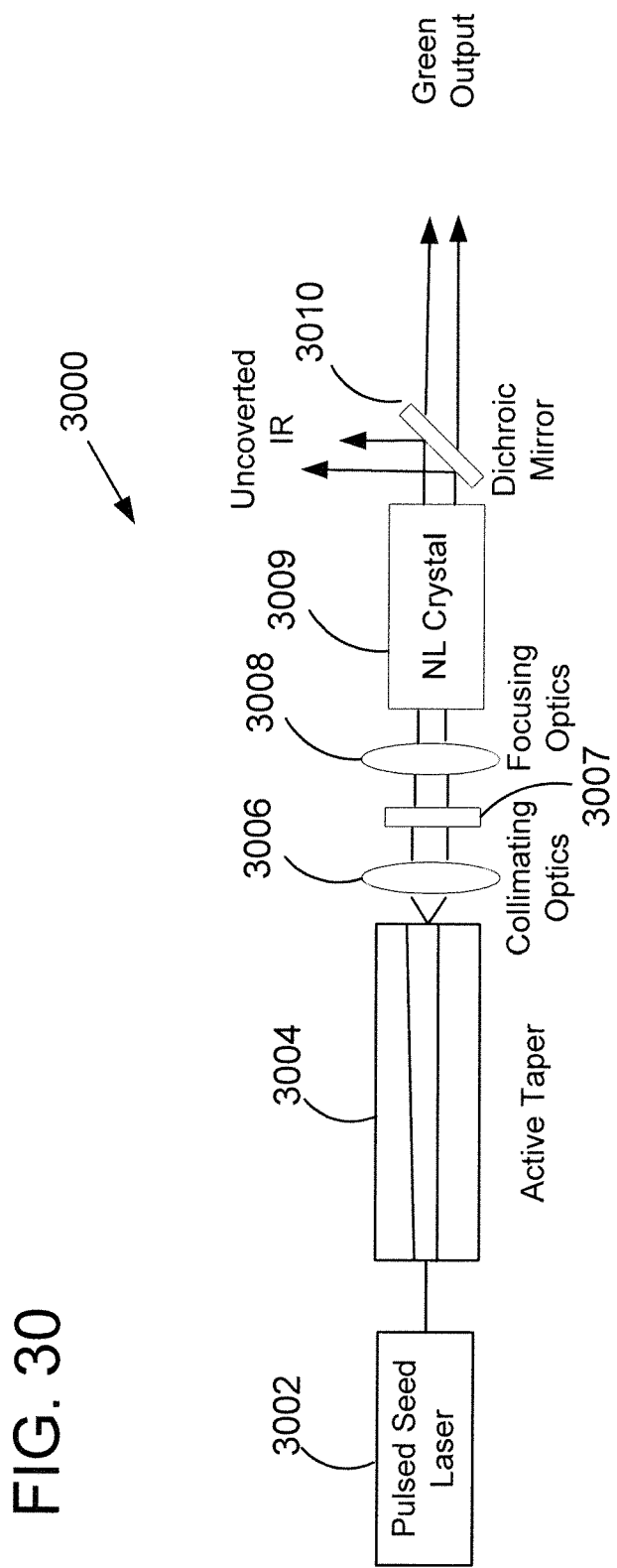
FIG. 30 is a schematic diagram of a representative green converting fiber laser using an active taper amplifier.

A representative green converting fiber laser 3000 using an active taper amplifier is illustrated in FIG. 30. The laser system 3000 is configured to produce green light from IR light using second harmonic generation. A pulsed seed laser 3002 generates a seed beam that is coupled into an active taper 3004, which can be any active taper described herein. Preferably, the seed laser 3002 is configured to produce a linearly polarized seed beam, and the active taper 3004 produces a linearly polarized output. The active taper 3004 produces an amplified beam that is directed through collimating optics 3006 to a half wave plate 3007 that is configured to control the orientation of the linear polarization of the amplified beam. The amplified beam is then directed through focusing optics 3008 to a nonlinear crystal 3009. In some embodiments, the nonlinear crystal is LBO, though other crystals can be used. Preferably, the half wave plate 3007 is configured to achieve phase matching in the nonlinear crystal 3009. For example, the half wave plate 3007 can be configured to align the polarization of the amplified beam with an axis of the nonlinear crystal 3009. Noncritical, critical, or quasi phase-matching techniques can be used. An oven can also be used to regulate the temperature of the nonlinear crystal 3009 to achieve phase-matching. However, in some examples, other phase-matching techniques can be used. A dichroic mirror 3010 can be used to separate unconverted seed radiation, in this example, IR radiation, from the converted radiation, in this example, green light.

Example 3

Figure 31:
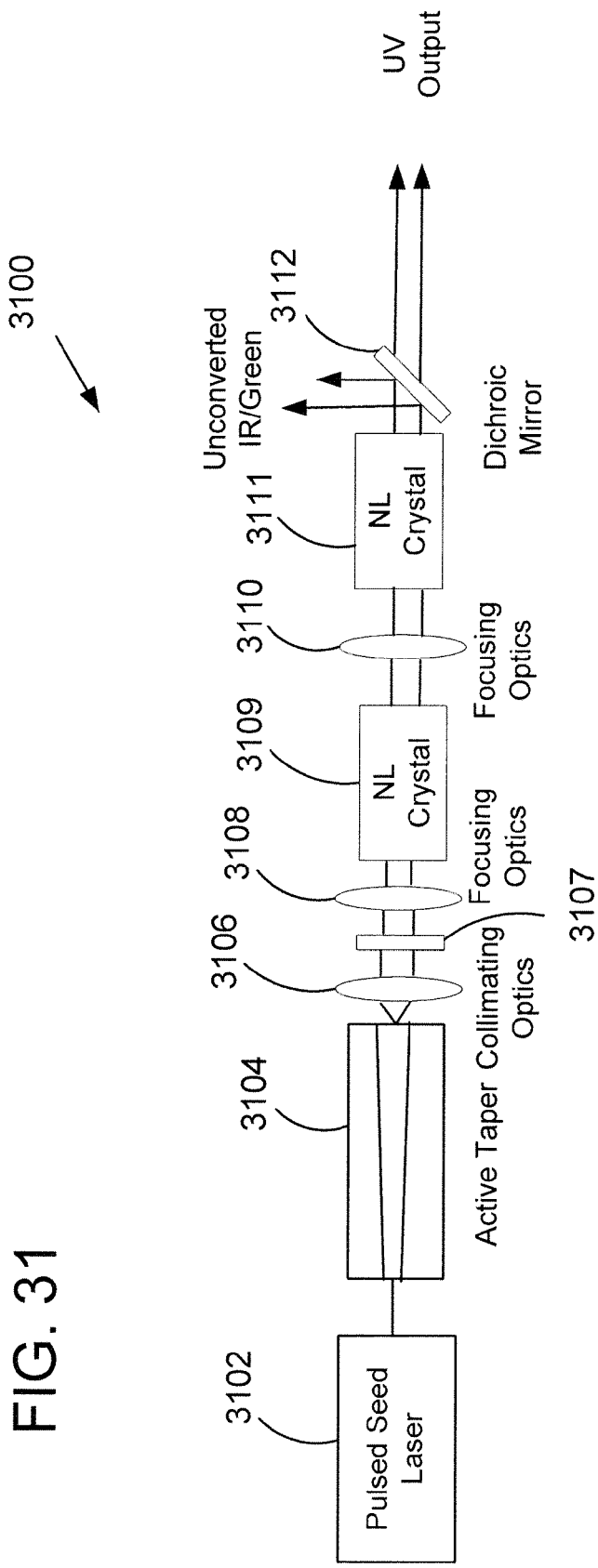
FIG. 31 is a schematic diagram of a representative UV-green converting fiber laser using an active taper amplifier.

A representative UV-green converting fiber laser 3100 using an active taper amplifier is illustrated in FIG. 31. The laser system 3100 is configured to produce green and UV light from IR light using third harmonic generation. In the figure, a pulsed seed laser 3102 generates a seed beam that is coupled into an active taper 3104, which can be any active taper described herein. Preferably, the seed laser 3102 is configured to produce a linearly polarized seed beam, and the active taper 3104 maintains a linear state of polarization. The active taper 3104 produces an amplified beam that is directed through collimating optics 3106 to a half wave plate 3107 that is configured to control the orientation of the linear polarization of the amplified beam. The amplified beam is then directed through focusing optics 3108 to a first nonlinear crystal 3109, which is selected to produce a second harmonic of the amplified beam. In some embodiments, the first nonlinear crystal is LBO, though other crystals can be used.

The amplified beam and its second harmonic are then directed through focusing optics 3110 to a second nonlinear crystal 3111, which is selected to produce third harmonic radiation by frequency mixing of the amplified beam and its second harmonic. In some embodiments, the second nonlinear crystal is also LBO, though other crystals can be used. Preferably, the half wave plate 3107 is configured to satisfy the phase matching conditions of the first and second nonlinear crystals 3109, 3111. For example, the half wave plate 3107 can be configured to align the polarization of the amplified beam with axes of the nonlinear crystals 3109, 3111. Various optical components can be situated between the first nonlinear crystal 3109 and the second nonlinear crystal 3111, such as for temporal alignment, spatial alignment, or walk off compensation. Noncritical, critical or quasi phase-matching techniques can be used. One or more ovens can also be used to regulate the temperature of the first nonlinear crystal 3109 and the second nonlinear crystal 3111 to achieve phase-matching. However, in some examples, other phase-matching techniques can be used. A dichroic mirror 3112 can be used to separate unconverted seed radiation, in this example, IR radiation, as well as unconverted second harmonic radiation, from the third harmonic radiation, in this example, UV light.

Example 4

Figure 32:
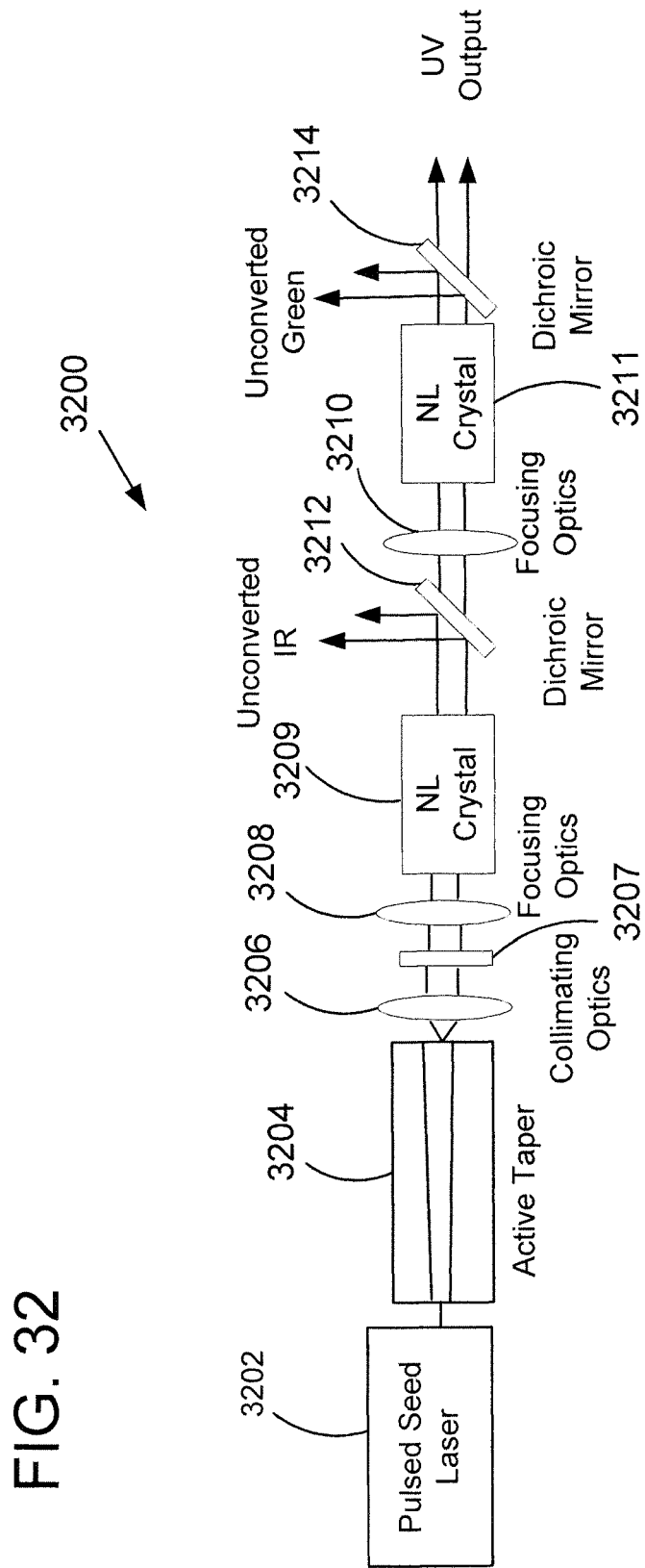
FIG. 32 is a schematic diagram of another representative UV-green converting fiber laser using an active taper amplifier.

Another example of a UV-green converting fiber laser 3200 using an active taper amplifier is illustrated in FIG. 32. The laser system 3200 is configured to produce green and UV light from IR light using two stages of second harmonic generation. In the figure, a pulsed seed laser 3202 generates a seed beam that is coupled into an active taper 3204, which can be any active taper described herein. The active taper 3204 produces an amplified beam that is directed through collimating optics 3206 to a half wave plate 3207, which is configured to control the polarization of the amplified beam. The amplified beam is then directed through focusing optics 3208 to a first nonlinear crystal 3209, which is selected to produce second harmonic radiation from the amplified light beam. In some embodiments, the first nonlinear crystal is LBO, though other crystals can be used. A dichroic mirror 3212 can be used to separate unconverted seed radiation, in this example, IR light, from the second harmonic radiation, in this example, green light.

The second harmonic radiation is then directed through focusing optics 3210 to a second nonlinear crystal 3211, which is selected to produce second harmonic radiation from the second harmonic radiation produced by the first nonlinear crystal 3209, i.e. to produce fourth harmonic radiation. In some embodiments, the second nonlinear crystal is also BiBO, though other crystals can be used. Preferably, the half wave plate 3207 is configured to align the polarization of the amplified beam with axes of the first and second nonlinear crystals 3209, 3211. However, a second half wave plate can be included between the first nonlinear crystal 3209 and the second nonlinear crystal 3211 to ensure that the polarization of the beam is aligned with the corresponding crystal axis. Noncritical, critical or quasi phase-matching techniques can be used with one or both of the first nonlinear crystal 3209 and the second nonlinear crystal 3211. However, in some examples, other phase-matching techniques can be used. A dichroic mirror 3214 can be used to separate second harmonic radiation from the fourth harmonic radiation.

Example 5

Figure 33:
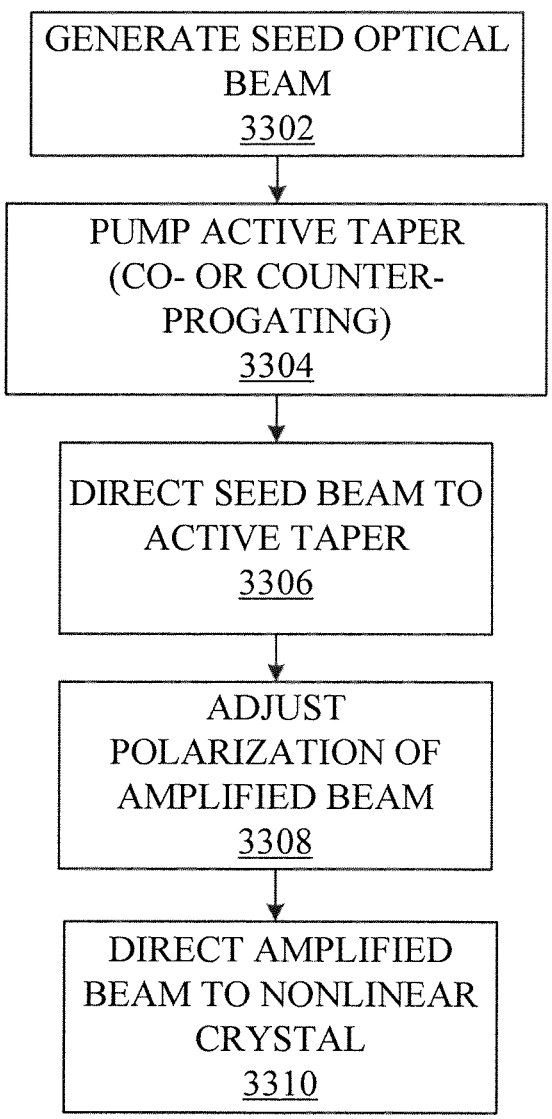
FIG. 33 is a block diagram of a representative method of nonlinear conversion of a beam amplified using an active taper fiber amplifier.

A representative method of nonlinear conversion of a beam amplified using an active taper fiber amplifier is illustrated in FIG. 33. A seed optical beam is generated at 3302. In some implementations, the seed optical beam propagates in fundamental mode and can be produced directly from a source or provided by mode filtering. At 3304, an active taper is pumped so as to produce optical gain. Co-propagating, counter-propagating, or side pumping can be used. At 3306, the seed beam is directed to the active taper to produce an amplified optical beam. At 3308, the polarization of the amplified beam is adjusted to align with an axis of a nonlinear crystal, and at 3310, the beam is directed to the nonlinear crystal.

Representative Chirped Pulse Amplifiers Using Active Tapers

Although active taper fiber amplifiers can achieve higher peak powers (peak power can be defined as the pulse energy divided by the pulse length) than conventional fiber amplifiers by reducing the effects of nonlinearities, peak powers can still be limited by nonlinearities. By temporally stretching seed pulses prior to amplification, and then compressing the pulses after amplification, even higher peak power levels can be achieved using active taper fiber amplifiers.

Figure 34:
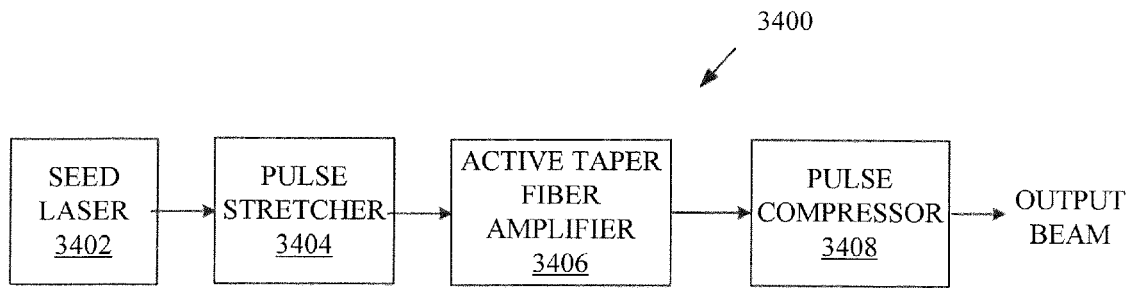
FIG. 34 is a schematic diagram of a representative chirped pulse amplification system that includes an active taper amplifier.

A representative pulse stretching and pulse compression 3400 that includes an active taper is illustrated in FIG. 34. The system 3400 can include a chirped fiber grating. A seed laser 3402 is configured to produce a pulsed seed optical beam at a wavelength suitable for amplification by a selected dopant. The pulsed seed beam is directed to a pulse stretcher 3404, which is configured to chirp and temporally spread/stretch (lengthen) pulses of the pulsed seed beam. The pulses of the pulsed seed beam can be transform-limited pulses. The stretcher 3404 is coupled to an active taper fiber amplifier 3406 that includes an active taper as described herein. The active taper fiber amplifier 3406 can include one or more pump sources, a combiner, a mode filter, and/or other components not shown in FIG. 34. The amplifier 3406 receives the stretched pulses and produces an amplified beam of stretched pulses, which is directed to a pulse compressor 3408. The pulse compressor 3408 is configured to remove or at least partially reduce the chirp and to temporally compress (shorten) the pulses, thereby producing a beam of amplified compressed pulses. Typically, the compressor 3408 is a free space compressor if the peak power of the compressed pulses exceeds a nonlinear threshold of a fiber compressor. The output beam can be directed to nonlinear conversion optics which typically produces temporarily shorter harmonic pulses.

The stretcher and/or compressor can include one or more gratings, prisms, fiber or volume Bragg gratings, bulk dispersive optical glasses, chirped mirrors, conventional or dispersion-shifted fibers, or other dispersive elements configured to lengthen or shorten received optical pulses. In some examples, the stretcher and/or compressor includes one or more power selective optical filters, such as those described in Koplow, U.S. Patent Publication No. 2011/0157671, which is incorporated herein by reference. In some examples, a spatial light modulator is used to shape received pulses or to compensate for higher order dispersion, in addition to or instead of other techniques for stretching and/or compressing pulses. In other examples, the compressor is configured to use quadratic phase modulation or other nonlinear processes to compress the optical pulses in addition to or instead of dispersive elements or filters.

Although the stretcher 3404 is shown in FIG. 34 to be separate from the seed laser 3402, in some implementations, the stretcher 3404 and the seed laser 3402 are combined and referred to together as the seed laser source. That is, the seed laser 3402 can be configured to produce stretched and/or chirped pulses. In some examples, a separate stretcher component from the seed source 3402 is not necessary. In other examples, the seed laser 3402 is configured to produce stretched and/or chirped pulses, and a separate stretcher component is also used to stretch and/or chirp the pulses.

Referring to FIG. 34, additional components can be situated intermediate the amplifier 3406 and the compressor 3408. For example, a second (or third) stage of amplification can be performed before the beam is received by the pulse compressor 3408. In that case, an additional active taper amplifier or a solid state amplifier, such as the amplifier 2506 described above with respect to FIG. 25, can receive the amplified beam from the amplifier 3406.

In general, active taper fiber amplifiers can be advantageous over conventional fiber amplifiers when used in a chirped pulse amplification system. For example, because active taper fibers reduce nonlinear effects, higher peak powers can be produced. Furthermore, beams produced by active taper fibers can have higher $M^2$ values (a measure of beam quality) at these higher powers.

Representative Seed Laser and Pump Laser Control Systems

Example 1

In some embodiments described herein, one or more of the pump sources include additional components configured to perform spectral narrowing of the pump radiation or to stabilize a spectrum of the pump radiation. For example, pump modules that are frequency stabilized using distributed feedback lasers (DFBs) can be used. By stabilizing a spectrum of a pump module, wavelength stable operation can be achieved over a range of operating powers and temperatures, allowing the pump module to have improved absorption at the peak of the relatively narrow absorption line of the active ions in the active taper fiber amplifier. For example, more of the pump light can be absorbed by the active taper, producing less pump leakage through the active taper. Improving pump absorption can be advantageous because a shorter active taper then be used, while still reducing fiber nonlinearities (e.g., a Stimulated Raman Scattering threshold can be increased). Additionally, improved pump absorption increases the pump to laser light conversion efficiency.

In other examples, a narrow linewidth pump source can be used, which includes a diode and one or more volume Bragg gratings (VBGs). Spectrally narrowed pump sources can, in some instances, increase the efficiency of absorption of the pump radiation by a doped fiber. Consequently, the length of the doped fiber can be reduced while achieving the same pump absorption, resulting in a lower nonlinear threshold since nonlinearities scale with effective fiber length. Active taper amplifiers including narrow linewidth pumps can be advantageous over conventional fiber amplifiers because higher peak power, high beam quality radiation can be produced.

Example 2

In some embodiments, seed laser sources can include additional components for controlling the peak or average power of the radiation output by the seed laser or received by an active taper. For example, a current source controller can be coupled to the seed laser to allow for adjustment of the power of the output seed beam through adjustment of current supplied to the seed laser. In some embodiments that include active taper fiber amplifiers, a pre-amplifier can be coupled to the seed laser and configured to control the power of radiation received by the active taper. For example, the pre-amplifier can be situated so as to receive the seed beam and to direct a pre-amplified beam to the active taper fiber amplifier. Further, the amplification of the seed beam by the pre-amplifier can be controlled (such as by controlling pump sources for the pre-amplifier), thereby controlling the power of the pre-amplified beam received by the active taper fiber.

These and other techniques for controlling the power of the radiation coupled into an active taper can improve the performance of an active taper fiber amplifier. For example, if the seed power is too low, power conversion efficiency in the active taper may be poor. Additionally, if the seed power is too high, nonlinear effects may occur in the small section of the taper, which can lead to production of undesirable spectral components from the active taper amplifier (e.g., amplified stimulated emission, Raman, etc.). Seed laser source controllers can be used to balance power conversion efficiency and nonlinear effects in the active taper.

Example 3

Figure 35:
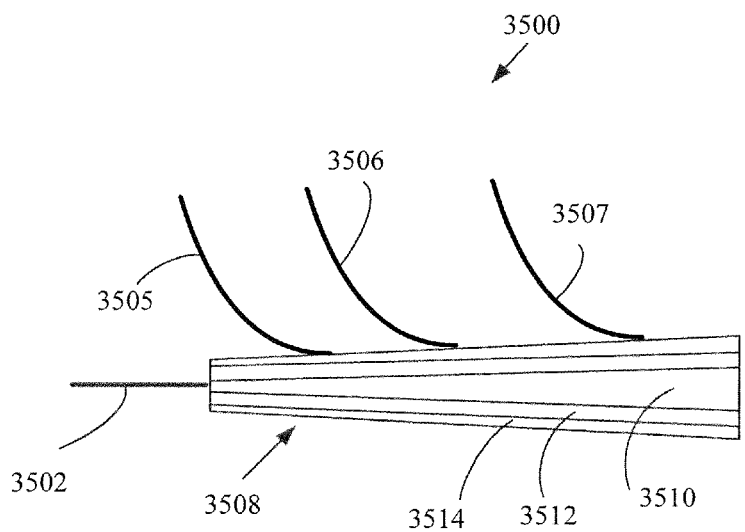
FIG. 35 is a block diagram of an exemplary distributed pumping configuration that includes an active taper.

FIG. 35 provides an exemplary distributed pumping configuration 3500 of an active taper 3508. Such a configuration allows for control of pump power along the length of the active taper. A seed laser input fiber 3502 is coupled to the active taper 3508 that includes a tapered core 3510, an inner cladding 3512 and an outer cladding 3514. The seed laser input fiber 3502 can be a single mode fiber, a few mode fiber, or a multimode fiber. If a few mode or multimode fiber is used, a mode filter can be provided so that a seed beam propagates in the seed fiber 3502 primarily in a fundamental mode as coupled to the active taper 3508. In some examples, the seed laser is coupled to one or more amplifiers, which are then coupled to the active taper 3508 by the fiber 3502. In such an implementation, the fiber 3502 delivers an amplified seed beam to the active taper 3508.

Pump fibers 3505, 3506, 3507 are coupled to the active taper 3508, such as by directly fusing the pump fiber to the cladding of the active taper. Pump radiation is directed into the pump fibers 3505, 3506, 3507 for pumping a rare earth or other active dopant in the tapered core 3510. Although FIG. 35 shows three pump fibers, more or fewer fibers can be used. Furthermore, the pump radiation delivered by each pump fiber can be the same or each pump fiber can deliver pump radiation of different power. For example, the pump fiber 3505 can deliver 1 W of pump radiation, the pump fiber 3506 can deliver 10 W of pump radiation, and the pump fiber 3507 can deliver 100 W of pump radiation. Typically, pump power delivered by pump fibers coupled to the smaller section of the active taper is lower than pump power delivered by pump fibers coupled to the larger section of the active taper. That is, pump power increases along the length of the active taper from the input section to the output section. In some examples, distribution pump sources are situated to provide constant gain, increasing gain, or decreasing gain along a taper length.

In general, distributed pumping configurations can be advantageous for controlling the pump radiation received by the active taper. Distributed pumping can allow for control of the signal gain along the length of the active taper. For example, pump levels can be adjusted at the beginning of the taper to limit nonlinearity in the small section of the taper (such as by maintaining a lower relative pump power). Additionally, pump levels can be selected to enhance the power conversion efficiency in the large section of the taper (such as by maintaining a higher relative pump power), as well as to maintain pump power below the nonlinearity threshold of the particular active taper. Thus, adverse effects of nonlinearities can be further reduced.

Any of the active taper fiber amplifiers described herein can be implemented with one or more of the described seed laser and pump laser controls.

Representative Active Tapers Coils

In general, coiling of active fibers can be used as a method for maintaining or improving the quality of the beam (e.g., $M^2$ value) produced by a fiber or fiber taper. Coiling of a fiber can be performed by bending the fiber, typically to form a circular, spiral-like, or other curved or bent shape. Each coil of a plurality of coils can be described by a coil diameter or radius (e.g., a bend radius) measured based on its circular-like shape. The coil radius can be variable. Coiling of an active taper can enhance propagation in the fundamental mode and reduce coupling into higher-order or transverse modes. Coiling can also discriminate against higher-order modes by making them unsupported by the waveguide. For active tapers having an input section with a few mode or multimode core and an output section with a multimode core, coiling can be particularly important for maintaining good beam quality. Typically, if a fiber is coiled too tightly (e.g., a small bend radius), however, the fundamental mode may shrink, or walk off the core. This can result in nonlinearities at a lower peak powers than predicted, or in reduced fundamental mode gain while higher order mode gain is enhanced.

Example 1

FIG. 36A illustrates an exemplary spiral-shaped coiling of an active taper 3600. The active taper has an input section 3602 and an output section 3604, wherein the output section 3604 has a larger core radius than the input section 3602. As shown, the input section 3602 is part of a smaller radius coil than the output section 3604, which is part of a larger radius coil. The coil illustrated in FIG. 36A can be referred to as having a varying coiling radius between the input section 3602 and the output section 3604. This coiling radius increases at a relatively slow rate, e.g. approximately linearly, along the active taper length from the input section 3602 to the output section 3604. All the coils of the spiral can be formed on the same plane, so that the spiral is relatively flat. Alternatively, the spiral can be expanded so as to form a cone, as shown in FIG. 36B, where the centerline of the cone intersects the center of the spiral. In other examples, the active taper 3600 is coiled and secured to a conical surface, or sloped, or a conical surface and secured in a conical shape using an epoxy or other material such as a thermoplastic material. The coil 3682 is shown as having regular variations in coil radius and a gradually increasing coil radius. In other examples, coil radius varies smoothly, and coil radius increases and decreases from input section 3602 to output section 3604. Coils can also be formed or secured based on other shapes such as spheres, ellipsoids, paraboloids, ovoids, or others.

Example 2

FIG. 37 illustrates another exemplary spiral-shaped active taper coil 3700. The active taper has an input section 3710 and an output section 3712, wherein the output section 3712 has a larger core radius than the input section 3710. As shown, the input section 3710 is part of a smaller radius coil than the output section 3712, which is part of a larger radius coil. Relative to the coiling illustrated in FIG. 36A, the coiling radius in FIG. 37 increases at a faster rate between the input section 3710 and the output section 3712. Rates of change of coiling radii different from those shown here are possible. The coiling in FIG. 37 can be formed on a plane (e.g., flat) or expanded to form a cone or other shape.

Representative Tapers

Figure 38:
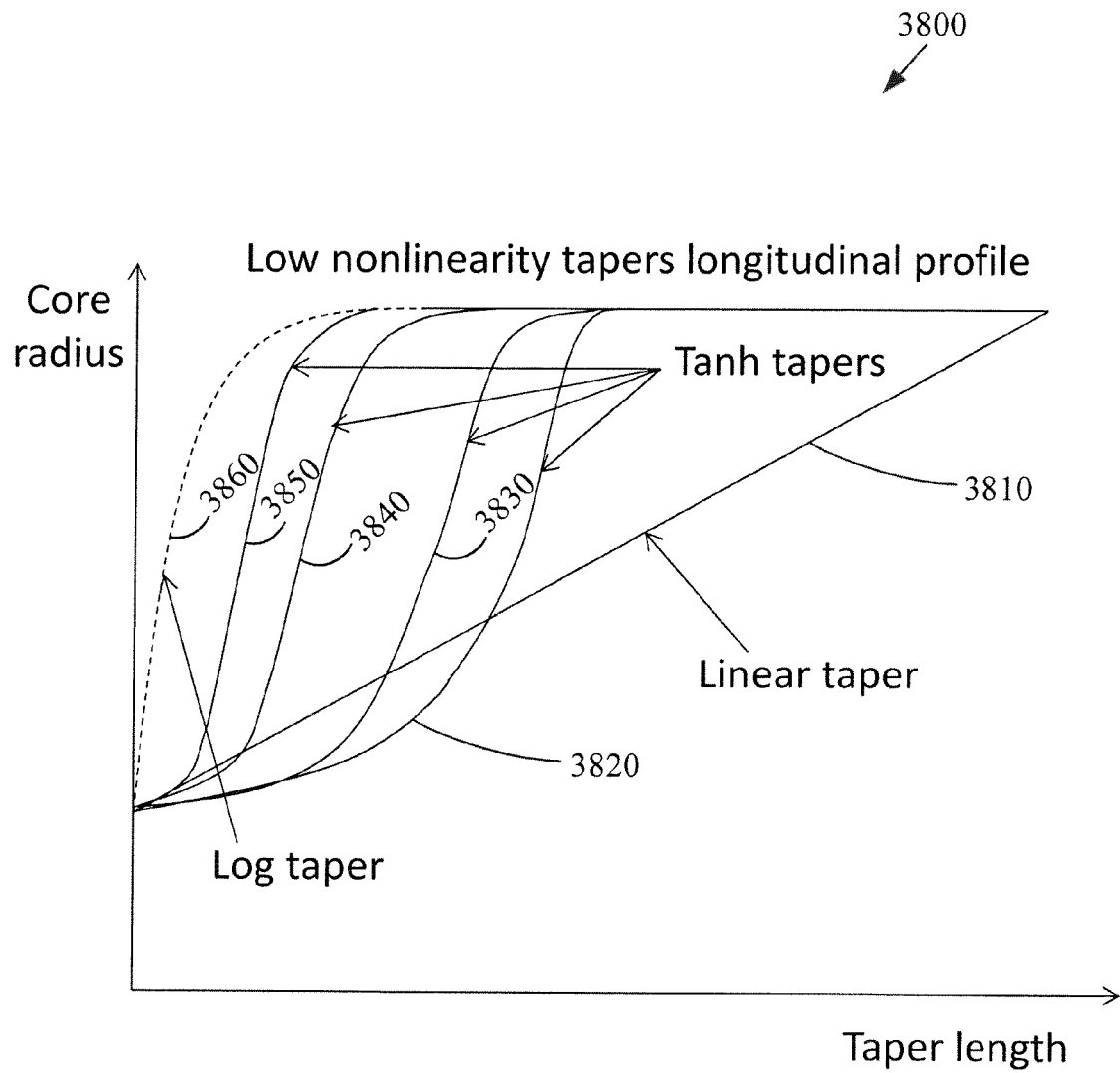
FIG. 38 is a plot of exemplary longitudinal profiles for active tapers.

In some implementations, it can be advantageous to increase the coiling radius in a manner that corresponds to the rate at which the core of the taper increases as a function of taper length. FIG. 38 is a plot 3800 of exemplary longitudinal profiles for active tapers. The length of the active taper is plotted along the x-axis and the core radius is plotted along the y-axis. Thus, the plotted curved lines indicate the rate of change of active taper core radius per unit length. A line 3810 represents a linear taper with a linear longitudinal profile, and a curve 3820 corresponds to a representative hyperbolic tangent profile. Other hyperbolic tangents 3830, 3840, 3850 and a logarithmic taper 3860 are shown as well.

For a linear taper, represented by the line 3810, a spiral with a slowly varying coiling radius, such as that in FIG. 36A, may be preferred so that the rate at which the coiling radius increases is closely related to the rate of increase of the taper core radius. For a taper having a core diameter that increases based on a logarithmic or hyperbolic tangent function, it may be preferable to coil the active taper so that the spiral radius increases more quickly from the input section to the output section. For example, the longitudinal profile represented by line 3820 corresponds to a taper with an input section having a small core radius that is substantially constant, followed by a short transition region in which the core radius changes from the small core radius to a larger core radius, followed by an output section having the larger core radius. It may be preferable to coil an active taper having the longitudinal profile represented by curve 3820 according to coiling as shown in FIG. 37 since the coiling radius varies in a similar manner.

Coil radii (such as local coil radii for coils that have a varying radius) can be selected based on a taper profile of an associated active taper. For example, coil radius can be proportional to core radius or a power thereof. Alternatively, an active tape can be provided with a one, two, three, or more selected coil diameters corresponding to portions of the active taper having different core radii.

Any of the active taper fiber amplifiers described herein can be implemented with coiled active tapers.

Representative Confined Doping

In some embodiments, the active taper core can be provided with a confined doping. Typically, confining doping to a more central region improves beam quality and increases conversion efficiency. As used herein, a confined doping refers to a core doping with active ions within a portion of a core that is less than the full core diameter or effective cross-sectional area, and typically restricted to a volume defined by a diameter or effective diameter that is less than about 0.2, 0.4, 0.5, 0.75, 0.8, 0.9, 0.95, or 0.99 times the core diameter or core effective diameter. In some examples, active ion dopant extends throughout the core.

Figure 39:
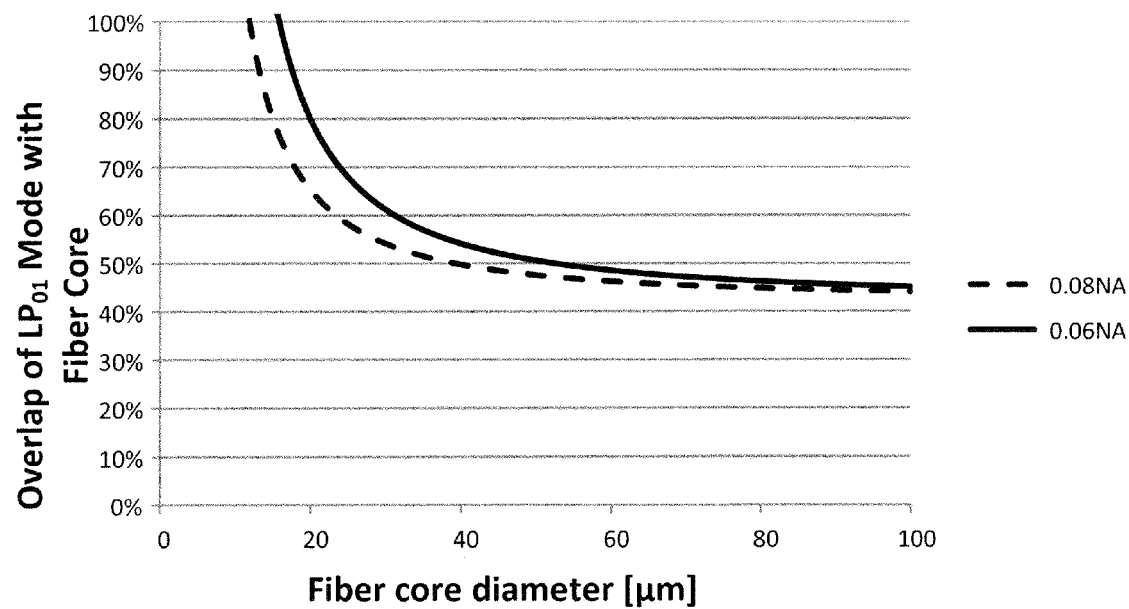
FIG. 39 is a plot of mode overlap as a function of core diameter for an active taper.

Through confined doping of the core, the gain of higher order modes is reduced relative to the gain of the fundamental mode. In addition, confined doping can result in better overlap of the fundamental mode with the fiber gain. That is, there is better overlap between the mode field diameter and the doped core section, resulting in better power conversion efficiency. For active tapers having a very large mode field area, such as active tapers with multimode or low mode cores, confined doping can be particularly advantageous, as demonstrated in plot 3900 illustrated in FIG. 39. The plot 3900 shows the amount of overlap of the $LP_{01}$ mode of an active taper with a ytterbium doped core as a function of the core diameter for two different size, non-coiled fibers. As shown, the larger mode area fiber has less overlap, and thus could benefit from the increased power conversion efficiency that can result from confined doping.

Any of the active taper fiber amplifiers described herein can be implemented with active tapers having cores with confined doping.

While the disclosed technology is illustrated above with reference to representative embodiments, these embodiments are not to be taken as limiting. For example, various combinations of tapers can be used, wherein each or some tapers are selected so as to mitigate the effects of amplified spontaneous emission, nonlinear effects, or for other reasons. We claim all that is encompassed by the appended claims.

We claim:

1. A nonlinear conversion system, comprising:
an active taper, comprising a rare earth doped, variable mode core surrounded by at least an inner cladding and situated to receive an input seed beam, wherein the variable mode core of the active taper is a variable diameter core doped with an active rare earth dopant and extending along a taper axis, wherein the variable diameter core has a core diameter $d_{core}$ that is a function of position along the taper axis, and the dopant in the variable diameter core is confined to a diameter that is less than 0.9, 0.8, 0.6, or 0.5 $d_{core}$;
an optical pump situated so as to direct pump optical radiation to at least a rare earth doped portion of the variable mode core; and
a nonlinear crystal situated so as to receive an amplified beam produced by optical gain in the active taper and configured to produce a converted beam having a wavelength different than a wavelength of the input seed beam.

2. The system of claim 1 further comprising:
a seed laser configured to produce the input seed beam, wherein the input seed beam is a pulsed seed optical beam,
wherein the inner cladding is situated about the variable diameter core, and the active taper further comprises an outer cladding situated about the inner cladding, wherein the inner cladding has an average refractive index lower than an effective refractive index of the variable diameter core and the outer cladding has a refractive index lower than the refractive index of the inner cladding,
wherein the optical pump is situated so as to direct the pump optical radiation to at least the inner cladding, and
wherein the wavelength of the converted beam is shorter than the wavelength of the input seed beam.

3. The system of claim 1, further comprising:
a mode filter coupled to the active taper, and situated so as to receive the input seed beam and deliver a mode filtered seed beam to the variable mode core.

4. The system of claim 2, wherein a ratio of a diameter of the variable diameter core to a diameter of the inner cladding and the outer cladding is constant along the taper axis.

5. The system of claim 1, wherein the variable mode core includes an input section in which the variable mode core is a few mode or single mode core and an output section in which the variable mode core is a multimode core.

6. The system of claim 1, further comprising:
a mode filter coupled to the active taper and situated so as to receive the input seed beam and deliver a mode filtered seed beam to the variable mode core, the mode filter comprising:
an input multimode fiber section operable to receive the input seed beam;
a passive mode filtering section operable to attenuate fiber modes in the input seed beam as received from the input multimode fiber section, wherein the passive mode filtering section provides at least about 3 dB of attenuation of an $LP_{11}$ mode propagating in the mode filtering fiber section; and an output multimode fiber section situated to receive the mode filtered seed beam and situated so that the mode filtered seed beam substantially excites only a lowest order mode in the output multimode fiber section, wherein the output multimode fiber section is coupled to the active taper.

7. The system of claim 1 wherein the input seed beam is linearly polarized and the active taper is polarization maintaining.

8. The system of claim 1, further comprising:
a half wave plate situated to receive the amplified beam and configured to rotate polarization of the amplified beam to be aligned with an axis of the nonlinear crystal, wherein the nonlinear crystal is situated to receive the polarization rotated amplified beam.

9. The system of claim 1, wherein the amplified beam is characterized by an $M^2$ value less than about 1.5 and the active taper is configured to produce a peak power in the amplified beam at least 500 kW.

10. The system of claim 9, wherein the active taper includes an input section and an output section, the variable mode core having an input core diameter in the input section of between about 10 µm and about 30 µm and an output core diameter in the output section of between about 40 µm and about 100 µm, and the inner cladding having an input cladding diameter of between about 100 µm and about 300 µm and an output cladding diameter of between about 400 µm and about 1000 µm.

11. The system of claim 10, wherein the output core diameter in the output section is between about 80 µm and about 100 µm, the output cladding diameter in the output section is between about 800 µm and about 1000 µm, and the peak power in the amplified beam is at least 750 kW.

12. The system of claim 1, wherein the amplified beam is characterized by an $M^2$ value less than about 1.2 and the active taper is configured to a peak power in the amplified beam at least 250 kW.

13. The system of claim 1, further comprising:
a pulse compressor situated so as to receive the amplified beam, and configured to temporarily compress the amplified beam directed to the nonlinear crystal.

14. The system of claim , wherein the amplified beam is a first amplified beam, further comprising:
a solid state amplifier situated so as to receive the first amplified beam, and configured to produce a second amplified beam directed to the nonlinear crystal.

15. The system of claim 1, wherein the nonlinear crystal is configured to produce a converted beam using second, third or higher order harmonic generation.

16. The system of claim 1, wherein the nonlinear crystal is a first nonlinear crystal and the converted beam is a first converted beam, further comprising:
a second nonlinear crystal situated to receive the first converted beam and to produce a second converted beam based on third, fourth or higher order harmonic generation.

17. A nonlinear conversion system, comprising:
a light source for producing an input seed beam;
a multimode fiber amplifier, comprising an active taper situated to receive the input seed beam and comprising a rare earth doped, variable mode core surrounded by at least an inner cladding, wherein at least a portion of the variable mode core has a varying core size, and wherein the active taper is coiled in a spiral-shape so that a rate of increase of a coiling radius corresponds to a rate of increase of the varying core size;
an optical pump situated so as to direct pump optical radiation to at least a rare earth doped portion of the variable mode core; and
a nonlinear crystal situated so as to receive an amplified beam produced by optical gain in the active taper and configured to produce a converted beam having a wavelength different than a wavelength of the input seed beam.

18. The system of claim 17, wherein the portion of the active taper having the varying core size has a monotonically increasing core diameter along an axis of the active taper.

19. The system of claim 17, wherein the portion of the active taper having the varying core size includes an input section having a core size corresponding to a few mode core and an output section having a core size corresponding to a multimode core.

20. A method, comprising:
directing a seed optical beam to an active taper comprising a rare earth doped, variable mode core surrounded by at least an inner cladding, wherein the variable mode core of the active taper is a variable diameter core doped with an active rare earth dopant and extending along a taper axis, wherein the variable diameter core has a core diameter $d_{core}$ that is a function of position along the taper axis, and the dopant in the variable diameter core is confined to a diameter that is less than 0.9, 0.8, 0.6, or 0.5 $d_{core}$;
pumping the active taper to produce optical gain by directing pump optical radiation to at least a rare earth doped portion of the variable mode core;
amplifying the seed optical beam in the pumped, active taper so as to produce an amplified optical beam propagating in a fundamental mode of the active taper;
directing the amplified optical beam to a nonlinear crystal; and
frequency shifting the amplified optical beam so as to produce a frequency converted optical beam having a wavelength different from a wavelength of the seed optical beam.

21. The method of claim 20, wherein the active taper is pumped so that the pump optical radiation propagates in a direction opposite to a direction of propagation of the seed optical beam.

22. The method of claim 20, wherein the active taper is pumped so that the pump optical radiation propagates in a direction of propagation of the seed optical beam.

23. The method of claim 20, wherein the pumping of the active taper comprises pumping at least the inner cladding of the active taper.

24. A nonlinear conversion system, comprising:
an active taper situated to receive an input seed beam and comprising a rare earth doped, variable diameter core extending along a taper axis and surrounded by at least an inner cladding, wherein the variable diameter core includes an input section in which the variable diameter core defines a first mode field diameter for fundamental mode propagation and an output section in which the variable diameter core defines a second mode field diameter for fundamental mode propagation, and wherein the variable diameter core has a core diameter $d_{core}$ that is a function of position along the taper axis and the core diameter increases adiabatically as a function of position along the taper axis from the input section to the output section so that an amplified beam produced by optical gain in the active taper propagates substantially in a fundamental mode along the taper axis and a mode field diameter of the amplified beam increases from the first mode field diameter to the second mode field diameter between the input section and the output section;

an optical pump situated so as to direct pump optical radiation to at least a rare earth doped portion of the variable diameter core; and a nonlinear crystal situated so as to receive the amplified beam from the output section of the active taper and configured to produce a converted beam having a wavelength different than a wavelength of the input seed beam.

25. The system of claim 24, further comprising:

a cavity defined by a first and a second mirror and having an axis, wherein the active taper is positioned within the cavity between the first and the second mirrors with the taper axis along the axis of the cavity and the nonlinear crystal is situated so as to receive the amplified beam from the cavity.

26. The system of claim 24, wherein the variable diameter core is doped with an active rare earth dopant, wherein a concentration of the dopant varies as a function of distance along the taper axis (z) and as a function of radial distance from the taper axis (r) according to a function $\rho(r,z)$.

27. The system of claim 24, wherein the variable diameter core comprises a plurality of sections having respective boundary profiles, wherein the boundary profiles for respective sections are characterized by a type of active rare earth dopant, a dopant concentration, and a dopant spatial distribution such that adjacent sections of the variable diameter core are characterized by different boundary profiles.

28. The system of claim 24, wherein the active taper is a first active taper and the system further comprises:

a fiber having a core and a cladding surrounding the core with a refractive index lower than a refractive index of the core, wherein the fiber is situated so as to provide the input seed beam to the first active taper, and wherein a diameter of the fiber core and respective refractive indices of the core and the cladding define a mode field diameter for fundamental mode propagation in the fiber that substantially corresponds to the first mode field diameter of the input section of the first active taper; and a second active taper situated to direct an amplified beam produced by optical gain in the second active taper to the fiber and comprising a rare earth doped, variable diameter core surrounded by at least an inner cladding and including an input section in which the variable diameter core defines a third mode field diameter for fundamental mode propagation and an output section in which the variable diameter core defines a fourth mode field diameter for fundamental mode propagation, wherein the fourth mode field diameter is larger than the third mode field diameter, and wherein the fourth mode field diameter substantially corresponds to the first mode field diameter and to the mode field diameter of the fiber.

29. The system of claim 28, wherein the first mode field diameter of the input section of the first active taper is about two times larger than the third mode field diameter of the input section of the second active taper.

\* \* \* \* \*